US008108895B2

(12) United States Patent
Anderson et al.

(10) Patent No.: US 8,108,895 B2
(45) Date of Patent: Jan. 31, 2012

(54) CONTENT SELECTION BASED ON SIGNALING FROM CUSTOMER PREMISES EQUIPMENT IN A BROADCAST NETWORK

(75) Inventors: Bruce J. Anderson, Chesterfield, NJ (US); Daniel A. Boulet, Sherwood Park (CA); Daniel C. Wilson, Edmonton (CA)

(73) Assignee: Invidi Technologies Corporation, Princeton, NJ (US)

( * ) Notice: Subject to any disclaimer, the term of this patent is extended or adjusted under 35 U.S.C. 154(b) by 374 days.

(21) Appl. No.: 11/331,835

(22) Filed: Jan. 12, 2006

(65) Prior Publication Data
US 2007/0022032 A1 Jan. 25, 2007

Related U.S. Application Data

(60) Provisional application No. 60/643,421, filed on Jan. 12, 2005.

(51) Int. Cl.
*H04N 7/10* (2006.01)
(52) U.S. Cl. ................ 725/36; 705/14.4; 705/14.41
(58) Field of Classification Search .............. 725/1–9, 725/32–36; 705/400–418, 14.4, 14.41
See application file for complete search history.

(56) References Cited

U.S. PATENT DOCUMENTS

| 4,264,925 A | 4/1981 | Freeman et al. |
| 4,331,974 A | 5/1982 | Cogswell et al. |
| 4,573,072 A | 2/1986 | Freeman |
| 4,602,279 A | 7/1986 | Freeman |
| 4,918,516 A | 4/1990 | Freeman |
| 5,099,319 A | 3/1992 | Esch et al. |
| 5,155,591 A | 10/1992 | Wachob |
| 5,231,494 A | 7/1993 | Wachob |
| 5,251,324 A | 10/1993 | McMullan, Jr. |
| 5,260,778 A | 11/1993 | Kauffman et al. |
| 5,283,639 A | 2/1994 | Esch et al. |
| 5,381,477 A | 1/1995 | Beyers, II et al. |

(Continued)

FOREIGN PATENT DOCUMENTS

EP 0930784 A1 7/1999

(Continued)

OTHER PUBLICATIONS

U.S. Appl. No. 09/545,015, filed Apr. 7, 2000, Haberman.

(Continued)

*Primary Examiner* — Marcos Batista
(74) *Attorney, Agent, or Firm* — Kent A. Fischmann; Marsh Fischmann & Breyfogle LLP

(57) ABSTRACT

Systems and methods are presented for insertion of assets into a stream of content (e.g., audio and/or video programming). Such assets may be targeted to network users separate from the surrounding content and deliveries thereof confirmed. Among other things, these systems and methods enable a new advertising paradigm based on guaranteed delivery of targeted commercial impressions. In this regard, the systems and methods generally provide assets with broadcast network programming (e.g., via actual insertion and/or switching to an asset channel) based on actual audience observations. For example, asset providers may wish to target assets for delivery according to specific audience classifications (e.g., gender, income level, locale, age, etc.). Programming providers, such as television programmers and radio programmers (e.g., standard tower broadcast radio and satellite radio), may receive information from broadcast network users and insert the assets into available bandwidth based on that information.

24 Claims, 51 Drawing Sheets

U.S. PATENT DOCUMENTS

| | | |
|---|---|---|
| 5,410,344 A | 4/1995 | Graves |
| 5,446,919 A | 8/1995 | Wilkins |
| 5,515,098 A | 5/1996 | Carles |
| 5,515,858 A | 5/1996 | Myllymaki |
| 5,534,941 A | 7/1996 | Sie et al. |
| 5,534,944 A | 7/1996 | Egawa et al. |
| 5,537,586 A | 7/1996 | Amram et al. |
| 5,585,858 A | 12/1996 | Harper |
| 5,600,364 A | 2/1997 | Hendricks et al. |
| 5,600,366 A | 2/1997 | Schulman |
| 5,636,346 A | 6/1997 | Saxe |
| 5,652,615 A | 7/1997 | Bryant et al. |
| 5,661,516 A | 8/1997 | Carles |
| 5,661,519 A | 8/1997 | Franetzki |
| 5,682,195 A | 10/1997 | Hendricks et al. |
| 5,724,521 A | 3/1998 | Dedrick |
| 5,740,549 A | 4/1998 | Reilly et al. |
| 5,754,939 A | 5/1998 | Herz et al. |
| 5,758,257 A | 5/1998 | Herz et al. |
| 5,774,170 A | 6/1998 | Hite et al. |
| 5,805,974 A | 9/1998 | Hite et al. |
| 5,818,539 A | 10/1998 | Naimpally et al. |
| 5,838,678 A | 11/1998 | Davis et al. |
| 5,848,396 A | 12/1998 | Gerace |
| 5,859,660 A | 1/1999 | Perkins et al. |
| 5,872,588 A | 2/1999 | Aras et al. |
| 5,912,709 A | 6/1999 | Takahashi |
| 5,917,830 A | 6/1999 | Chen et al. |
| 5,918,014 A | 6/1999 | Robinson |
| 5,948,061 A | 9/1999 | Merriman et al. |
| 5,982,436 A | 11/1999 | Balakrishnan et al. |
| 5,991,735 A | 11/1999 | Gerace |
| 6,002,393 A | 12/1999 | Hite et al. |
| 6,018,726 A * | 1/2000 | Tsumura ................... 705/412 |
| 6,029,045 A | 2/2000 | Picco et al. |
| 6,049,569 A | 4/2000 | Radha et al. |
| 6,067,303 A | 5/2000 | Aaker et al. |
| 6,088,396 A | 7/2000 | Takahashi |
| 6,088,722 A | 7/2000 | Herz et al. |
| 6,111,896 A | 8/2000 | Slattery et al. |
| 6,151,443 A | 11/2000 | Gable et al. |
| 6,154,496 A | 11/2000 | Radha |
| 6,181,334 B1 | 1/2001 | Freeman et al. |
| 6,195,368 B1 | 2/2001 | Gratacap |
| 6,204,843 B1 | 3/2001 | Freeman et al. |
| 6,208,691 B1 | 3/2001 | Balakrishnan et al. |
| 6,216,129 B1 | 4/2001 | Eldering |
| 6,246,701 B1 | 6/2001 | Slattery et al. |
| 6,252,873 B1 | 6/2001 | Vines |
| 6,269,120 B1 | 7/2001 | Boice et al. |
| 6,298,348 B1 | 10/2001 | Eldering |
| 6,324,519 B1 | 11/2001 | Eldering |
| 6,353,929 B1 | 3/2002 | Houston |
| 6,418,169 B1 | 7/2002 | Datari |
| 6,438,752 B1 | 8/2002 | McClard |
| 6,446,261 B1 | 9/2002 | Rosser |
| 6,457,010 B1 | 9/2002 | Eldering et al. |
| 6,463,585 B1 | 10/2002 | Hendricks et al. |
| 6,487,721 B1 | 11/2002 | Safadi |
| 6,560,578 B2 | 5/2003 | Eldering |
| 6,615,039 B1 | 9/2003 | Eldering |
| 6,684,194 B1 | 1/2004 | Eldering et al. |
| 6,704,930 B1 | 3/2004 | Eldering et al. |
| 6,708,335 B1 | 3/2004 | Ozer et al. |
| 6,714,917 B1 | 3/2004 | Eldering et al. |
| 6,718,551 B1 * | 4/2004 | Swix et al. ................... 725/32 |
| 6,820,277 B1 | 11/2004 | Eldering et al. |
| 6,978,470 B2 * | 12/2005 | Swix et al. ................... 725/32 |
| 6,983,478 B1 * | 1/2006 | Grauch et al. ............... 725/13 |
| 7,003,792 B1 | 2/2006 | Yuen |
| 7,039,932 B2 | 5/2006 | Eldering et al. |
| 7,100,183 B2 | 8/2006 | Kunkel et al. |
| 7,363,643 B2 * | 4/2008 | Drake et al. ................. 725/34 |
| 7,478,414 B1 | 1/2009 | Glusker et al. |
| 7,546,619 B2 | 6/2009 | Anderson et al. |
| 7,630,986 B1 | 12/2009 | Herz et al. |
| 2001/0025245 A1 | 9/2001 | Flickinger et al. |
| 2001/0032333 A1 | 10/2001 | Flickinger et al. |
| 2001/0049620 A1 | 12/2001 | Blasko |
| 2002/0013943 A1 | 1/2002 | Habermann et al. |
| 2002/0026638 A1 | 2/2002 | Eldering et al. |
| 2002/0032626 A1 | 3/2002 | DeWolf |
| 2002/0049727 A1 | 4/2002 | Rothkopf |
| 2002/0049968 A1 | 4/2002 | Wilson et al. |
| 2002/0053077 A1 | 5/2002 | Shah-Nazaroff et al. |
| 2002/0056107 A1 | 5/2002 | Schlack |
| 2002/0059584 A1 | 5/2002 | Ferman et al. |
| 2002/0072966 A1 * | 6/2002 | Eldering et al. ............... 705/14 |
| 2002/0083435 A1 | 6/2002 | Blasko et al. |
| 2002/0083439 A1 | 6/2002 | Eldering et al. |
| 2002/0083441 A1 | 6/2002 | Flickinger et al. |
| 2002/0083442 A1 | 6/2002 | Eldering |
| 2002/0083443 A1 | 6/2002 | Eldering et al. |
| 2002/0083444 A1 | 6/2002 | Blasko et al. |
| 2002/0083445 A1 | 6/2002 | Flickinger et al. |
| 2002/0083451 A1 | 6/2002 | Gill et al. |
| 2002/0087973 A1 | 7/2002 | Hamilton et al. |
| 2002/0087975 A1 | 7/2002 | Schlack |
| 2002/0087980 A1 | 7/2002 | Eldering et al. |
| 2002/0092019 A1 | 7/2002 | Marcus |
| 2002/0099611 A1 | 7/2002 | De Souza et al. |
| 2002/0111154 A1 | 8/2002 | Eldering et al. |
| 2002/0111172 A1 | 8/2002 | DeWolf et al. |
| 2002/0122430 A1 | 9/2002 | Haberman et al. |
| 2002/0123928 A1 | 9/2002 | Schlack et al. |
| 2002/0129368 A1 | 9/2002 | Schlack et al. |
| 2002/0143901 A1 | 10/2002 | Lupo et al. |
| 2002/0144262 A1 | 10/2002 | Plotnick et al. |
| 2002/0144263 A1 | 10/2002 | Eldering et al. |
| 2002/0178445 A1 | 11/2002 | Eldering et al. |
| 2002/0178447 A1 | 11/2002 | Plotnick et al. |
| 2002/0184047 A1 | 12/2002 | Plotnick et al. |
| 2002/0184130 A1 | 12/2002 | Blasko |
| 2002/0194058 A1 | 12/2002 | Eldering |
| 2003/0004810 A1 | 1/2003 | Eldering |
| 2003/0005437 A1 | 1/2003 | Feuer et al. |
| 2003/0005465 A1 | 1/2003 | Connelly |
| 2003/0037333 A1 | 2/2003 | Ghashghai et al. |
| 2003/0045957 A1 | 3/2003 | Habermann et al. |
| 2003/0067554 A1 | 4/2003 | Klarfeld et al. |
| 2003/0093792 A1 | 5/2003 | Labeeb et al. |
| 2003/0097299 A1 | 5/2003 | O'Kane |
| 2003/0101454 A1 | 5/2003 | Ozer et al. |
| 2003/0105831 A1 | 6/2003 | O'Kane et al. |
| 2003/0110171 A1 | 6/2003 | Ozer et al. |
| 2003/0115318 A1 | 6/2003 | Wueste |
| 2003/0142689 A1 | 7/2003 | Habermann et al. |
| 2003/0149975 A1 | 8/2003 | Eldering et al. |
| 2003/0182567 A1 | 9/2003 | Barton et al. |
| 2003/0200336 A1 | 10/2003 | Pal et al. |
| 2003/0204592 A1 | 10/2003 | Crouse-Kemp et al. |
| 2003/0220100 A1 | 11/2003 | McElhatten et al. |
| 2004/0003118 A1 | 1/2004 | Brown et al. |
| 2004/0003398 A1 | 1/2004 | Donian et al. |
| 2004/0015984 A1 | 1/2004 | Yamamoto et al. |
| 2004/0015986 A1 | 1/2004 | Carver et al. |
| 2004/0045020 A1 | 3/2004 | Witt et al. |
| 2004/0117257 A1 | 6/2004 | Habermann |
| 2004/0181818 A1 | 9/2004 | Heyner et al. |
| 2004/0220893 A1 | 11/2004 | Spivack et al. |
| 2004/0243470 A1 | 12/2004 | Ozer et al. |
| 2004/0243623 A1 | 12/2004 | Ozer et al. |
| 2005/0021398 A1 | 1/2005 | McCleskey et al. |
| 2005/0028207 A1 | 2/2005 | Finseth et al. |
| 2005/0080846 A1 | 4/2005 | McCleskey et al. |
| 2005/0097599 A1 | 5/2005 | Plotnick et al. |
| 2005/0193410 A1 | 9/2005 | Eldering et al. |
| 2005/0204381 A1 | 9/2005 | Ludvig et al. |
| 2005/0228806 A1 | 10/2005 | Haberman |
| 2005/0234992 A1 | 10/2005 | Haberman |
| 2005/0283796 A1 * | 12/2005 | Flickinger ................... 725/35 |
| 2006/0184977 A1 | 8/2006 | Mueller et al. |

FOREIGN PATENT DOCUMENTS

| | | |
|---|---|---|
| JP | 2002-056280 | 2/2002 |
| JP | 2004-206324 | 7/2004 |
| WO | 99/21338 A1 | 4/1999 |

| | | |
|---|---|---|
| WO | WO 99/46708 | 9/1999 |
| WO | WO 00/17775 | 3/2000 |
| WO | 00/33228 A1 | 6/2000 |
| WO | 00/33233 A1 | 6/2000 |
| WO | 01/17250 A1 | 3/2001 |
| WO | 01/47156 A2 | 6/2001 |

OTHER PUBLICATIONS

English translation of Japanese Notification of Reasons for Rejection mailed Jun. 1, 2011.

* cited by examiner

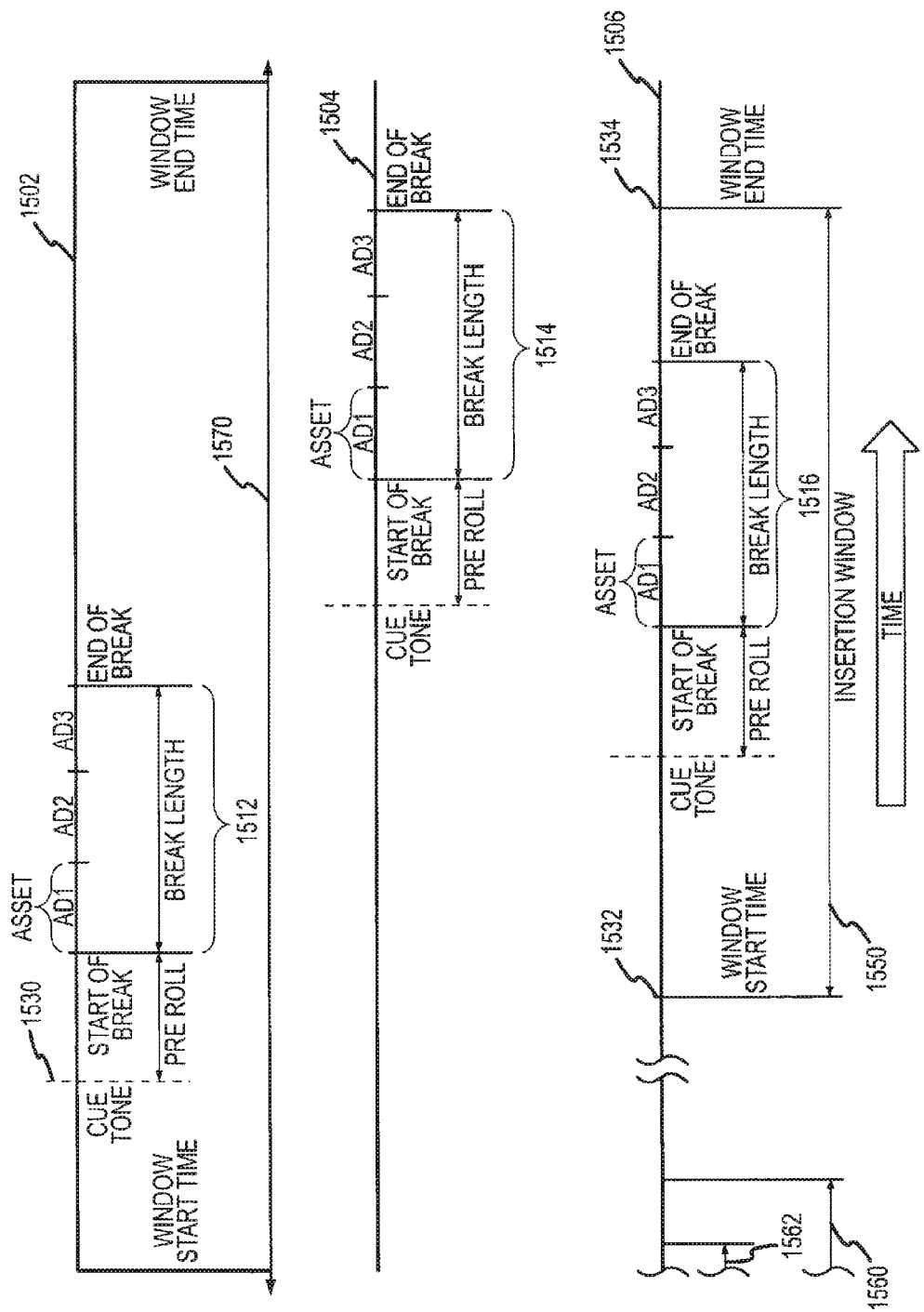

| ASSET | CLASSIFICATION | CHANNEL | BREAK |
|---|---|---|---|
| 0001 | M 18-24 | | 7 - 8 (1) |
| 0002 | M > 50K | | 7 - 8 (1) |
| 0003 | F 24-40 | | 7 - 8 (1) |
| 0004 | F 14-18 | CBS | 7 - 8 (1) |
| 0005 | M-F, 24-40 | CBS | 7 - 8 (1) |
| 0006 | M-F > 50K | V1 | 7 - 8 (1) |
| 0007 | L = 80304+00 | | 7 - 8 (1) |
| ● ● ● | ● ● ● | ● ● ● | ● ● ● |
| N | M-F, 50+ | | 7 - 8 (1) |

FIG.17B

Informational Content Campaign: Provider

| Name | | | | | | Status: Campaign Active |
|---|---|---|---|---|---|---|

Summary:
Maximum Cost Per Impression: USD $4.00
Campaign Duration: Jan 12, 2006 to May 1, 2006

Informational Content Segment Campaign Parameters - Use any combination of filters

- by age:
- by gender:
- by income:
- by time of day:

Info Content Campaign

| | Info Segments ▼ | Status | Cost Per Impression | Billing Information | Number of Impressions | Max Cost Per Impression | Average Cost Per Impression | Total Cost |
|---|---|---|---|---|---|---|---|---|
| | | | | | | ○ all time | | |
| | | | | | | ● Jan ▼ 12 ▼ 2006 ▼ | May ▼ 1 ▼ 2006 ▼ | Go |
| ☐ | Total | | | | 83 | 4.00 | $2.20 | $182.44 |
| ☐ | InfoSegment1 | Active | $0.40 | Credit Card Info | 2 | 2.00 | $0.22 | $0.42 |
| ☐ | InfoSegment2 | Active | $3.50 | Deposit Account Info | 14 | 3.00 | $1.80 | $26.12 |
| ☐ | InfoSegmentN | Active | $0.40 | Mailing Address | 2 | 2.00 | $0.24 | $0.46 |

CONTENT SELECTION BASED ON SIGNALING FROM CUSTOMER PREMISES EQUIPMENT IN A BROADCAST NETWORK

This application claims priority from U.S. Provisional Application No. 60/643,421, filed Jan. 12, 2005.

FIELD OF INVENTION

The present invention generally relates to insertion of selected content or assets into a network content stream, e.g., interspersed with or otherwise combined with other content such as audio and/or video programming. More specifically, such assets may be targeted to network users separate from the surrounding content or programming and confirmation of delivery can be obtained. Among other things, the invention thus enables a new advertising paradigm based on guaranteed delivery of targeted commercial impression.

BACKGROUND OF THE INVENTION

Broadcast network content, or programming, is commonly mixed with informational content, or assets. These assets include advertisements, associated programming, public service announcements, ad tags, trailers, weather or emergency notifications and a variety of other content, including both paid and unpaid content. For example, a television network may broadcast a television program to a wide and diverse audience. Asset providers (e.g., advertisers) desiring to convey information regarding services and/or products (e.g., television commercials) may provide assets to the broadcast network or content providers such that the assets may be aired in connection with the television program. Assets are typically interleaved with the broadcast network programming, or content, during the predetermined intervals in the programming (e.g., commercial breaks designated by cues within the programming). In a similar fashion, audio assets may be interleaved with audio only broadcast network programming, such as tower broadcast radio and satellite radio.

Asset providers typically pay broadcast network programmers for the opportunity to deliver assets to an audience. These asset providers typically desire to direct their assets to a selected audience rather than broadcasting their information to all potential audience segments because that would generally be a waste of resources (e.g., certain audience members may not be of interest to the asset provider). To illustrate, an advertiser desirous of delivering a commercial conveying information about men's shaving products may not be particularly interested in delivering the commercial to women or children. Because of this desired directing of assets, audience sampling, such as that performed by Nielsen Media Research Corp. (Nielsen), was established to delineate audiences into sectors. For example, the audience sampling may classify audience members into groups based on gender, ethnicity, income level, number of family members, locale, etc.

Audience sampling is often performed via the monitoring of selected households. For example, a monitoring company may provide equipment to a number of households. The member households may comprise a fairly diverse audience with profiles in each household being known to the monitoring company. As such, a monitoring company may monitor the observation patterns of the member households to roughly associate audience profiles with certain content (e.g., television programs). That is, the monitoring company roughly extrapolates the observation patterns of the member households to the audience at large; a process that produces what is generally referred to as ratings.

The case of television advertisements is illustrative. Today, advertisers direct their assets based on ratings. For example, an asset provider may wish to display an ad within a certain programming time slot if the rating for that time slot substantially corresponds to the target audience for the asset (e.g., an asset provider may wish to show a shaving add during a programming time slot having a relatively high rating among males between the ages of 18 and 32). In the best case, however, a significant mismatch of the audience to advertisers' targets still occurs. For example, a programming time slot having a relatively high rating among males between the ages of 18 and 32 may still have a relatively large percentage of female viewers or other viewers that are not of interest to the advertiser.

Additionally, the growth in the number of programming channels available to end users of content (e.g., television viewers and radio listeners) has contributed to the difficulty in reaching these users. For example, because audience members are dispersed over many programming channels and audience sampling cannot reach every member of the audience, ratings for certain programs may be insubstantial or immeasurable. In this regard, asset providers may not wish to deliver assets to certain programming channels even though these channels in the aggregate represent large portions of their target audience. Because of these missed opportunities, advertisers miss potential exposure for their goods and services, and Multiple Systems Operators ("MSOs"; e.g., cable television operators or other network operators) and/or program providers may lose income. Additionally, for viewers, this may amount to lost exposure to assets of potential interest or, at the least, reduced advertiser subsidization of network content costs A number of targeted advertising systems have been proposed. Some of the systems involve a forward and store architecture where ad content is delivered to user equipment ahead of time and stored for delivery during commercial breaks as appropriate. However, these systems generally entail substantial storage requirements and may require equipment upgrades for many viewers. Additionally, these systems may involve considerable uncertainty regarding what advertisements were actually delivered, thus undermining the objective of improved appeal to advertisers. Other proposed systems involve selecting ads on a network platform based on a user profile and addressing ads to particular households. Unfortunately, this entails privacy concerns and requires addressable delivery rather than broadcast mode transmission. More generally, proposed targeted advertising systems have largely failed to gain the acceptance needed to address the inherent inefficiencies in the conventional broadcast network advertising paradigm.

SUMMARY OF THE INVENTION

The present invention relates to insertion of selected content or assets into a network programming stream, e.g., interspersed with or otherwise combined with other content such as audio and/or video programming. More specifically, such assets may be targeted to network users separate from the surrounding content or programming and confirmation of delivery may be obtained. Among other things, the invention thus enables a new advertising paradigm based on guaranteed delivery of targeted commercial impressions. In this regard, the systems and methods presented herein generally provide for the interleaving of assets with broadcast network programming based on actual audience observations. For example, asset providers may wish to target assets for delivery according to specific audience classifications (e.g., ethnicity, gender, income level, locale, age, etc., or combinations thereof). Programming providers, such as television programmers and radio programmers (e.g., standard tower broadcast radio communications and satellite radio communications), may receive information (e.g., votes for assets) from broadcast network users and insert the assets into broadcast network programming based on that information.

The systems and methods presented herein may also provide substantially real-time audience estimates that enable the asset provider to deliver assets in a more precise manner. For example, a system may communicate with a plurality of customer premise equipments ("CPEs"; e.g., digital set top boxes, analog set top boxes, digital video recorders, etc.) to estimate the CPEs' user profiles. In this regard, an individual CPE may be configured to monitor channel selections of its respective user(s) and determine from those channel selections a profile of the user(s). The CPE may then transfer votes to the system to request certain assets. That is, the CPE may determine that the user of the CPE may impliedly desire assets that correspond to the user's profile and cast votes to request such assets.

Each of the CPEs, operating in a similar manner, may transfer the votes to the system. For example, a system may be configured to convey broadcast network programming to a wide and diverse audience. Certain groups of CPE users within that wide and diverse audience may, however, have similar profiles (e.g., ethnicity, gender, age, income level, locale, etc.) and/or similar observation characteristics. Accordingly, some CPE users of the audience may cast votes requesting similar assets.

The system may designate assets for delivery to those groups. For example, target audience parameters may be associated with the assets that can be used by CPEs to deliver the appropriate assets. Additionally, the system may be capable of estimating an audience universe for individual groups. For example, an asset provider may provide, to the system, an asset that is designated for delivery to CPE users with particular CPE classification parameters. In this regard, the system may determine the number of CPE users matching these parameters and present that information to the asset provider such that the asset provider may have a better idea of the coverage of an asset. The system may also use this information to determine a cost for a delivered asset.

The cost of an asset may be computed on an impression basis. For example, an asset provider may input, to the system, certain audience classification parameters that relate to an asset. The system may associate a unit cost with the asset such that each delivery of the asset tallies the total cost for the asset. That is, the system may increment the cost of an asset campaign based on the number of deliveries for that segment. Generally, however, costs may be associated on a per thousand impression basis (i.e., cost per thousand, or "CPM").

An estimated cost of an asset campaign may be presented to an asset provider in response to entering the audience classification parameters. For example, the system may retrieve a priori information or substantially real-time information of an audience classification for a given time (e.g., hour, day, week, year, etc.). With an estimate of the number of audience members in a particular group as well as a cost per impression of an asset, an asset provider may estimate the cost of an asset campaign.

In addition to providing estimated cost for assets, the system may monitor audience composition and size to optimize timing of an asset insertion into broadcast network programming. For example, the system may monitor votes from CPE users in substantially real-time to determine observation patterns of aggregated groups of CPE users. In this regard, the system may determine an optimum time for insertion of an asset into broadcast content (e.g., when viewership of broadcast network programming is at or near its peak). The system may also use this information to align an asset provider's campaign budget with a particular time. For example, an asset providers' campaign budget may equal a unit price of an asset multiplied by the number of deliveries scheduled within a given timeframe multiplied by the number of audience members within a group. As such, certain parameters of the campaign budget, such as number of schedule deliveries, are subject to variation, which enables the asset provider control campaign budgets.

In one embodiment, the system provides an interface that enables the asset provider to input characteristics of an asset campaign. For example, the system may provide a graphical user interface where the asset provider may associate an asset with an audience classification. In this regard, the asset provider may also input information pertaining to the duration of the campaign, number of desired deliveries, time of the day, the day of the week, title of the broadcast content for desired insertion, and/or other campaign parameters.

An additional feature of the system allows the asset provider to operate an asset campaign with multiple assets. For example, an asset provider may have a plurality of assets that are to be viewed in a particular order. That is, an asset provider may desire insertion of a first asset in a first time interval within broadcast content. In a second time interval in the broadcast content, the asset provider may desire insertion of a second asset that relates to information of the first asset.

As a further illustration, an automotive manufacturer may wish to convey a first asset relating to that manufacturer's new line of passenger vehicles and subsequently convey a second asset relating to the manufacturer's sports car line. However, the invention is not intended to be limited to a particular type of asset or a manner in which the assets may be shown. For example, the system may allow a plurality of asset providers to cooperatively provide assets that enhance acceptance by CPE users. To illustrate, a vacation destination company and a travel company may cooperatively provide an asset campaign wherein a first asset conveys information pertaining to a destination resort and a subsequent asset conveys information pertaining to air travel to that location. In another example, an organization may wish to convey the same asset one or more times. Such may be eventually followed by a different asset relating to the first (e.g., the first asset being a "teaser" advertisement).

In one embodiment, the above-mentioned features may be implemented with cable-television. For example, the system may be configured with a cable-television "headend" that receives broadcast content from a plurality of programming providers. The cable-television head end may also receive assets from a plurality of asset providers. The system may function to interleave assets with content at the cable-television headend based on, for example, a campaign of the asset provider. Alternately or additionally, the assets may be provided on separate asset channels.

Providing assets with broadcast content may be performed in a variety of manners. For example, the system described herein may interleave assets by inserting analog assets into analog broadcast content at predetermined intervals within the broadcast network programming. The system may also interleave digital assets by splicing the segments into digital broadcast content.

Alternatively or additionally, the system may provide assets with broadcast content via channel switching. For example, when an asset is to be inserted in broadcast network programming, the system may transfer information to a user's CPE that such that the CPE may switch to another channel conveying the asset. After completing delivery of the asset, the CPE may switch to another channel to receive another asset or the previous channel to continue receiving the broadcast content.

The information that is sent to the users' CPEs may consist of a "flotilla" of ads. For example, the flotilla may include scheduling information of advertisements to be placed within broadcast content. The CPEs may use this flotilla to select ads for the users.

In one embodiment, the system transfers assets to CPEs for later insertion of the assets into broadcast content. For example, the CPE may observe channel selections of CPE users to determine asset selections for insertion. The CPE may then cast votes for the assets and use these votes to retrieve stored assets. The CPE may, therefore, insert the assets substantially independent of a network. Even so, the CPE may transfer votes and/or other information to the system for alternative uses (e.g., databasing for audience estimation based on a priori data).

The various features presented herein may be implemented in a variety of systems. For example, the system described herein is generally discussed with respect to a cable-television system. However, the system and its various methodical approaches to inserting assets into broadcast content may be implemented with other forms of broadcast content, such as broadcast audio (e.g., satellite radio and/or common tower radio station broadcasts). Additionally, the system may be used in a satellite television transmission system, such as those employed by DirecTV and Dish Network.

Moreover, these features may be implemented with video-on-demand ("VOD"). For example, the CPE may be used to select a VOD program. Based on this program selection, the CPE may cast votes with respect to available ads. These votes may be used to interleave ads into the VOD content at the VOD server or headend, or the ads may be forwarded to customer premises equipment for insertion into the VOD content.

BRIEF DESCRIPTION OF THE DRAWINGS

FIG. 15 illustrates exemplary sequences associated with breaks on programming channels.

FIG. 17B shows a single asset option list for multiple breaks and channels.

FIG. 36B is an exemplary Graphical User Interface (GUI) of the targeted content interface of FIG. 36A.

FIG. 36C is another exemplary GUI of the targeted content interface of FIG. 36A.

DETAILED DESCRIPTION

Figure 1:
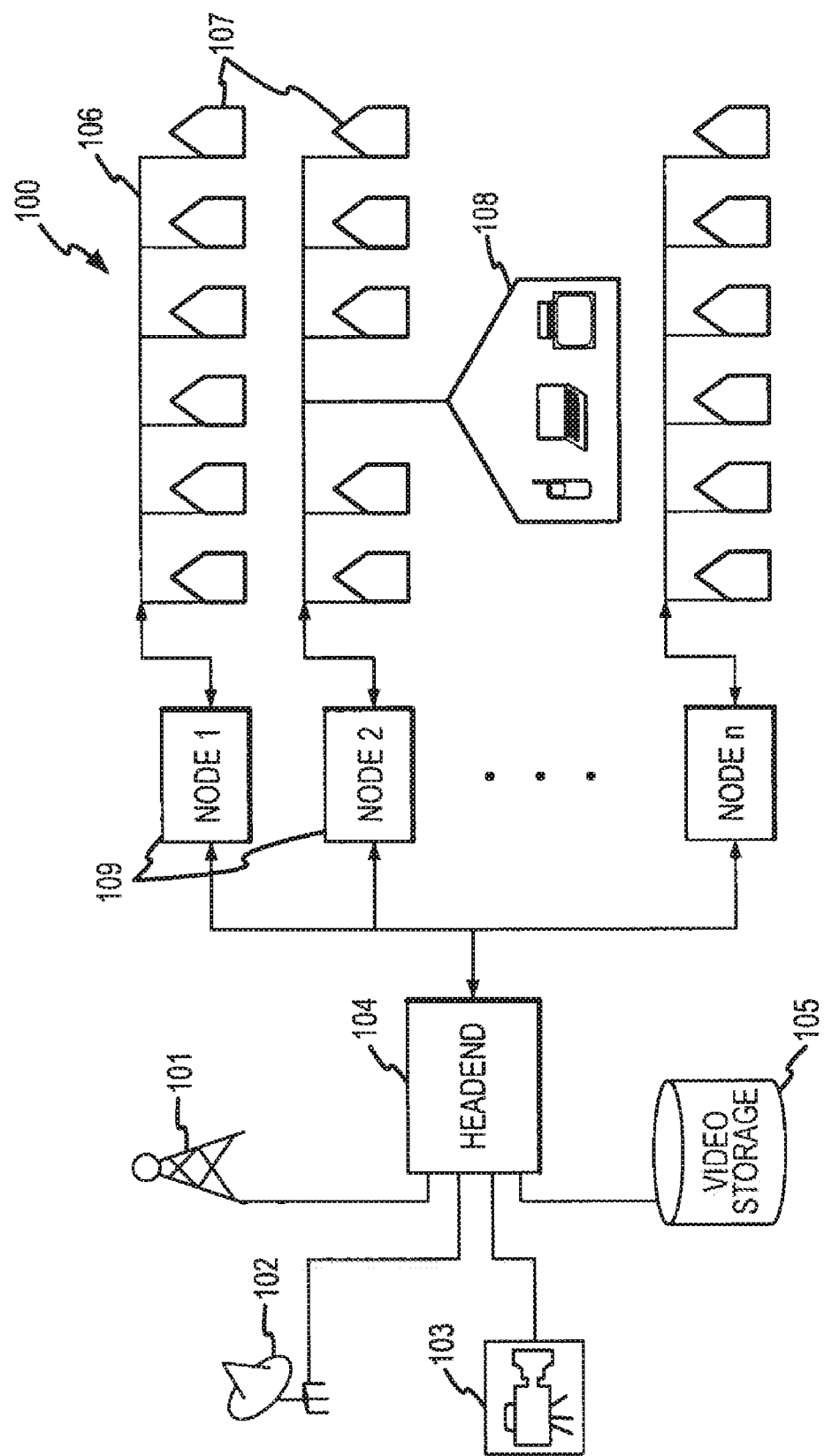
FIG. 1 illustrates major components of a cable television network.

The present invention relates to various structure and functionality for delivery of targeted assets, classification of network users or consuming patterns, and network monitoring for use in a communications network, as well as associated business methods. The invention has particular application with respect to networks where content is broadcast to network users; that is, the content is made available via the network to multiple users without being specifically addressed to individual user nodes in point-to-point fashion. In this regard, content may be broadcast in a variety of networks including, for example, cable and satellite television networks, satellite radio networks, IP networks used for multicasting content and networks used for podcasts or telephony broadcasts/multicasts. Content may also be broadcast over the airwaves though, as will be understood from the description below, certain aspects of the invention make use of bi-directional communication channels which are not readily available, for example, in connection with conventional airwave based televisions or radios (i.e., such communication would involve supplemental communication systems). In various contexts, the content may be consumed in real time or stored for subsequent consumption. Thus, while specific examples are provided below in the context of a cable television network for purposes of illustration, it will be appreciated that the invention is not limited to such contexts but, rather, has application to a variety of networks and transmission modes.

The targeted assets may include any type of asset that is desired to be targeted to network users. It is noted that such targeted assets are sometimes referred to as "addressable" assets (though, as will be understood from the description below, targeting can be accomplished without addressing in a point-to-point sense). For example, these targeted assets may include advertisements, internal marketing (e.g., information about network promotions, scheduling or upcoming events), public service announcements, weather or emergency information, or programming. The targeted assets may be independent or included in a content stream with other assets such as untargeted network programming. In the latter case, the targeted assets may be interspersed with untargeted programming (e.g., provided during programming breaks) or may otherwise be combined with the programming as by being superimposed on a screen portion in the case of video programming. In the description below, specific examples are provided in the context of targeted assets provided during breaks in television programming. While this is an important commercial implementation of the invention, it will be appreciated that the invention has broader application. Thus, distinctions below between "programming" and "assets" such as advertising should not be understood as limiting the types of content that may be targeted or the contexts in which such content may be provided.

The following description is divided into a number of sections. In the Introduction section, the broadcast network and network programming environments are first described. Thereafter, an overview of the targeted asset environment is provided including a discussion of certain shortcomings of the conventional asset delivery paradigm. The succeeding section provides an overview of a targeted asset system in accordance with the present invention highlighting advantages of certain preferred implementations thereof. Finally, the last section describes individual components of the system in greater detail and provides a detailed disclosure of exemplary implementations with specific reference to targeted advertising in a cable television environment.

I. Introduction

A. Broadcast Networks

The present invention has particular application in the context of networks primarily used to provide broadcast content, herein termed broadcast networks. Such broadcast networks generally involve synchronized distribution of broadcast content to multiple users. However, it will be appreciated that certain broadcast networks are not limited to synchronously pushing content to multiple users but can also be used to deliver content to specific users, including on a user pulled basis. As noted above, examples of broadcast networks include cable television networks, satellite television networks, and satellite radio networks. In addition, audio, video or other content may be broadcast across Internet protocol and telephony networks. In any such networks, it may be desired to insert targeted assets such as advertisements into a broadcast stream. Examples of broadcast networks used to delivery content to specific users include broadcast networks used to deliver on demand content such as VOD and podcasts. The present invention provides a variety of functionality in this regard, as will be discussed in detail below.

For purposes of illustration, the invention is described in some instances below in the context of a cable television network implementation. Some major components of a cable television network 100 are depicted in FIG. 1. In the illustrated network 100, a headend 104 obtains broadcast content from any of a number of sources 101-103. Additionally, broadcast content may be obtained from storage media 105 such as a via a video server. The illustrated sources include an antenna 101, for example, for receiving content via the airwaves, a satellite dish 102 for receiving content via satellite communications, and a fiber link 103 for receiving content directly from studios or other content sources. It will be appreciated that the illustrated sources 101-103 and 105 are provided for purposes of illustration and other sources may be utilized.

The headend 104 processes the received content for transmission to network users. Among other things, the headend 104 may be operative to amplify, convert and otherwise process the broadcast content signals as well as to combine the signals into a common cable for transmission to network users 107 (although graphically depicted as households, as described below, the system of the present invention can be used in implementations where individual users in a household are targeted). It also is not necessary that the target audience be composed households or household members in any sense. For example, the present invention can be used to create on-the-fly customized presentations to students in distributed classrooms, e.g., thus providing examples which are more relevant to each student or group of students within a presentation being broadcast to a wide range of students. The headend also processes signals from users in a variety of contexts as described below. The headend 104 may thus be thought of as the control center or local control center of the cable television network 100.

Typically, there is not a direct fiber link from the headend 104 to the customer premises equipment (CPE) 108. Rather, this connection generally involves a system of feeder cables and drop cables that define a number of system subsections or branches. This distribution network may include a number of nodes 109. The signal may be processed at these nodes 109 to insert localized content, filter the locally available channels or otherwise control the content delivered to users in the node area. The resulting content within a node area is typically distributed by optical and/or coaxial links 106 to the premises of particular users 107. Finally, the broadcast signal is processed by the CPE 108 which may include a television, data terminal, a digital set top box, DVR or other terminal equipment. It will be appreciated that digital or analog signals may be involved in this regard.

Users employ the network, and network operators derive revenue, based on delivery of desirable content or programming. The stakeholders in this regard include programming providers, asset providers such as advertisers (who may be the same as or different than the programming providers), network operators such as Multiple Systems Operators (MSOs), and users—or viewers in the case of television networks. Programming providers include, for example: networks who provide series and other programming, including on a national or international basis; local affiliates who often provide local or regional programming; studios who create and market content including movies, documentaries and the like; and a variety of other content owners or providers. Asset providers include a wide variety of manufacturers, retailers, service providers and public interest groups interested in, and generally willing to pay for, the opportunity to deliver messages to users on a local, regional, national or international level. As discussed below, such assets include: conventional advertisements; tag content such as ad tags (which may include static graphic overlays, animated graphics files or even real-time video and audio) associated with the advertisements or other content; banners or other content superimposed on or otherwise overlapping programming; product placement; and other advertising mechanisms. In addition, the networks may use insertion spots for internal marketing as discussed above, and the spots may be used for public service announcements or other non-advertising content. Network operators are generally responsible for delivering content to users and otherwise operating the networks as well as for contracting with the networks and asset providers and billing. Users are the end consumers of the content. Users may employ a variety of types of CPEs including television, set top boxes, iPOD™ devices, data terminals, satellite delivered video or audio to an automobile, appliances (such as refrigerators) with built-in televisions, etc.

As described below, all of these stakeholders have an interest in improved delivery of content including targeted asset delivery. For example, users can thereby be exposed to assets that are more likely of interest and can continue to have the costs of programming subsidized or wholly borne by asset providers. Asset providers can benefit from more effective asset delivery and greater return on their investment. Network operators and asset providers can benefit from increased value of the network as an asset delivery mechanism and, thus, potentially enhanced revenues. The present invention addresses all of these interests.

It will be noted that it is sometimes unclear that the interests of all of these stakeholders are aligned. For example, it may not be obvious to all users that they benefit by consuming such assets. Indeed, some users may be willing to avoid consuming such assets even with an understanding of the associated costs. Network operators and asset providers may also disagree as to how programming should best be distributed, how asset delivery may be associated with the programming, and how revenues should be shared. As described below, the present invention provides a mechanism for accommodating potentially conflicting interests or for enhancing overall value such that the interests of all stakeholders can be advanced.

Assets can be provided via a variety of distribution modes including real-time broadcast distribution, forward-and-store, and on-demand delivery such as VOD. Real-time broadcast delivery involves synchronous delivery of assets to multiple users such as the conventional paradigm for broadcast radio or television (e.g., airwave, cable or satellite). The forward-and-store mode involves delivery of assets ahead of time to CPEs with substantial storage resources, e.g., a DVR or data terminal. The asset is stored for later display, for example, as prompted by the user or controlled according to logic resident at the CPE and/or elsewhere in the communications network. The on-demand mode involves individualized delivery of assets from the network to a user, often on a pay-per-view basis. The present invention can be utilized in connection with any of these distribution modes or others. In this regard, important features of the present invention can be implemented using conventional CPEs without requiring substantial storage resources to enhance even real-time broadcast programming, for analog and digital users.

The amount of programming that can be delivered to users is limited by the available programming space. This, in turn, is a function of bandwidth. Thus, for example, cable television networks, satellite television networks, satellite radio networks, and other networks have certain bandwidth limitations. In certain broadcast networks, the available bandwidth may be divided into bandwidth portions that are used to transmit the programming for individual channels or stations. In addition, a portion of the available bandwidth may be utilized for bi-directional messaging, metadata transmissions and other network overhead. Alternately, such bi-directional communication may be accommodated by any appropriate communications channels, including the use of one or more separate communications networks. The noted bandwidth portions may be defined by dedicated segments, e.g., defined by frequency ranges, or may be dynamically configured, for example, in the case of packetized data networks. As will be described below, in one implementation, the present invention uses available (dedicated or opportunistically available) bandwidth for substantially real time transmission of assets, e.g., for targeted asset delivery with respect to a defined asset delivery spot. In this implementation, bi-directional communications may be accommodated by dedicated messaging bandwidth and by encoding messages within bandwidth used for asset delivery. A DOCSIS path or certain TELCO solutions using switched IP may be utilized for bi-directional communications between the headend and CPEs and asset delivery to the CPEs, including real-time asset delivery, in the systems described below.

Figure 2:
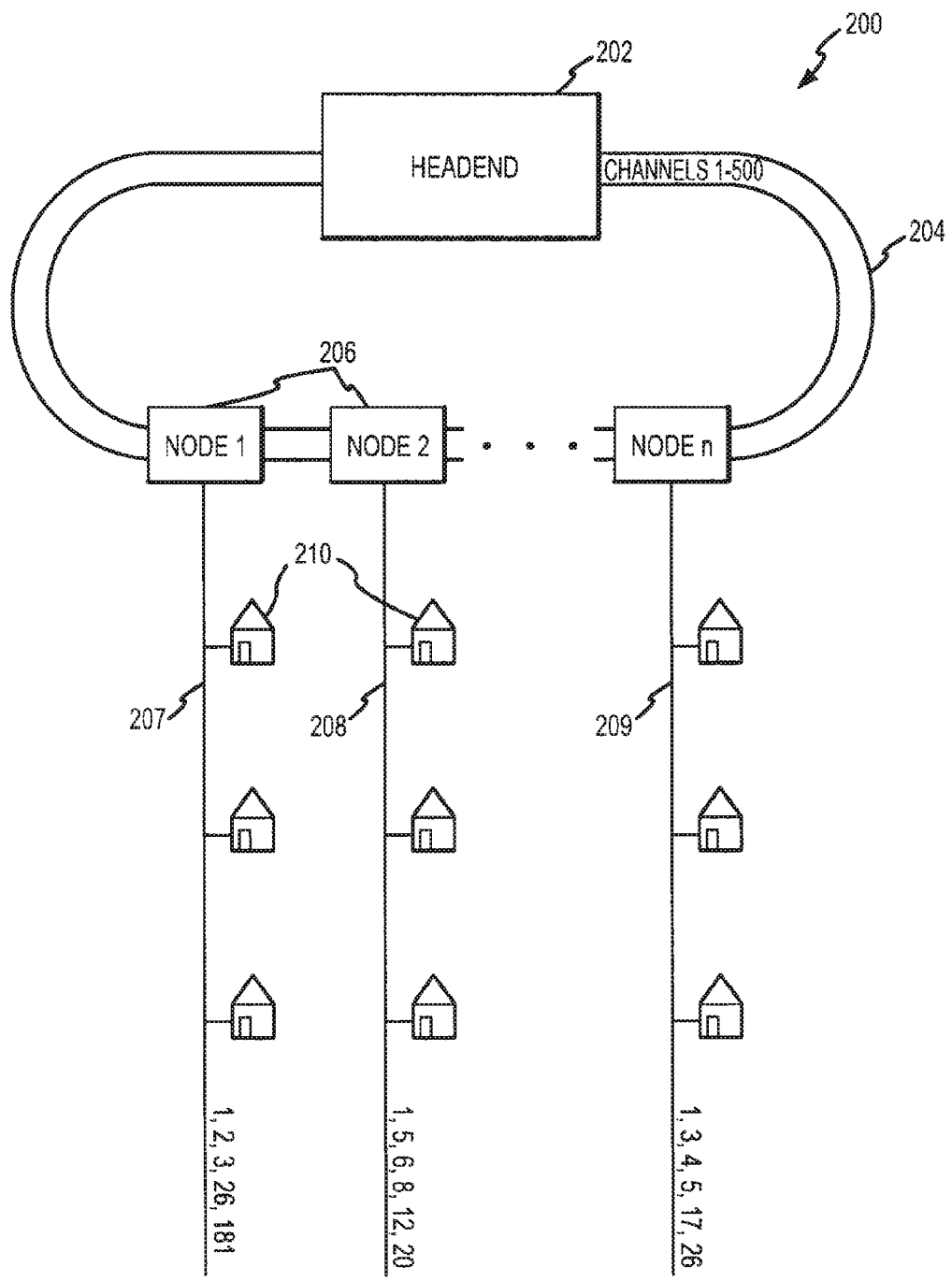
FIG. 2 illustrates bandwidth usage that is dynamically determined on a geographically dependent basis via networks.

It will be appreciated that bandwidth usage may be dynamically determined on a geographically dependent (or network subdivision dependent) basis. An example of this is networks, such as switched digital networks, including node filters as illustrated in FIG. 2. The illustrated network 200 includes a number of nodes 206 associated with a headend 202 via a high bandwidth link 204. The content stream transmitted from the headend 202 via the link 204 may include a large amount of content, for example, hundreds of video channels. Content is delivered from the various nodes 206 to individual CPEs 210 via local links 207-209 which may have a more limited bandwidth. For example, these local links 207-209 may include fiber optic and coaxial cable segments. As shown, communications between the headend 202 and CPEs 210 are bi-directional. Due to bandwidth considerations, each of the nodes 206 may include a node filter operative to transmit only a subset of the content from link 204 to the local links 207-209. In order to optimize use of the limited bandwidth, the subset may be different for each of the nodes 206. For example, a given channel may be transmitted via any one of the local links 207, 208 or 209 only upon request by a CPE 210 on that link. Thus, in the illustrated example, local link 207 transmits video channels 1, 2, 3, 26 and 181; local link 208 transmits video channels 1, 5, 6, 8, 12 and 20; and local link 209 transmits video channels 1, 3, 4, 5, 17 and 26.

Such node filters thereby provide a mechanism for optimizing the use of available bandwidth relative to the desires of users. However, such node filters may complicate the delivery of assets or affect the perception of network reach and thus impact the valuation of asset delivery in the context of the conventional asset delivery paradigm. That is, in some cases, a given network may not be immediately available to a user in a specific node area such that the user, in fact, cannot be reached for a given asset delivery spot. Perhaps as importantly, the fact that a reduced number of networks are passed to users in specific node areas may impact that perception of network reach and asset delivery value. Node filters also complicate tracking of targeted asset delivery given the dynamic nature of the network. As discussed below, the present invention allows for enhanced asset delivery even in networks implementing node filters. Indeed, the present invention takes advantage of node filters to identify available bandwidth for delivery of asset options.

B. Scheduling

What programming is available on particular channels or other bandwidth segments at particular times is determined by scheduling. Thus, in the context of a broadcast television network, individual programming networks, associated with particular programming channels, will generally develop a programming schedule well into the future, e.g., weeks or months in advance. This programming schedule is generally published to users so that users can find programs of interest. In addition, this programming schedule is used by asset providers to select desired asset delivery spots.

Asset delivery is also scheduled. That is, breaks are typically built into or otherwise provided in programming content. In the case of recorded content, the breaks are predefined. Even in the case of live broadcasts, breaks are built-in. Thus, the number and duration of breaks is typically known in advance, though the exact timing of the spots may vary to some extent. However, this is not always the case. For example, if sporting events go into overtime, the number, duration and timing of breaks may vary dynamically. As discussed below, the system of the present invention can handle real-time delivery of assets for updated breaks. In connection with regularly scheduled breaks, as discussed below, defined avail windows establish the time period during which certain breaks or spots occur, and a cue tone or cue message signals the beginning of such breaks or spots. In practice, an avail window may be as long as or longer than a program and include all associated breaks. Indeed, avail windows may be several hours long, for example, in cases where audience demographics are not expected to change significantly over large programming blocks. In this regard, an MSO may merge multiple avail windows provided by programming networks.

More specifically, a break may include a series of asset delivery spots and the content of a break may be determined by a number of entities. For example, some asset delivery is distributed on a basis coextensive with network programming, e.g., on a national basis. This asset delivery is conventionally scheduled based on a timed playlist. That is, the insertion of content is centrally controlled to insert assets at defined times. Accordingly, the programming and national asset delivery may be provided by the programming networks as a continuous content stream without cues for asset insertion. For example, prime-time programming on the major networks is often principally provided in this fashion.

In other cases, individual spots within a break are allocated for Regional Operations Center (ROC), affiliate, super headend or local (headend, zone) content. In these cases, a cue tone or message identifies the start of the asset delivery spot or spots (a series of assets in a break may all trigger from one cue). The cue generally occurs a few seconds before the start of the asset delivery insertion opportunity and may occur, for example, during programming or during the break (e.g., during a national ad). The system of the present invention can be implemented at any or all levels of this hierarchy to allow for targeting with respect to national, regional and local assets. In the case of regional or local targeted asset delivery, synchronous asset options (as discussed below) may be inserted into designated bandwidth in response to cues. In the case of national asset delivery, network signaling may be extended to provide signals identifying the start of a national spot or spots, so as to enable the inventive system to insert synchronous national asset options into designated bandwidth. For example, such signaling may be encrypted for use only by the inventive targeted asset system.

Network operators or local network affiliates can generally schedule the non-national assets to be included within defined breaks or spots for each ad-supported channel. Conventionally, this scheduling is finalized ahead of time, typically on a daily or longer basis. The scheduled assets for a given break are then typically inserted at the headend in response to the cue tone or message in the programming stream. Thus, for example, where a given avail window includes three breaks (each of which may include a series of spots), the scheduled asset for the first break is inserted in response to the first cue, the scheduled asset for the second break is inserted in response to the second cue, and the scheduled asset for the third break is inserted in response to the third cue. If a cue is missed, all subsequent assets within an avail window may be thrown off.

It will be appreciated that such static, daily scheduling can be problematic. For example, the programming schedule can often change due to breaking news, ripple effects from schedule over-runs earlier in the day or the nature of the programming. For example, certain live events such as sporting events are difficult to precisely schedule. In such cases, static asset delivery schedules can result in a mismatch of scheduled asset to the associated programming. For example, when a high value programming event such as a certain sporting event runs over the expected program length, it may sometimes occur that assets intended for another program or valued for a smaller audience may be shown when a higher value or better-tailored asset could have been used if a more dynamic scheduling regime were available. The present invention allows for such dynamic scheduling as will be discussed in more detail below. The invention can also accommodate evolving standards in the field of dynamic scheduling.

C. The Conventional Asset Delivery Paradigm

Conventional broadcast networks may include asset-supported and premium content channels/networks. As noted above, programming content generally comes at a substantial cost. That is, the programming providers expect to be compensated for the programming that they provide which has generally been developed or acquired at significant cost. That compensation may be generated by asset delivery revenues, by fees paid by users for premium channels, or some combination of the two. In some cases, funding may come from another source such as public funding.

In the case of asset-supported networks, the conventional paradigm involves time-slot buys. Specifically, asset providers generally identify a particular program or time-slot on a particular network where they desire their assets to be aired. The cost for the airing of the asset depends on a number of factors, but one primary factor is the size of the audience for the programming in connection with which the asset is aired. Thus, the standard pricing model is based on the cost per thousand viewers (CPM), though other factors such as demographics or audience composition are involved as discussed below. The size of the audience is generally determined based on ratings. The most common benchmark for establishing these ratings is the system of Nielsen Media Research Corporation (Nielsen). One technique used by Nielsen involves monitoring the viewing habits of a presumably statistically relevant sampling of the universe of users. Based on an analysis of the sample group, the Nielsen system can estimate what portion of the audience particular programs received and, from this, an estimated audience size for the program can be projected. Thus, the historical performance of the particular program, for example, as estimated by the Nielsen system, may be used to set asset delivery prices for future breaks associated with that program.

Figure 4:
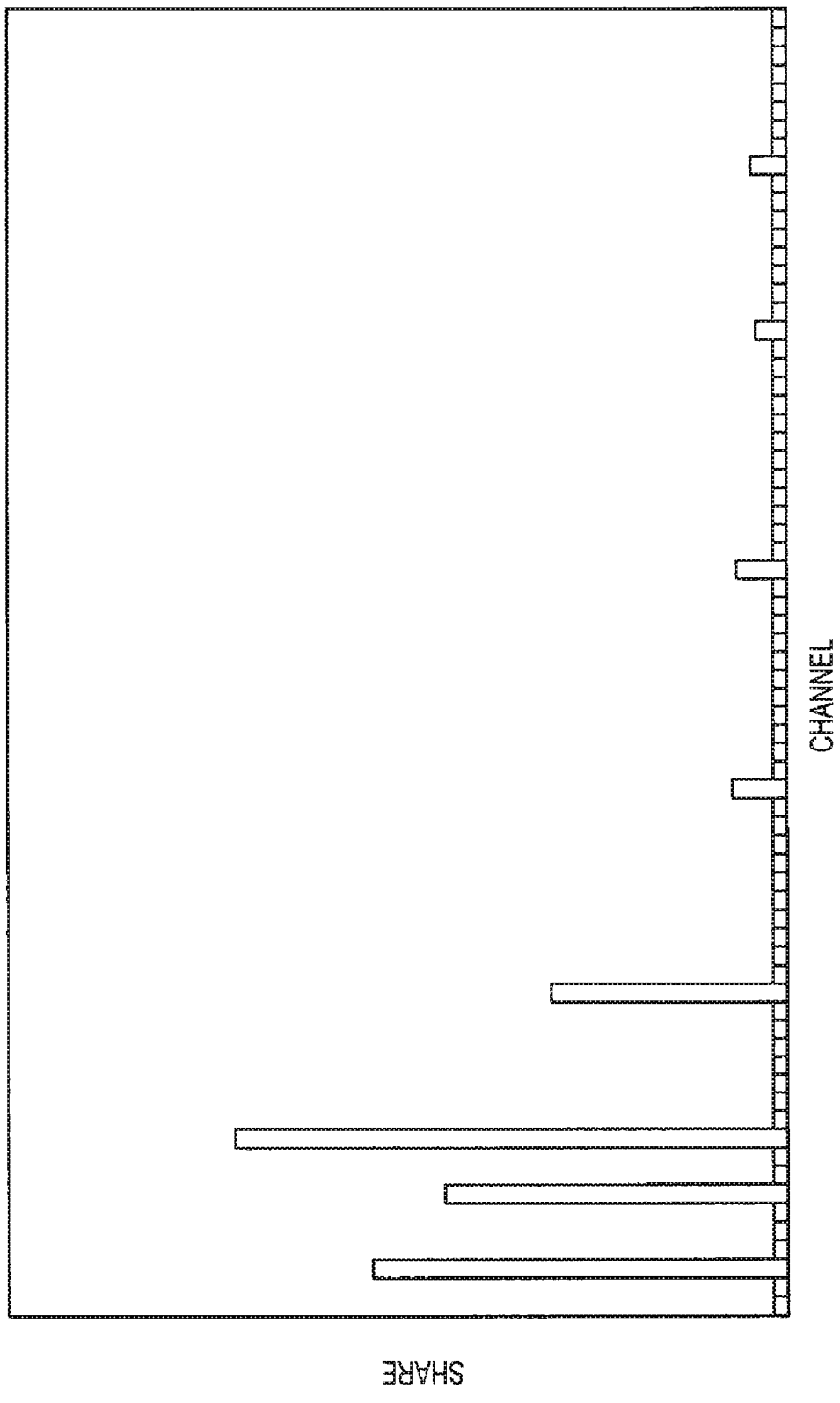
FIG. 4 illustrates an exemplary audience shares of various networks as may be used to set asset delivery prices for future breaks associated with the program.

In practice, this results in a small number of programming networks being responsible for generating a large portion of the overall asset revenues. This is graphically depicted in FIG. 4 which generally illustrates this phenomenon, although it is not based on actual numbers. As shown in FIG. 4, it is often the case that three or four programming networks out of many available programming networks garner very large shares whereas the remaining programming networks have small or negligible share. Indeed, in some cases, many programming networks will have a share that is so small that it is difficult to statistically characterize based on typical Nielsen sampling group sizes. In these cases, substantial asset revenues may be generated in connection with the small number of programming networks having a significant share while very little revenue is generated with respect to the other programming networks. This is true even though the other programming networks, in the aggregate, may have a significant number of users in absolute terms. Thus, the conventional paradigm often fails to generate revenues commensurate with the size of the total viewing audience serviced by the network operator. As discussed below, this is a missed revenue opportunity that can be addressed in accordance with the present invention.

As noted above, the pricing for asset delivery depends on the size of the viewing audience and certain other factors. One of those factors relates to the demographics of interest to the asset provider. In this regard, a given program will generally have a number of different ratings for different demographic categories. That is, the program generally has not only a household rating, which is measured against the universe of all households with televisions, but also a rating for different demographic categories (e.g., males 18-24), measured against the universe of all members of the category who have televisions. Thus, the program may have a rating of 1 (1%) overall and a rating of 2 (2%) for a particular category. Typically, when asset providers buy a time-slot, pricing is based on a rating or ratings for the categories of interest to the asset provider. This results in significant inefficiencies due to poor matching of the audience to the desired demographics.

Figure 3:
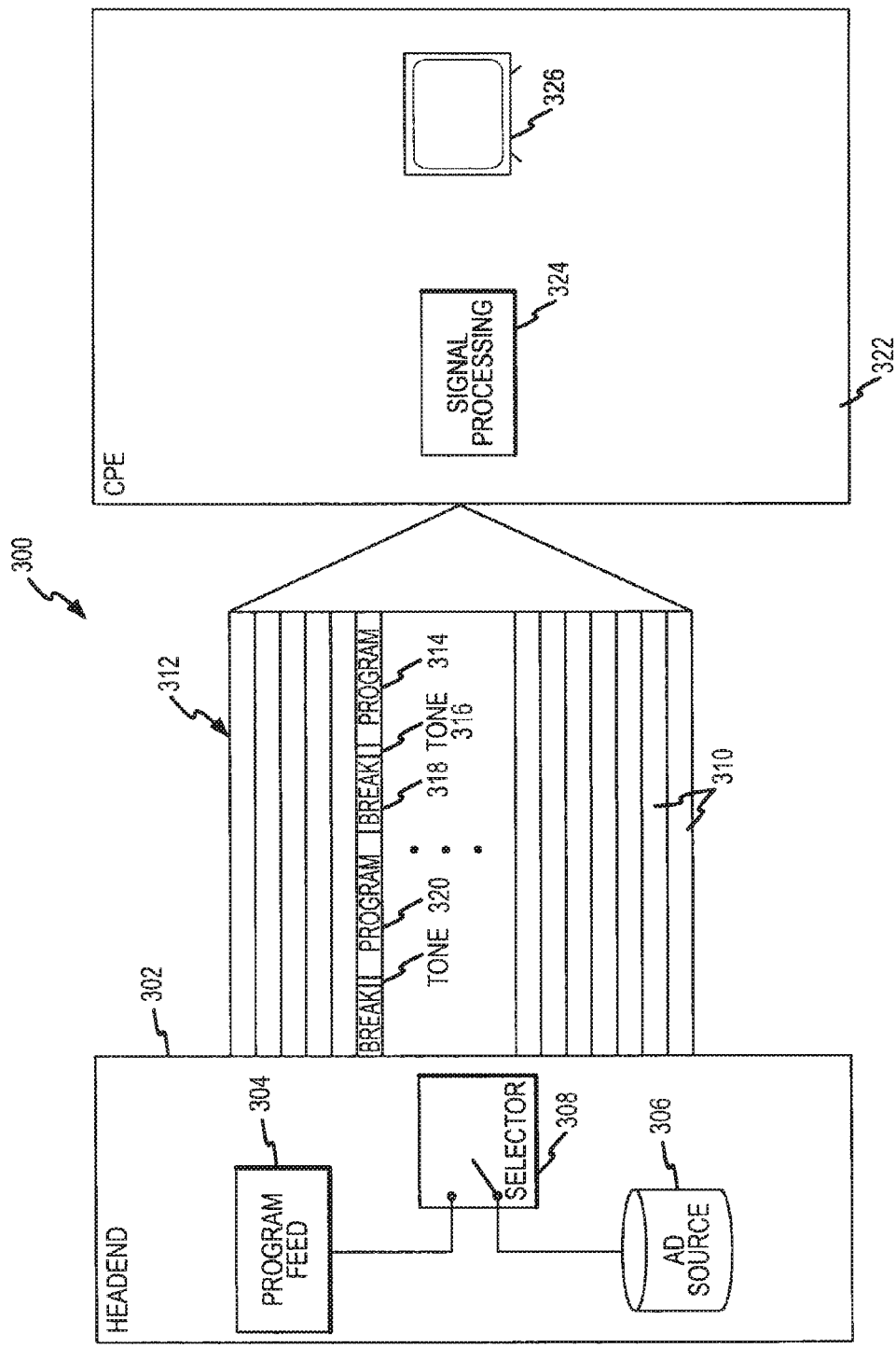
FIG. 3 illustrates asset insertion as accomplished at a headend.

Conventionally, asset insertion is accomplished at the headend. This is illustrated in FIG. 3. In the illustrated system 300, the headend 302 includes a program feed 304 and an asset source 306. As noted above, the program feed 304 may be associated with a variety of programming sources such as video storage, an antenna, satellite dish or fiber feed from a studio or the like. The asset source 306 may include a tape library or other storage system for storing pre-recorded assets. A platform associated with the headend 302—in this case, denoted a selector 308—inserts programming from the program feed 304 and assets from the asset source 306 into the video stream of an individual channel 310. This is done for each channel to define the overall content 312 that is distributed to subscribers (or at least to a node filter). Typically, although not necessarily, the selector 308 effectively toggles between the program feed 304 and the asset source 306 such that the programming and assets are inserted in alternating, non-time overlapping fashion. Thus, as shown in FIG. 3, a particular channel may include a time segment 314 of programming followed by a cue tone 316 (which may occur, for example, during a programming segment, or during a time period of an asset provided with the programming stream, just prior to an insertion opportunity) to identify the initiation of a break 318. In response to the tone, the selector 308 is operative to insert assets into the programming stream for that channel. At the conclusion of the break 318, the selector 308 returns to the program feed to insert a further programming segment 320. An example of a timeline in this regard is shown in FIG. 15.

This content 312 or a filtered portion thereof is delivered to CPEs 322. In the illustrated embodiment the CPE 322 is depicted as including a signal processing component 324 and a television display 326. It will be appreciated that these components 324 and 326 may be embodied in a single device and the nature of the functionality may vary. In the case of a digital cable user, the signal processing component 324 may be incorporated into a digital set top box (DSTB) for decoding digital signals. Such boxes are typically capable of bi-directional messaging with the headend 302 which will be a significant consideration in relation to functionality described below.

II. System Overview

A. The Targeted Asset Delivery Environment

Against this backdrop described in the context of the conventional asset delivery paradigm, a system embodying the present invention is described below. The inventive system, in the embodiments described below, allows for delivery of targeted assets such as advertising so as to address certain shortcomings or inefficiencies of conventional broadcast networks. Generally, such targeting entails delivering assets to desired groups of individuals or individuals having desired characteristics. These characteristics or audience classification parameters may be defined based on personal information, demographic information, psychographic information, geographic information, or any other information that may be relevant to an asset provider in identifying a target audience. Preferably, such targeting is program independent in recognition that programming is a highly imperfect mechanism for targeting of assets. For example, even if user analysis indicates that a particular program has an audience comprised sixty percent of women, and women comprise the target audience for a particular asset, airing on that program will result in a forty percent mismatch. That is, forty percent of the users potentially reached may not be of interest to the asset provider and pricing may be based only on sixty percent of the total audience. Moreover, ideally, targeted asset delivery would allow for targeting with a range of granularities including very fine granularities. For example, it may be desired to target a group, such as based on a geographical grouping, a household characterization or even an individual user characterization. The present invention accommodates program independent targeting, targeting with a high degree of granularity and targeting based on a variety of different audience classifications.

Figure 5:
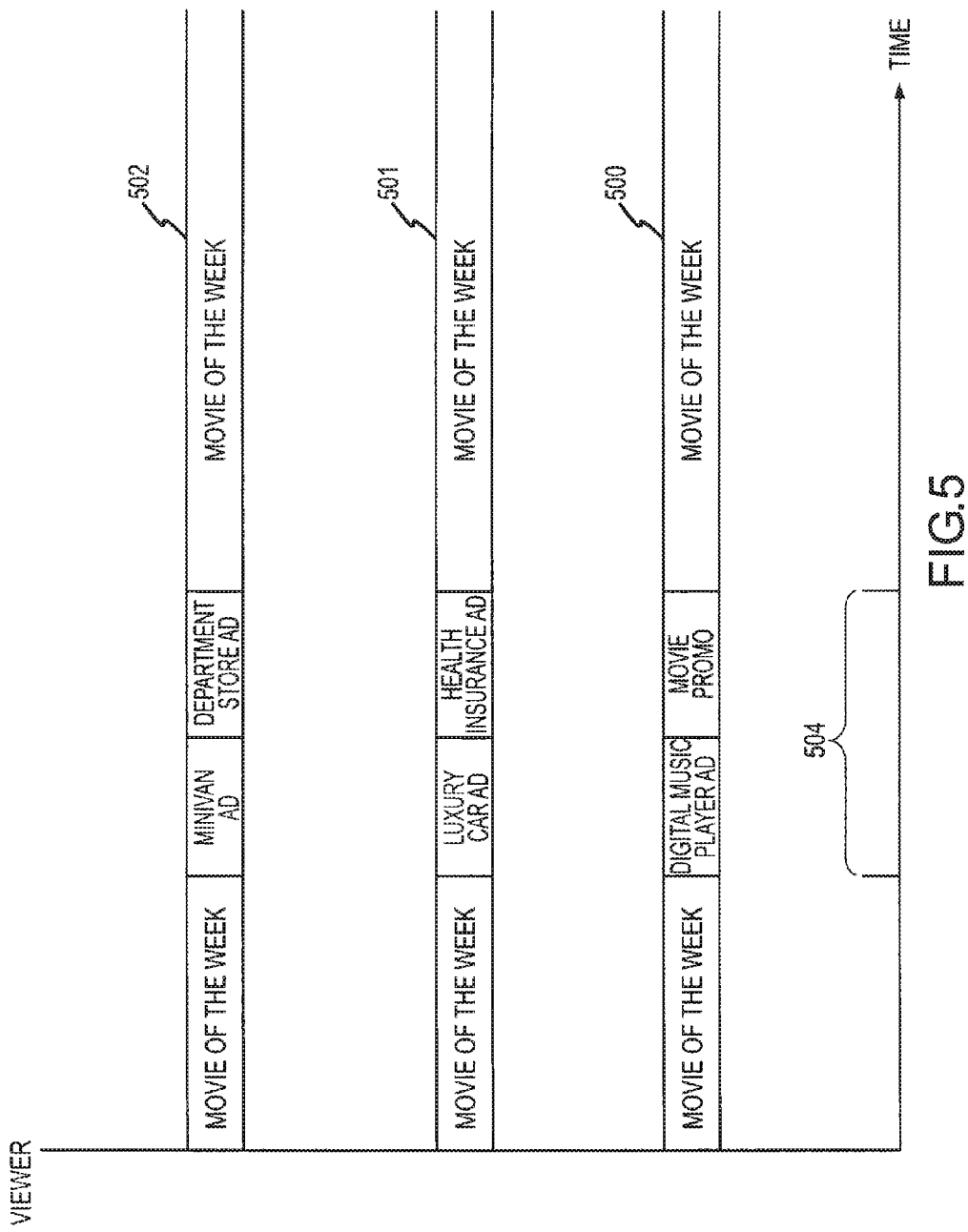
FIG. 5 illustrates delivery of assets to different users watching the same programming channel.
Figure 6:
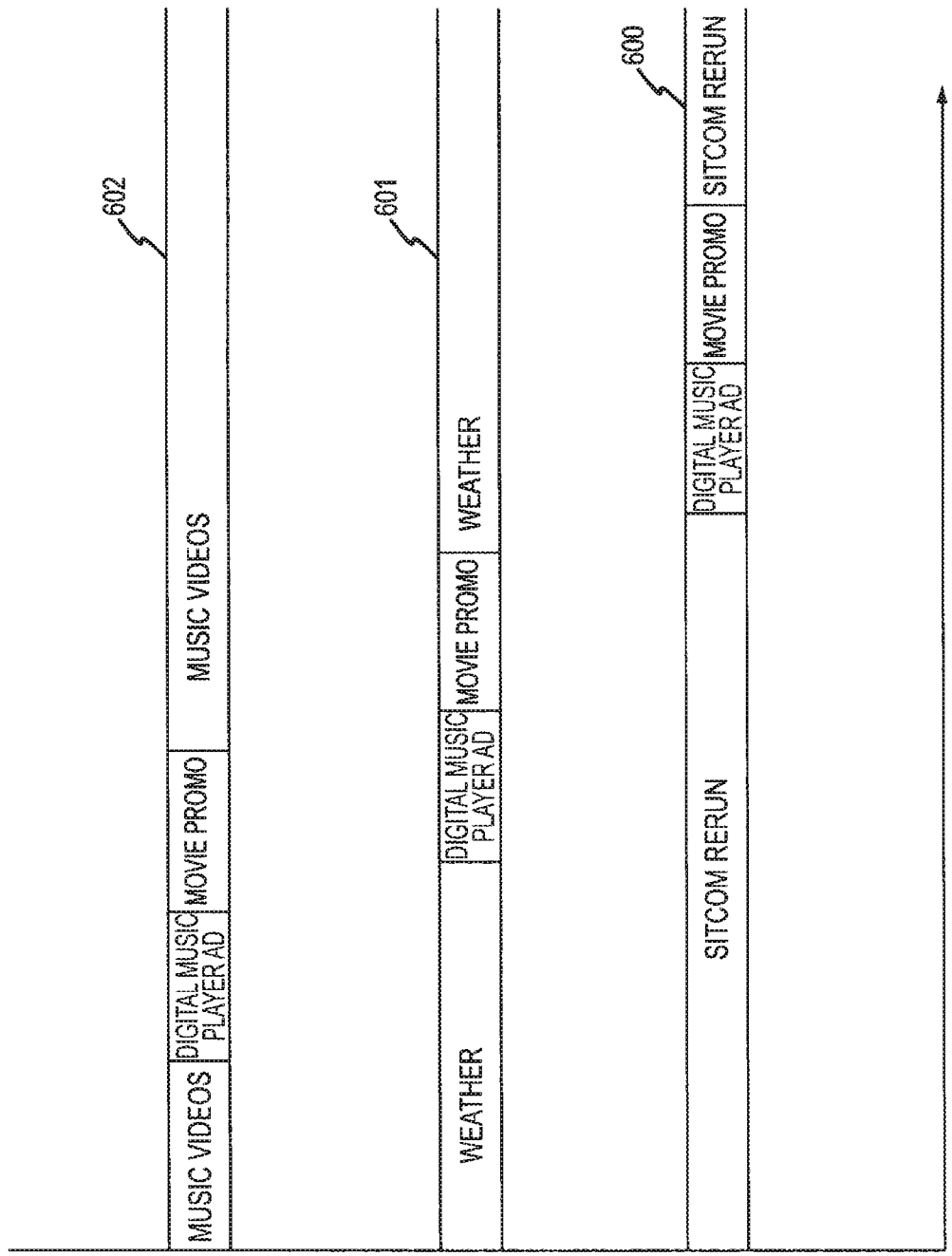
FIG. 6 illustrates audience aggregation across.

FIGS. 5 and 6 illustrate two different contexts of targeted asset delivery supported in accordance with the present invention. Specifically, FIG. 5 illustrates the delivery of different assets, in this case ads, to different users watching the same programming channel, which may be referred to as spot optimization. As shown, three different users 500-502 are depicted as watching the same programming, in this case, denoted "Movie of the Week." At a given break 504 the users 500-502 each receive a different asset package. Specifically, user 500 receives a digital music player ad and a movie promo, user 501 receives a luxury car ad and a health insurance ad, and user 502 receives a minivan ad and a department store ad. Alternately, a single asset provider (e.g., a motor vehicle company) may purchase a spot and then provide different asset options for the spot (e.g., sports car, minivans, pickup trucks, etc.). Similarly, separate advertisers may collectively purchase a spot and then provide ads for their respective products (e.g., where the target audiences of the advertisers are complementary). It will be appreciated that these different asset packages may be targeted to different audience demographics. In this manner, assets are better tailored to particular viewers of a given program who may fall into different demographic groups. Thus, spot optimization refers to the delivery of different assets (by one or multiple asset providers) in a given spot.

FIG. 6 illustrates a different context of the present invention, which may be termed audience aggregation. In this case, three different users 600-602 viewing different programs associated with different channels may receive the same asset or asset package. In this case, each of the users 600-602 receives a package including a digital music player ad and a movie promo in connection with breaks associated with their respective channels. Though the users 600-602 are shown as receiving the same asset package for purposes of illustration, it is likely that different users will receive different combinations of assets due to differences in classification parameters. In this manner, users over multiple channels (some or all users of each channel) can be aggregated (relative to a given asset and time window) to define a virtual channel having significant user numbers matching a targeted audience classification. Among other things, such audience aggregation allows for the possibility of aggregating users over a number of low share channels to define a significant asset delivery opportunity, perhaps on the order of that associated with one of the high share networks. This can be accomplished, in accordance with the present invention, using equipment already at a user's premises (i.e., an existing CPE). Such a virtual channel is graphically illustrated in FIG. 7, though this illustration is not based on actual numbers. Thus, audience aggregation refers to the delivery of the same asset in different spots to define an aggregated audience. These different spots may occur within a time window corresponding to overlapping (conflicting) programs on different channels. In this manner, it is likely that these spots, even if at different times within the window, will not be received by the same users.

Figure 8:
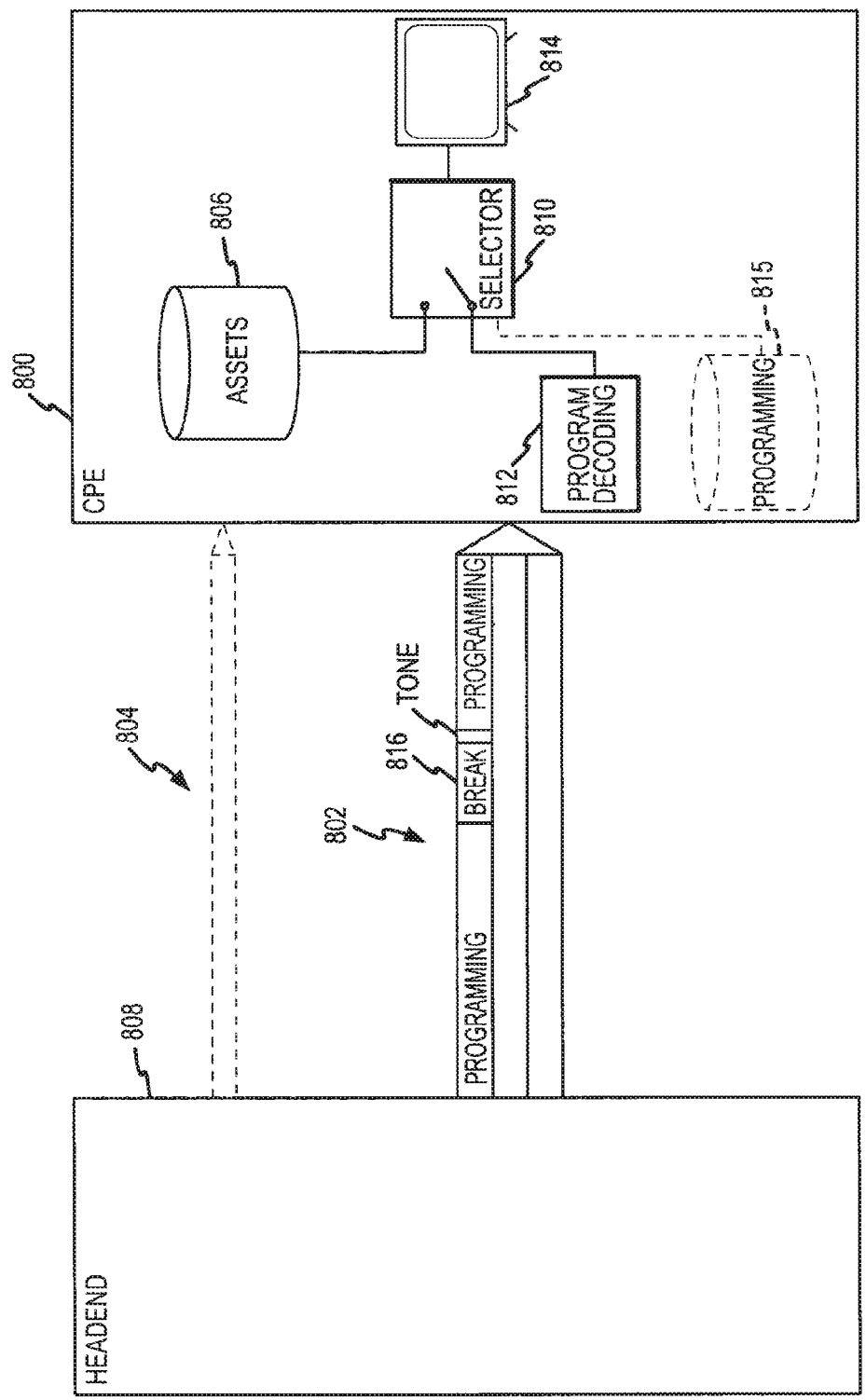
FIG. 8 illustrates targeted asset insertion being implemented at Customer Premises Equipment (CPEs).

Such targeting including both spot optimization and audience aggregation can be implemented using a variety of architectures in accordance with the present invention. Thus, for example, as illustrated in FIG. 8, targeted asset insertion can be implemented at the CPEs. This may involve a forward-and-store functionality. As illustrated in FIG. 8, the CPE 800 receives a programming stream 802 and an asset delivery stream 804 from the headend 808. These streams 802 and 804 may be provided via a common signal link such as a coaxial cable or via separate communications links. For example, the asset delivery stream 804 may be transmitted to the CPE 800 via a designated segment, e.g., a dedicated frequency range, of the available bandwidth or via a programming channel that is opportunistically available for asset delivery, e.g., when it is otherwise off air. The asset delivery stream 804 may be provided on a continuous or intermittent basis and may be provided concurrently with the programming stream 802. In the illustrated example, the programming stream 802 is processed by a program decoding unit 812, such as DSTB, and programming is displayed on television set 814. Alternatively, the programming stream 802 may be stored in programming storage 815 for CPE insertion.

In the illustrated implementation, the asset, together with metadata identifying, for example, any audience classification parameters of the targeted audience, is stored in a designated storage space 806 of the CPE 800. It will be appreciated that substantial storage at the CPE 800 may be required in this regard. For example, such storage may be available in connection with certain digital video recorder (DVR) units. A selector 810 is implemented as a processor running logic on the CPE 800. The selector 810 functions analogously to the headend selector described above to identify breaks 816 and insert appropriate assets. In this case, the assets may be selected based on classification parameters of the household or, more preferably, a user within the household. Such information may be stored at the CPE 800 or may be determined based on an analysis of viewing habits such as a click stream from a remote control as will be described in more detail below. Certain aspects of the present invention can be implemented in such a CPE insertion environment.

Figure 9:
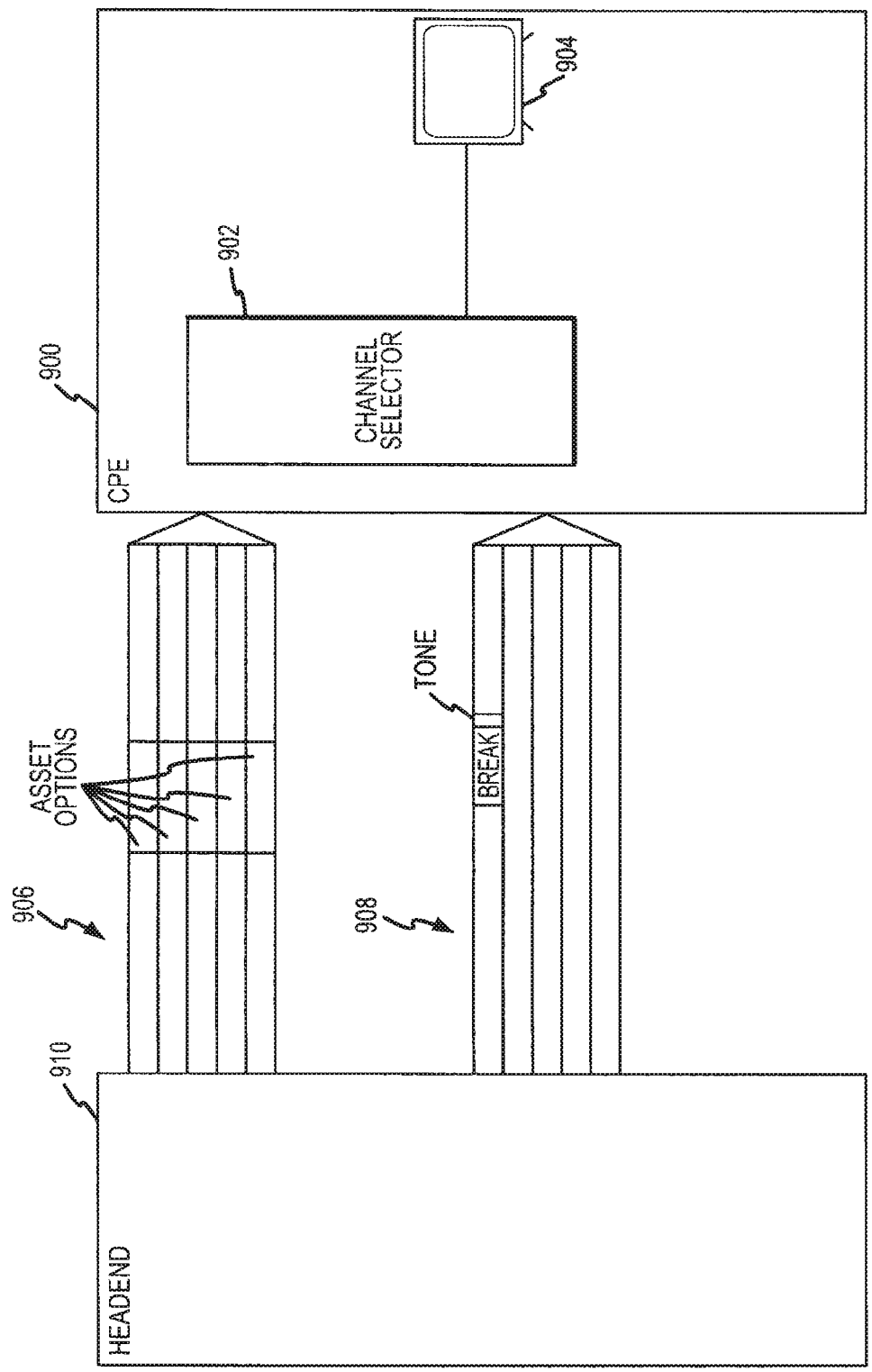
FIG. 9 illustrates asset options being transmitted from a headend on separate asset channels.

In FIG. 9, a different architecture is employed. Specifically, in FIG. 9, asset options transmitted from headend 910 synchronously with a given break on a given channel for which targeted asset options are supported. The CPE 900 includes a channel selector 902 which is operative to switch to an asset channel associated with a desired asset at the beginning of a break and to return to the programming channel at the end of the break. The channel selector 902 may hop between channels (between asset channels or between an asset channel and the programming channel) during a break to select the most appropriate assets. In this regard, logic resident on the CPE 900 controls such hopping to avoid switching to a channel where an asset is already in progress. As described below, this logic can be readily implemented, as the schedule of assets on each asset channel is known. Preferably, all of this is implemented invisibly from the perspective of the user of set 904. The different options may be provided, at least in part, in connection with asset channels 906 or other bandwidth segments (separate from programming channels 908) dedicated for use in providing such options. In addition, certain asset options may be inserted into the current programming channel 908. Associated functionality is described in detail below. The architecture of FIG. 9 has the advantage of not requiring substantial storage resources at the CPE 900 such that it can be immediately implemented on a wide scale basis using equipment that is already in the field.

As a further alternative, the determination of which asset to show may be made at the headend. For example, an asset may be selected based on voting as described below, and inserted at the headend into the programming channel without options on other asset channels. This would achieve a degree of targeting but without spot optimization opportunities as described above. Still further, options may be provided on other asset channels, but the selection as between those channels may be determined by the headend. For example, information about a household or user (e.g., brand of car owned, magazines subscribed to, etc.) stored on the headend may be used to match an asset to a household or user. That information, which may be termed "marketing labels," may be used by the headend to control which asset is selected by the CPE. For example, the CPE may be instructed that it is associated with an "ACME preferred" customer. When an asset is disseminated with ACME preferred metadata, the CPE may be caused to select that asset, thereby overriding (or significantly factoring with) any other audience classification considerations. However, it will be appreciated that such operation may entail certain concerns relating to sensitive information or may compromise audience classification based targeting in other respects.

A significant opportunity thus exists to better target users whom asset providers may be willing to pay to reach and to better reach hard-to-reach users. However, a number of challenges remain with respect to achieving these objectives including: how to provide asset options within network bandwidth limitations and without requiring substantial storage requirements and new equipment at the user's premises; how to obtain sufficient information for effective targeting while addressing privacy concerns; how to address a variety of business related issues, such as pricing of asset delivery, resulting from availability of asset options and attendant contingent delivery; and how to operate effectively within the context of existing network structure and systems (e.g., across node filters, using existing traffic and billing systems, etc.).

From the foregoing it will be appreciated that various aspects of the invention are applicable in the context of a variety of networks, including broadcast networks. In the following discussion, specific implementations of a targeted asset system are discussed in the context of a cable television network. Though the system enhances viewing for both analog and digital users, certain functionality is conveniently implemented using existing DSTBs. It will be appreciated that, while these represent particularly advantageous and commercially valuable implementations, the invention is not limited to these specific implementations or network contexts.

B. System Architecture

In one implementation, the system of the present invention involves the transmission of asset options in time alignment or synchronization with other assets on a programming channel, where the asset options are at least partially provided via separate bandwidth segments, e.g. channels at least temporarily dedicated to targeted asset delivery. Although such options may typically be transmitted in alignment with a break in programming, it may be desired to provide options opposite continuing programming (e.g., so that only subscribers in a specified geographic area get a weather announcement, an emergency announcement, election results or other local information while others get uninterrupted programming). Selection as between the available options is implemented at the user's premises, as by a DSTB in this implementation. In this manner, asset options are made available for better targeting, without the requirement for substantial storage resources or equipment upgrades at the user's premises (e.g., as might be required for a forward-and-store architecture). Indeed, existing DSTBs can be configured to execute logic for implementing the system described below by downloading and/or preloading appropriate logic.

Because asset options are synchronously transmitted in this implementation, it is desirable to be efficient in identifying available bandwidth and in using that bandwidth. Various functionality for improved bandwidth identification, e.g., identifying bandwidth that is opportunistically available in relation to a node filter, is described later in this discussion. Efficient use of available bandwidth involves both optimizing the duty cycle or asset density of an available bandwidth segment (i.e., how much time, of the time a bandwidth segment is available for use in transmitting asset options, is the segment actually used for transmitting options) and the value of the options transmitted. The former factor is addressed, among other things, by improved scheduling of targeted asset delivery on the asset channels in relation to scheduled breaks of the programming channels.

Figure 10:
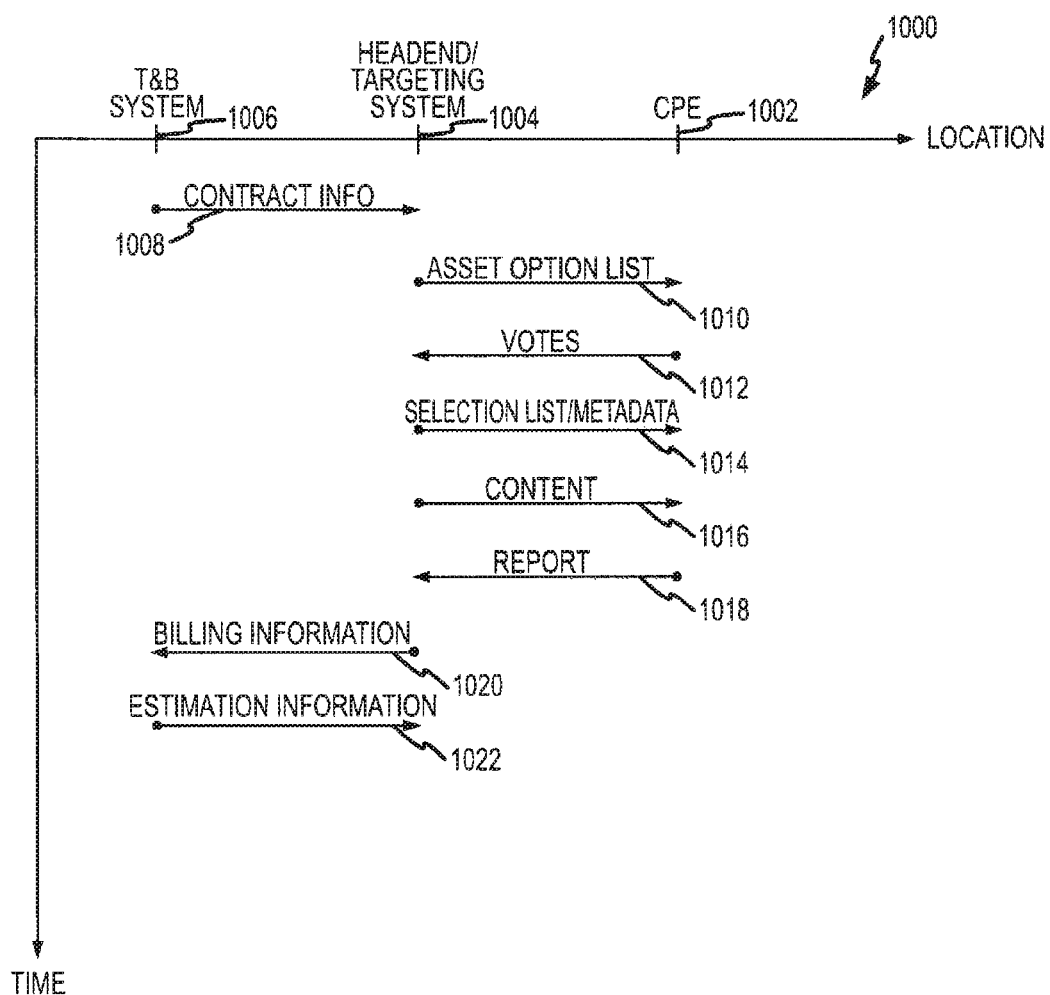
FIG. 10 illustrates a messaging sequence between a CPE, a network platform, and a traffic and billing (T&B) system.

The latter factor is addressed in part by populating the available bandwidth spots with assets that are most desired based on current network conditions. These most desired assets can be determined in a variety of ways including based on conventional ratings. In the specific implementation described below, the most desired assets are determined via a process herein termed voting. FIG. 10 illustrates an associated messaging sequence 1000 in this regard as between a CPE 1002 such as a DSTB, a network platform for asset insertion such as a headend 1004 and a traffic and billing (T&B) system 1006 used in the illustrated example for obtaining asset delivery orders or contracts and billing for asset delivery. It will be appreciated that the functionality of the T&B system 1006 may be split between multiple systems running on multiple platforms and the T&B system 1006 may be operated by the network operator or may be separately operated.

The illustrated sequence begins by loading contract information 1008 from the T&B system 1006 onto the headend 1004. An interface associated with system 1006 allows asset providers to execute contracts for dissemination of assets based on traditional time-slot buys (for a given program or given time on a given network) or based on a certain audience classification information (e.g., desired demographics, psychographics, geography, and/or audience size). In the latter case, the asset provider or network may identify audience classification information associated with a target audience. The system 1006 uses this information to compile the contract information 1008 which identifies the asset that is to be delivered together with delivery parameters regarding when and to whom the asset is to be delivered.

The illustrated headend 1004 uses the contract information together with a schedule of breaks for individual networks to compile an asset option list 1010 on a channel-by-channel and break-by-break basis. That is, the list 1010 lists the universe of asset options that are available for voting purposes for a given break on a given programming channel together with associated metadata identifying the target audience for the asset, e.g., based on audience classification information. The transmitted list 1010 may encompass all supported programming channels and may be transmitted to all participating users, or the list may be limited to one or a subset of the supported channels e.g., based on an input indicating the current channel or the most likely or frequent channels used by a particular user or group of users. The list 1010 is transmitted from the headend 1004 to the CPE 1002 in advance of a break for which options are listed.

Based on the list 1010, the CPE 1002 submits a vote 1012 back to the headend 1004. More specifically, the CPE 1002 first identifies the classification parameters for the current user(s) and perhaps the current channel being watched, identifies the assets that are available for an upcoming break (for the current channel or multiple channels) as well as the target audience for those assets and determines a "fit" of one or more of those asset options to the current classification. In one implementation, each of the assets is attributed a fit score for the user(s), e.g., based on a comparison of the audience classification parameters of the asset to the putative audience classification parameters of the current user(s). This may involve how well an individual user classification parameter matches a corresponding target audience parameter and/or how many of the target audience parameters are matched by the user's classification parameters. Based on these fit scores, the CPE 102 issues the vote 1012 indicating the most appropriate asset(s). Any suitable information can be used to provide this indication. For example, all scores for all available asset options (for the current channel or multiple channels) may be included in the vote 1012. Alternatively, the vote 1012 may identify a subset of one or more options selected or deselected by the CPE 1002, with or without scoring information indicating a degree of the match and may further include channel information. In one implementation, the headend 1004 instructs CPEs (1002) to return fit scores for the top N asset options for a given spot, where N is dynamically configurable based on any relevant factor such as network traffic levels and size of the audience. Preferably, this voting occurs shortly before the break at issue such that the voting more accurately reflects the current status of network users. In one implementation, votes are only submitted for the programming channel to which the CPE is set, and votes are submitted periodically, e.g., every fifteen minutes.

The headend 1004 compiles votes 1012 from CPEs 1002 to determine a set of selected asset options 1014 for a given break on a supported programming channel. As will be understood from the description below, such votes 1012 may be obtained from all relevant and participating CPEs 1002 (who may be representative of a larger audience including analog or otherwise non-participating users) or a statistical sampling thereof. In addition, the headend 1004 determines the amount of bandwidth, e.g., the number of dedicated asset option channels, that are available for transmission of options in support of a given break for a given programming channel.

Based on all of this information, the headend 1004 assembles a flotilla of assets, e.g.; the asset options having the highest vote values or the highest weighted vote values where such weighting takes into account value per user or other information beyond classification fit. Such a flotilla may include asset options inserted on the current programming channel as well as on asset channels, though different insertion processes and components may be involved for programming channel and asset channel insertion. It will be appreciated that some assets may be assembled independently or largely independently of voting, for example, certain public service spots or where a certain provider has paid a premium for guaranteed delivery. Also, in spot optimization contexts where a single asset provider buys a spot and then provides multiple asset options for that spot, voting may be unnecessary (though voting may still be used to select the options).

In one implementation, the flotilla is assembled into sets of asset options for each dedicated asset channel, where the time length of each set matches the length of the break, such that channel hopping within a break is unnecessary. Alternatively, the CPE 1002 may navigate between the asset channels to access desired assets within a break (provided that asset starts on the relevant asset channels are synchronized). However, it will be appreciated that the flotilla matrix (where columns include options for a given spot and rows correspond to channels) need not be rectangular. Stated differently, some channels may be used to provide asset options for only a portion of the break, i.e., may be used at the start of the break for one or more spots but are not available for the entire break, or may only be used after one or more spots of a break have aired. A list of the selected assets 1014 and the associated asset channels is then transmitted together with metadata identifying the target audience in the illustrated implementation. It will be appreciated that it may be unnecessary to include the metadata at this step if the CPE 1002 has retained the asset option list 1010. This list 1014 is preferably transmitted shortly in advance of transmission of the asset 1016 (which includes sets of asset options for each dedicated contact options channel used to support, at least in part, the break at issue).

The CPE 1002 receives the list of selected asset options 1014 and associated metadata and selects which of the available options to deliver to the user(s). For example, this may involve a comparison of the current audience classification parameter values (which may or may not be the same as those used for purposes of voting) to the metadata associated with each of the asset options. The selected asset option is used to selectively switch the CPE 1002 to the corresponding dedicated asset options channel to display the selected asset 1016 at the beginning of the break at issue. One of the asset option sets, for example, the one comprised of the asset receiving the highest vote values, may be inserted into the programming channel so that switching is not required for many users. Assuming that the voting CPEs are at least somewhat representative of the universe of all users, a significant degree of targeting is thereby achieved even for analog or otherwise non-participating users. In this regard, the voters serve as proxies for non-voting users. The CPE 1002 returns to the programming channel at the conclusion of the break. Preferably, all of this is transparent from the perspective of the user(s), i.e., preferably no user input is required. The system may be designed so that any user input overrides the targeting system. For example, if the user changes channels during a break, the change will be implemented as if the targeting system was not in effect (e.g., a command to advance to the next channel will set the CPE to the channel immediately above the current programming channel, without regard to any options currently available for that channel, regardless of the dedicated asset channel that is currently sourcing the television output).

In this system architecture, as in forward-and-store architectures or any other option where selections between asset options are implemented at the CPE, there will be some uncertainty as to how many users or households received any particular asset option in the absence of reporting. This may be tolerable from a business perspective. In the absence of reporting, the audience size may be estimated based on voting data, conventional ratings analysis and other tools. Indeed, in the conventional asset delivery paradigm, asset providers accept Nielsen rating estimates and demographic information together with market analysis to gauge return on investment. However, this uncertainty is less than optimal in any asset delivery environment and may be particularly problematic in the context of audience aggregation across multiple programming networks, potentially including programming networks that are difficult to measure by conventional means.

The system of the present invention preferably implements a reporting system by which individual CPEs 1002 report back to the headend 1004 what asset or assets were delivered at the CPE 1002 and, optionally, to whom (in terms of audience classification). Additionally, the reports may indicate where (on what programming channel) the asset was delivered and how much (if any) of the asset was consumed. Such reports 1018 may be provided by all participating CPEs 1002 or by a statistical sampling thereof. These reports 1018 may be generated on a break-by-break basis, periodically (e.g., every 15 minutes) or may be aggregated prior to transmission to the headend 1004. Reports may be transmitted soon after delivery of the assets at issue or may be accumulated, e.g., for transmission at a time of day where messaging bandwidth is more available. Moreover, such reporting may be coordinated as between the CPEs 1002 so as to spread the messaging load due to reporting.

In any case, the reports 1018 can be used to provide billing information 1020 to the T&B system 1006 for valuing the delivery of the various asset options. For example, the billing information 1020 can be used by the T&B system 1006 to determine how large an audience received each option and how well that audience matched the target audience. For example, as noted above, a fit score may be generated for particular asset options based on a comparison of the audience classification to the target audience. This score may be on any scale, e.g., 1-100. Goodness of fit may be determined based on this raw score or based on characterization of this score such as "excellent," "good," etc. Again, this may depend on how well an individual audience classification parameter of a user matches a corresponding target audience parameter and/or how many of the target audience parameters are matched by the user's audience classification parameters. This information may in turn be provided to the asset provider, at least in an aggregated form. In this manner, the network operator can bill based on guaranteed delivery of targeted messages or scale the billing rate (or increase delivery) based on goodness of fit as well as audience size. The reports (and/or votes) 1018 can also provide a quick and detailed measurement of user distribution over the network that can be used to accurately gauge ratings, share, demographics of audiences and the like. Moreover, this information can be used to provide future audience estimation information 1022, for example, to estimate the total target universe based on audience classification parameters.

It will thus be appreciated that the present invention allows a network operator such as an MSO to sell asset delivery under the conventional asset delivery (time-slot) buy paradigm or under the new commercial impression paradigm or both. For example, a particular MSO may choose to sell asset delivery space for the major networks (or for these networks during prime time) under the old time-slot buy paradigm while using the commercial impression paradigm to aggregate users over multiple low market share networks. Another MSO may choose to retain the basic time-slot buy paradigm while accommodating asset providers who may wish to fill a given slot with multiple options targeted to different demographics. Another MSO may choose to retain the basic time-slot buy paradigm during prime time across all networks while using the targeted impression paradigm to aggregate users at other times of the day. The targeted impression paradigm may be used by such MSOs only for this limited purpose.

Figure 12:
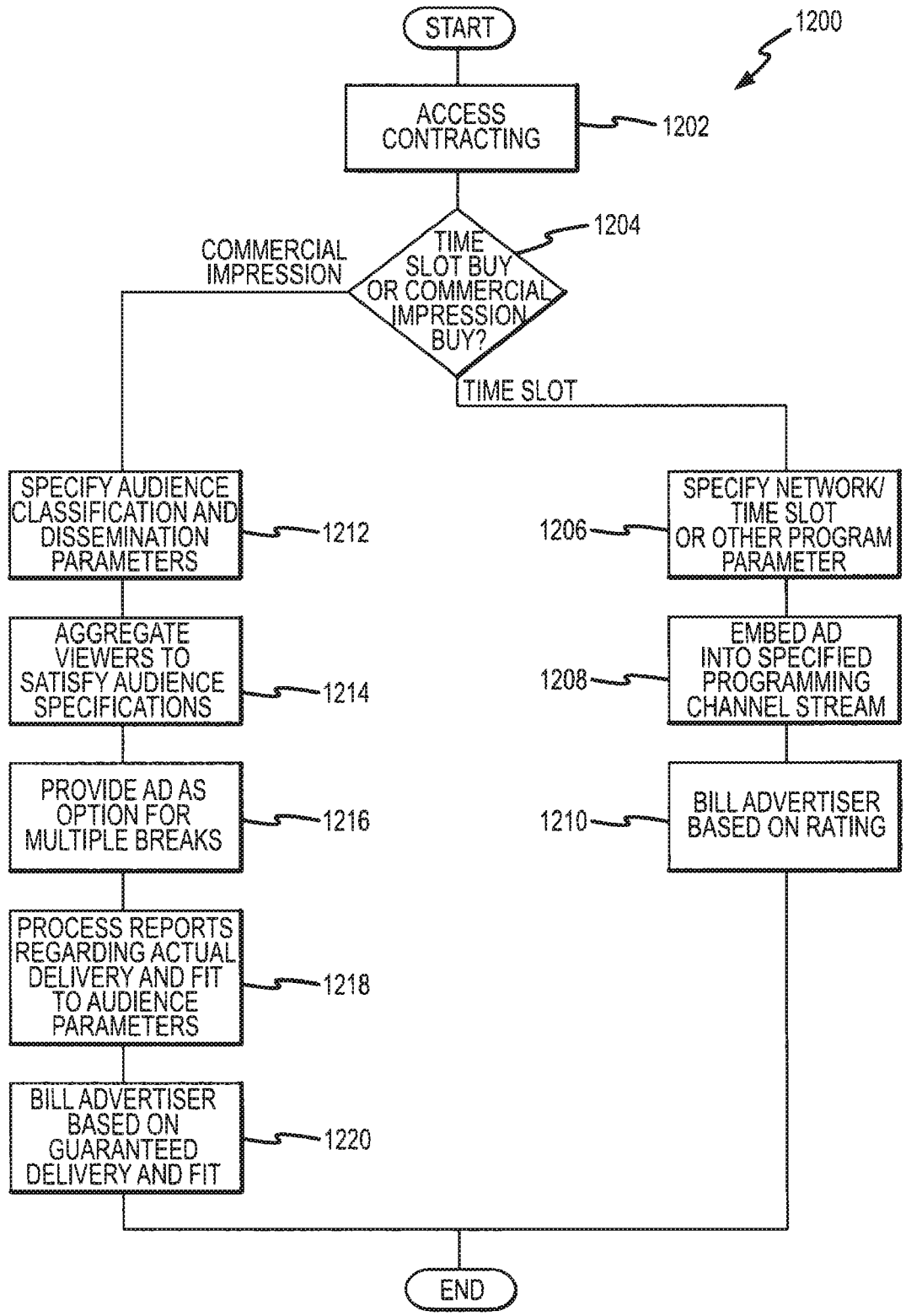
FIG. 12 is a flow chart illustrating a process for implementing time-slot and targeted impression buys.

FIG. 12 is a flow chart illustrating an associated process 1200. An asset provider (or agent thereof) can initiate the illustrated process 1200 by accessing (1202) a contracting platform as will be described below. Alternatively, an asset provider can work with the sales department or other personnel of a system operator or other party who accesses such a platform. As a still further alternative, an automated buying system may be employed to interface with such a platform via a system-to-system interface. This platform may provide a graphical user interface by which an asset provider can design a dissemination strategy and enter into a corresponding contract for dissemination of an asset. The asset provider can then use the interface to select (1204) to execute either a time-slot buy strategy or a targeted impression buy strategy. In the case of a time-slot buy strategy, the asset provider can then use the user interface to specify (1206) a network and time-slot or other program parameter identifying the desired air times and frequency for delivery of the asset. Thus, for example, an asset provider may elect to air the asset in connection with specifically identified programs believed to have an appropriate audience. In addition, the asset provider may specify that the asset is to appear during the first break or during multiple breaks during the program. The asset provider may further specify that the asset is to be, for example, aired during the first spot within the break, the last spot within the break or otherwise designate the specific asset delivery slot.

Once the time-slots for the asset have thus been specified, the MSO causes the asset to be embedded (1208) into the specified programming channel asset stream. The asset is then available to be consumed by all users of the programming channel. The MSO then bills (1210) the asset provider, typically based on associated ratings information. For example, the billing rate may be established in advance based on previous rating information for the program in question, or the best available ratings information for the particular airing of the program may be used to bill the asset provider. It will thus be appreciated that the conventional time-slot buy paradigm is limited to delivery to all users for a particular time-slot on a particular network and does not allow for targeting of particular users of a given network or targeting users distributed over multiple networks in a single buy.

In the case of targeted impression buys, the asset provider can use the user interface as described in more detail below to specify (1212) audience classification and other dissemination parameters. In the case of audience classification parameters, the asset provider may specify the gender, age range, income range, geographical location, lifestyle interest or other information of a targeted audience. The additional dissemination parameters may relate to delivery time, frequency, audience size, or any other information useful to define a target audience. Combinations of parameters may also be specified. For example, an asset provider may specify an audience size of 100,000 in a particular demographic group and further specify that the asset is not delivered to any user who has already received the asset a predetermined number of times.

Based on this information, the targeted asset system of the present invention is operative to target appropriate users. For example, this may involve targeting only selected users of a major network. Additionally or alternatively, this may involve aggregating (1214) users across multiple networks to satisfy the audience specifications. For example, selected users from multiple programming channels may receive the asset within a designated time period in order to provide an audience of the desired size, where the audience is composed of users matching the desired audience classification. The user interface preferably estimates the target universe based on the audience classification and dissemination parameters such that the asset provider receives an indication of the likely audience size.

The aggregation system may also be used to do time of day buys. For example, an asset provider could specify audience classification parameters for a target audience and further specify a time and channel for airing of the asset. CPEs tuned to that channel can then select the asset based on the voting process as described herein. Also, asset providers may designate audience classification parameters and a run time or time range, but not the programming channel. In this manner, significant flexibility is enabled for designing a dissemination strategy. It is also possible for a network operator to disable some of these strategy options, e.g., for business reasons.

Based on this input information, the targeted asset system of the present invention is operative to provide (1216) the asset as an option during one or more time-slots of one or more breaks. In the case of spot optimization, multiple asset options may be disseminated together with information identifying the target audience so that the most appropriate asset can be delivered at individual CPEs. In the case of audience aggregation, the asset may be provided as an option in connection with multiple breaks on multiple programming channels. The system then receives and processes (1218) reports regarding actual delivery of the asset by CPEs and information indicating how well the actual audience fit the classification parameters of the target audience. The asset provider can then be billed (1220) based on guaranteed delivery and goodness of fit based on actual report information. It will thus be appreciated that a new asset delivery paradigm is defined by which assets are targeted to specific users rather than being associated with particular programs. This enables both better targeting of individual users for a given program and improved reach to target users on low-share networks.

From the foregoing, it will be appreciated that various steps in the messaging sequence are directed to matching assets to users based on classification parameters, allowing for goodness of fit determinations based on such matching or otherwise depending on communicating audience classification information across the network. It is preferable to implement such messaging in a manner that is respectful of user privacy concerns and relevant regulatory regimes.

In the illustrated system, this is addressed by implementing the system free from persistent storage of a user profile or other sensitive information including, for example, personally identifiable information (PII). Specifically, it may be desired to protect as sensitive information subject matter extending beyond the established definition of PII. As one example in this regard, it may be desired to protect MAC addresses even though such addresses are not presently considered to be included within the definition of PII in the United States. Generally, any information that may entail privacy concerns or identify network usage information may be considered sensitive information. More particularly, the system learns of current network conditions prior to transmission of asset options via votes that identify assets without any sensitive information. Reports may also be limited to identifying assets that have been delivered (which assets are associated with target audience parameters) or characterization of the fit of audience classification parameters of a user(s) to a target audience definition. Even if it is desired to associate reports with particular users, e.g., to account for ad skipping as discussed below, such association may be based on an identification code or address not including PII. In any event, identification codes or any other information deemed sensitive can be immediately stripped and discarded or hashed, and audience classification information can be used only in anonymous and aggregated form to address any privacy concerns. With regard to hashing, sensitive information such as a MAC or IP address (which may be included in a designated header field) can be run through a hash function and reattached to the header, for example, to enable anonymous identification of messages from the same origin as may be desired.

Moreover, users can be notified of the targeted asset system and allowed to opt in or opt out such that participating users have positively assented to participate.

Figure 11A:
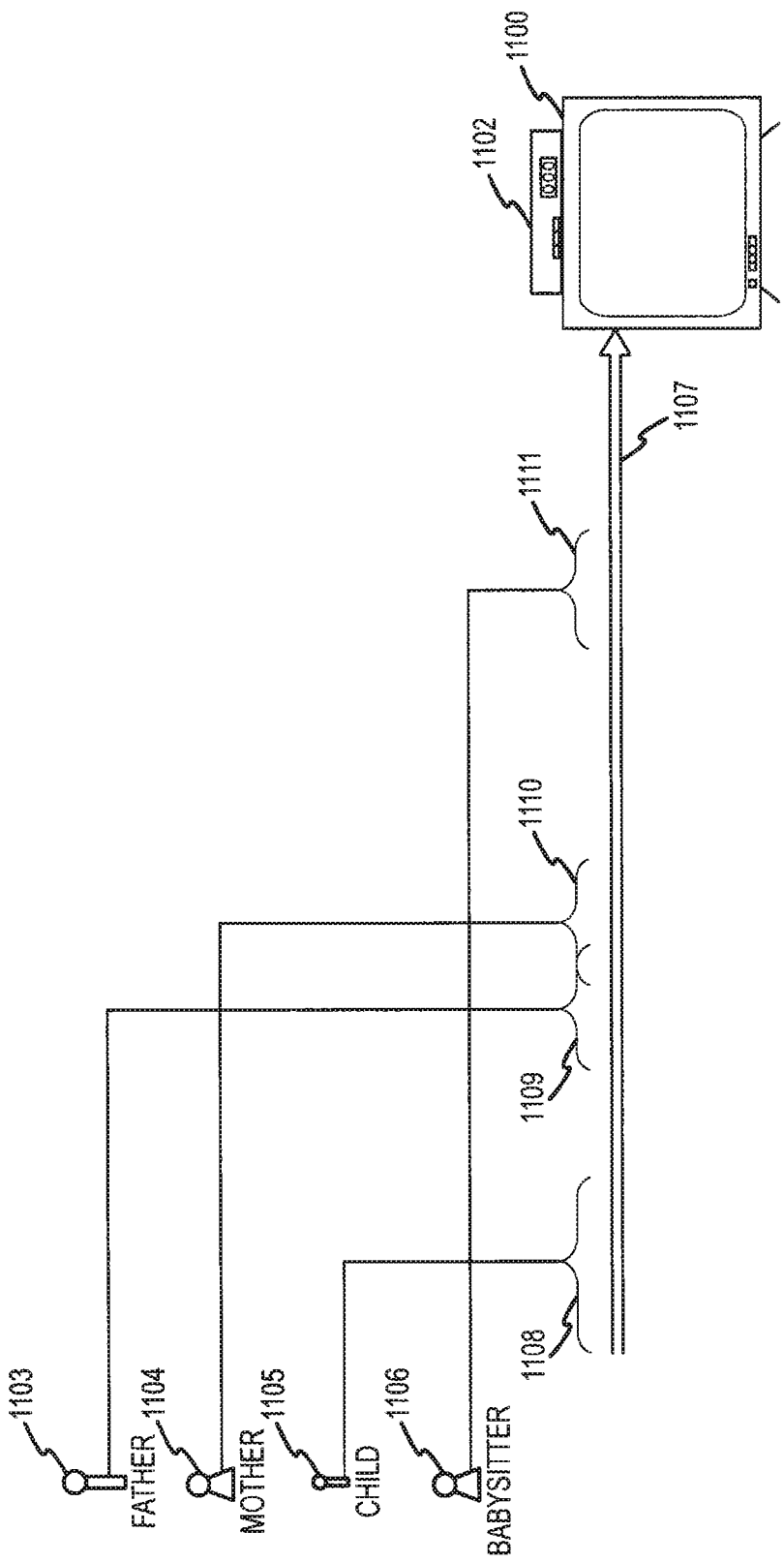
FIG. 11A illustrates an example of CPEs that include a television set and a Digital Set Top Box (DSTB) as used by a plurality of users.

Much of the discussion above has referenced audience classification parameters as relating to individuals as opposed to households. FIG. 11 illustrates a theoretical example of a CPE 1101 including a television set 1100 and a DSTB 1102 that are associated with multiple users 1103-1106. Arrow 1107 represents a user input stream, such as a click stream from a remote control, over time. A first user 1105, in this case a child, uses the television 1100 during a first time period—for example, in the morning. Second and third users 1103 and 1104 (designated "father" and "mother") use the television during time periods 1109 and 1110, which may be, for example, in the afternoon or evening. A babysitter 1106 uses the television during a night time period in this example.

This illustrates a number of challenges related to targeted asset delivery. First, because there are multiple users 1103-1106, targeting based on household demographics would have limited effectiveness. For example, it may be assumed that the child 1105 and father 1103 in many cases would not be targeted by the same asset providers. Moreover, in some cases, multiple users may watch the same television at the same time as indicated by the overlap of time periods 1109-1110. In addition, in some cases such as illustrated by the babysitter 1106 an unexpected user (from the perspective of the targeted asset system) may use the television 1100.

These noted difficulties are associated with a number of objectives that are preferably addressed by the targeted asset system of the present invention. First, the system should preferably be operative to distinguish between multiple users of a single set and, in the context of the system described above, vote and report to the network accordingly. Second, the system should preferably react over time to changing conditions such as the transitions from use by father 1103 to use by both father and mother 1103 and 1104 to use by only mother 1104. The system should also preferably have some ability to characterize unexpected users such as the babysitter 1106. In that case, the system may have no other information to go on other than the click stream 1107. The system may also identify time periods where, apparently, no user is present, though the set 1100 may still be on. Preferably, the system also operates free from persistent storage of any user profile or sensitive information so that no third party has a meaningful opportunity to misappropriate such information or discover the private network usage patterns of any of the users 1103-1106 via the targeted asset system. Privacy concerns can alternatively be addressed by obtaining consent from users. In this matter, sensitive information including PII can be transmitted across the network and persistently stored for use in targeting. This may allow for compiling a detailed user profile, e.g., at the headend. Assets can then be selected based on the user profile and, in certain implementations, addressed to specific CPEs.

In certain implementations, the present invention monitors the click stream over a time window and applies a mathematical model to match a pattern defined by the click stream to predefined audience classification parameters that may relate to demographic or psychographic categories. It will be appreciated that the click stream will indicate programs selected by users, volume and other information that may have some correlation, at least in a statistical sense, to the classification parameters. In addition, factors such as the frequency of channel changes and the length of time that the user lingers on a particular asset may be relevant to determining a value of an audience classification parameter. The system can also identify instances where there is apparently no user present.

In a first implementation, logic associated with the CPE 1101 uses probabilistic modeling, fuzzy logic and/or machine learning to progressively estimate the audience classification parameter values of a current user or users based on the click stream 1107. This process may optionally be supplemental based on stored information (preferably free of sensitive information) concerning the household that may, for example, affect probabilities associated with particular inputs. In this manner, each user input event (which involves one or more items of change of status and/or duration information) can be used to update a current estimate of the audience classification parameters based on associated probability values. The fuzzy logic may involve fuzzy data sets and probabilistic algorithms that accommodate estimations based on inputs of varying and limited predictive value.

In a second implementation, the click stream is modeled as an incomplete or noisy signal that can be processed to obtain audience classification parameter information.

More specifically, a series of clicks over time or associated information can be viewed as a time-based signal. This input signal is assumed to reflect a desired signature or pattern that can be correlated to audience classification parameters. However, the signal is assumed to be incomplete or noisy—a common problem in signal processing. Accordingly, filtering techniques are employed to estimate the "true" signal from the input stream and associated algorithms correlate that signal to the desired audience classification information. For example, a nonlinear adaptive filter may be used in this regard.

In either of these noted examples, certain preferred characteristics apply. First, the inputs into the system are primarily a click stream and stored aggregated or statistical data, substantially free of any sensitive information. This addresses privacy concerns as noted above but also provides substantial flexibility to assess new environments such as unexpected users. In addition, the system preferably has a forgetfulness such that recent inputs are more important than older inputs. Either of the noted examples accommodates this objective. It will be appreciated that such forgetfulness allows the system to adapt to change, e.g., from a first user to multiple users to a second user. In addition, such forgetfulness limits the amount of viewing information that is available in the system at any one time, thereby further addressing privacy concerns, and limits the time period during which such information could conceivably be discovered. For example, information may be deleted and settings may be reset to default values periodically, for example, when the DSTB is unplugged.

Figure 11B:
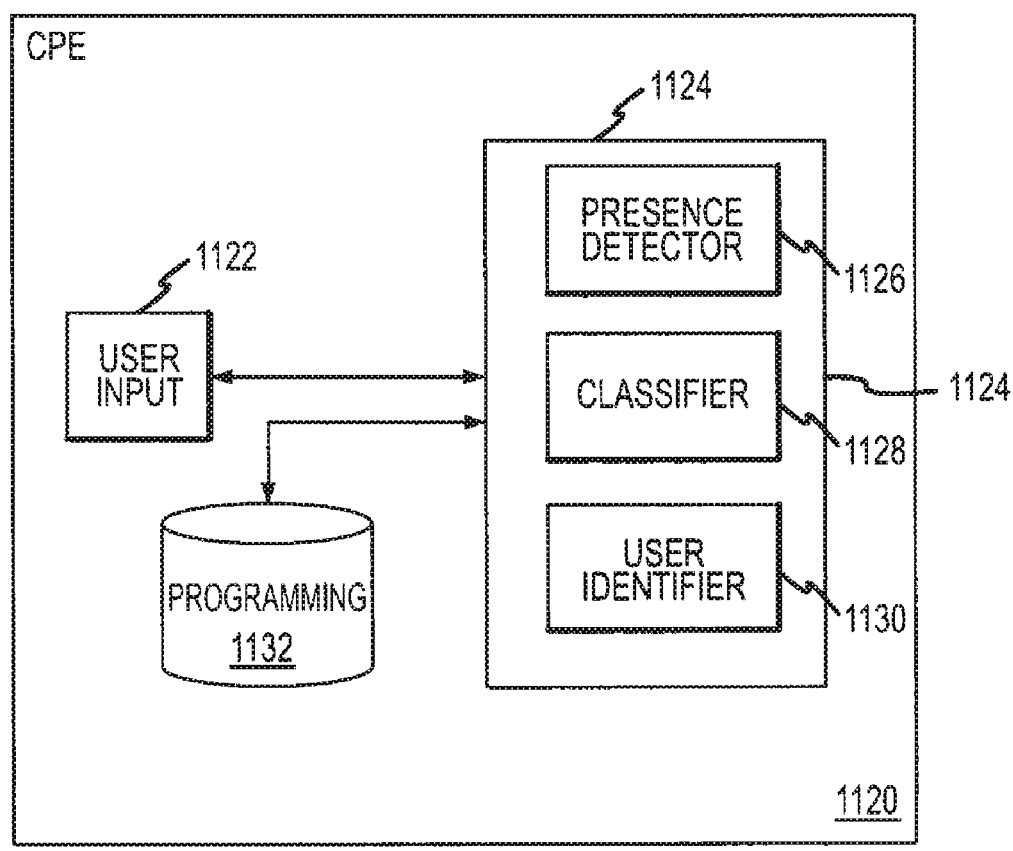
FIG. 11B illustrates a user classifier.

A block diagram of a system implementing such a user classification system is shown in FIG. 11B. The illustrated system is implemented in a CPE 1120 including a user input module 1122 and a classification module 1124. The user input module receives user inputs, e.g., from a remote control or television control buttons, that may indicate channel selections, volume settings and the like. These inputs are used together with programming information 1132 (which allows for correlation of channel selections to programming and/or associated audience profiles) for a number of functions. In this regard, the presence detector 1126 determines whether it is likely that a user is present for all or a portion of an asset that is delivered. For example, a long time period without any user inputs may indicate that no user is present and paying attention or a volume setting of zero may indicate that the asset was not effectively delivered. The classifier 1128 develops audience classification parameters for one or more users of a household as discussed above. The user identifier is operative to estimate which user, of the classified users, is currently present. Together, these modules 1126, 1128 and 1130 provide audience classification information that can be used to vote (or elect not to vote) and/or generate reports (or elect not to generate reports).

As noted above, one of the audience classifications that may be used for targeting is location. Specifically, an asset provider may wish to target only users within a defined geographic zone (e.g., proximate to a business outlet) or may wish to target different assets to different geographic zones (e.g., targeting different car ads to users having different supposed income levels based on location). In certain implementations, the present invention determines the location of a particular CPE 1101 and uses the location information to target assets to the particular CPE 1101. It will be appreciated that an indication of the location of a CPE 1101 contains information that may be considered sensitive. The present invention also creates, extracts and/or receives the location information in a manner that addresses these privacy concerns. This may also be accomplished by generalizing or otherwise filtering out sensitive information from the location information sent across the network. This may be accomplished by providing filtering or sorting features at the CPE 1101 or at the headend. For example, information that may be useful in the reporting process (i.e. to determine the number of successful deliveries within a specified location zone) may be sent upstream with little or no sensitive information included. Additionally, such location information can be generalized so as to not be personally identifiable. For example, all users on a given block or within another geographic zone (such as associated with a zip plus 2 area) may be associated with the same location identifier (e.g., a centroid for the zone).

In one implementation, logic associated with the CPE 1101 sends an identifier upstream to the headend 2304 where the identifier is cross-referenced against a list of billing addresses. The billing address that matches the identifier is then translated, for example, using GIS information, into a set of coordinates (e.g., Cartesian geographic coordinates) and those coordinates or an associated geographic zone identifier are sent back to the CPE 1101 for storage as part of its location information. Alternatively, a list may be broadcast. In this case, a list including location information for multiple or all network users is broadcast and each CPE 1101 selects it's own information. Asset providers can also associate target location information with an asset. For example, in connection with a contract interface as specified below, asset providers can define target asset delivery zones. Preferably this can be done via a graphical interface (e.g., displaying a map), and the defined zones can match, to a fine level of granularity, targeted areas of interest without being limited to node areas or other network topology. Moreover, such zones can have complex shapes including discontiguous portions. Preferably the zones can then be expressed in terms that allow for convenient transmission in asset metadata and comparison to user locations e.g., in terms of grid elements or area cells.

In another implementation, individual geographic regions are associated with unique identifiers and new regions can be defined based on the union of existing regions. This can be extended to a granularity identifying individual CPEs at its most fine level. Higher levels including numerous CPEs may be used for voting and reporting to address privacy concerns.

Upon receipt of an asset option list or an asset delivery request (ADR), the CPE 1101 parses the ADR and determines whether the location of the CPE 1102 is included in the locations targeted by the asset referenced in the ADR. For example, this may involve a point in polygon or other point in area algorithm, a radius analysis, or a comparison to a network of defined grid or cells such as a quadtree data structure. The CPE 1101 may then vote for assets to be received based on criteria including whether the location of that particular CPE 1101 is targeted by the asset.

After displaying an asset option, the CPE 1101 may also use its location information in the reporting process to enhance the delivery data sent upstream. The process by which the CPE 1101 uses its location information removes substantially all sensitive information from the location information. For example, the CPE 1101 may report that an asset targeted to a particular group of locations was delivered to one of the locations in the group. The CPE 1101 in this example would not report the location to which asset was actually delivered.

Similarly, it is often desired to associate tags with asset selections. Such tags are additional information that is superimposed on or appended to such assets. For example, a tag may provide information regarding a local store or other business location at the conclusion of an asset that is distributed on a broader basis. Conventionally, such tags have been appended to ads prior to insertion at the headend and have been limited to coarse targeting. In accordance with the present invention, tags may be targeted to users in particular zones, locations or areas, such as neighborhoods. Tags may also be targeted based on other audience classification parameters such as age, gender, income level, etc. For example, tags at the end of a department store ad may advertise specials on particular items of interest to particular demographics. Specifically, a tag may be included in an asset flotilla and conditionally inserted based on logic contained within the CPE 1101. Thus the tags are separate units that can be targeted like other assets, however, with conditional logic such that they are associated with the corresponding asset.

The present invention may use information relating to the location of a particular CPE 1101 to target a tag to a particular CPE 1101. For example, the CPE 1101 may contain information relating to its location in the form of Cartesian coordinates as discussed above. If an asset indicates that a tag may be delivered with it or instead of it, the CPE 1101 determines whether there is, associated with any of the potential tags, a location criterion that is met by the location information contained in the particular CPE 1101. For example, a tag may include a location criterion defining a particular neighborhood. If the CPE 1101 is located in that neighborhood, the CPE 1101 may choose to deliver the tag, assuming that other criteria necessary for the delivery of the tag are met. Other criteria may include the time available in the given break, other demographic information, and information relating to the national or non-localized asset.

As briefly note above, targeting may also be implemented based on marketing labels. Specifically, the headend may acquire information or marketing labels regarding a user or household from a variety of sources. These marketing labels may indicate that a user buys expensive cars, is a male 18-24 years old, or other information of potential interest to an asset provider. In some cases, this information may be similar to the audience classification parameters, though it may optionally be static (not varying as television users change) and based on hard data (as opposed to being surmised based on viewing patterns or the like). In other cases, the marketing labels may be more specific or otherwise different than the audience classification. In any event, the headend may inform the CPE as to what kind of user/household it is in terms of marketing labels. An asset provider can then target an asset based on the marketing labels and the asset will be delivered by CPEs where targeting matches. This can be used in audience aggregation and spot optimization contexts.

Thus, the targeted asset system of the present invention allows for targeting of assets in a broadcast network based on any relevant audience classification, whether determined based on user inputs such as a click stream, based on marketing labels or other information pushed to the customer premises equipment, based on demographic or other information stored or processed at the headend, or based on combinations of the above or other information. In this regard, it is therefore possible to use, in the context of a broadcast network, targeting concepts that have previously been limited to other contexts such as direct mail. For example, such targeting may make use of financial information, previous purchase information, periodical subscription information and the like. Moreover, classification systems developed in other contexts, may be leveraged to enhance the value of targeting achieved in accordance with the present invention.

An overview of the system has thus been provided, including introductory discussions of major components of the system, which provides a system context for understanding the operation of those components. The various components will now be described in greater detail in the following sections.

III. Component Overview

A. Measurement and Voting

As discussed above, in order to provide targeted assets to users of a television network, signals received from at least a portion of the CPEs may be utilized to select asset options for delivery and/or to determine the size and composition of the viewing audience. For example, a network operator may receive signals from all or a sampling of network users. This sampling is preferably both statistically significant (in terms of sampling size) and valid in terms of being sufficiently random to be reliably representative of the universe of all relevant users. In some cases, the network operator may receive signals only from users who have "opted in" or agreed to participate in the targeted asset system, and this group of users may not be statistically significant or relevant. In many cases, however, these signals may indicate channels currently being viewed and/or the audience classification of current users. In this regard, a two-way communication path between a network platform such as a headend and CPEs, such as DSTBs, of one or more households may be provided over a network interface.

Figure 13:
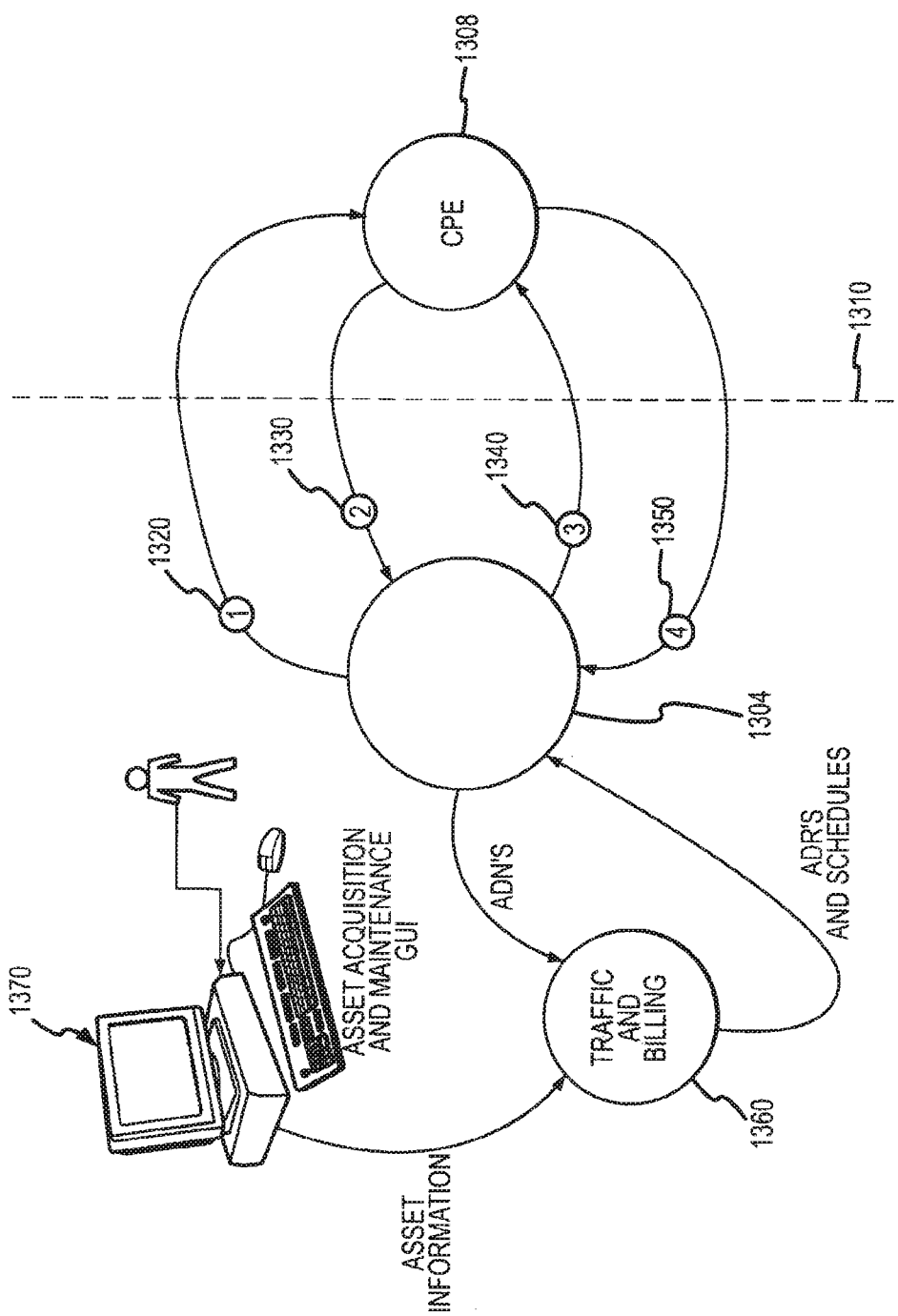
FIG. 13 illustrates communications between a network platform and a CPE.

FIG. 13 illustrates communications between a network 1304 platform or platforms operating a targeted asset system in accordance with the present invention and a CPE 1308. In this regard, the platform 1304 may include various combinations of the components discussed above in relation to FIGS. 1-12. Generally, the platform 1304 includes a headend that is operative to communicate with CPE over a network interface 1310. As shown, the CPE 1308 includes a digital set top box (DSTB). As will be appreciated, each user in the network 1304 may have such a DSTB or a sub-set (less than all) of the viewers may have such DSTBs. Some users may have a DSTB but only use it some of the time, e.g., only when watching HDTV programming. Moreover, some users may have a DSTB but choose not to participate in the targeted asset system. In any event, at least a portion of the network viewers have a CPE 1308 that is operative to receive signals via the network interface 1310 as well as provide signals to the network 1304 via the network interface 1310 for purposes of the targeted asset delivery system. Further, the network 1304 may be in communication with a traffic and billing platform 1360 which may act as an intermediary between asset providers 1370 and the network operator. In this regard, the T&B platform 1360 may receive target audience parameters and other constraints from the asset providers 1370 as well as provide billing information to such asset providers 1370 based on the delivery of such assets. The T&B platform 1360 may also manage the flow of targeted assets.

Generally, signals received from a CPE 1308 are utilized by the present system for at least three separate applications, which in some instances may also be combined. These applications may be termed measurement, voting and reporting. Reporting is described in more detail below. Measurement relates to the use of the signals to identify the audience size and, optionally, the classification composition of the audience. This information assists in estimating the universe of users available for targeting, including an estimate of the size and composition of an audience that may be aggregated over multiple channels (e.g., including low share channels) to form a substantial virtual channel. Accordingly, a targeted asset may be provided for the virtual channel to enhance the number of users who receive the asset. Voting involves the use of signals received from CPEs 1308 to provide an asset based on asset indications from the CPEs. In any case, assets may be selected and inserted into one or more transmitted data streams based on signals received from one or more CPEs 1308.

Figure 7:
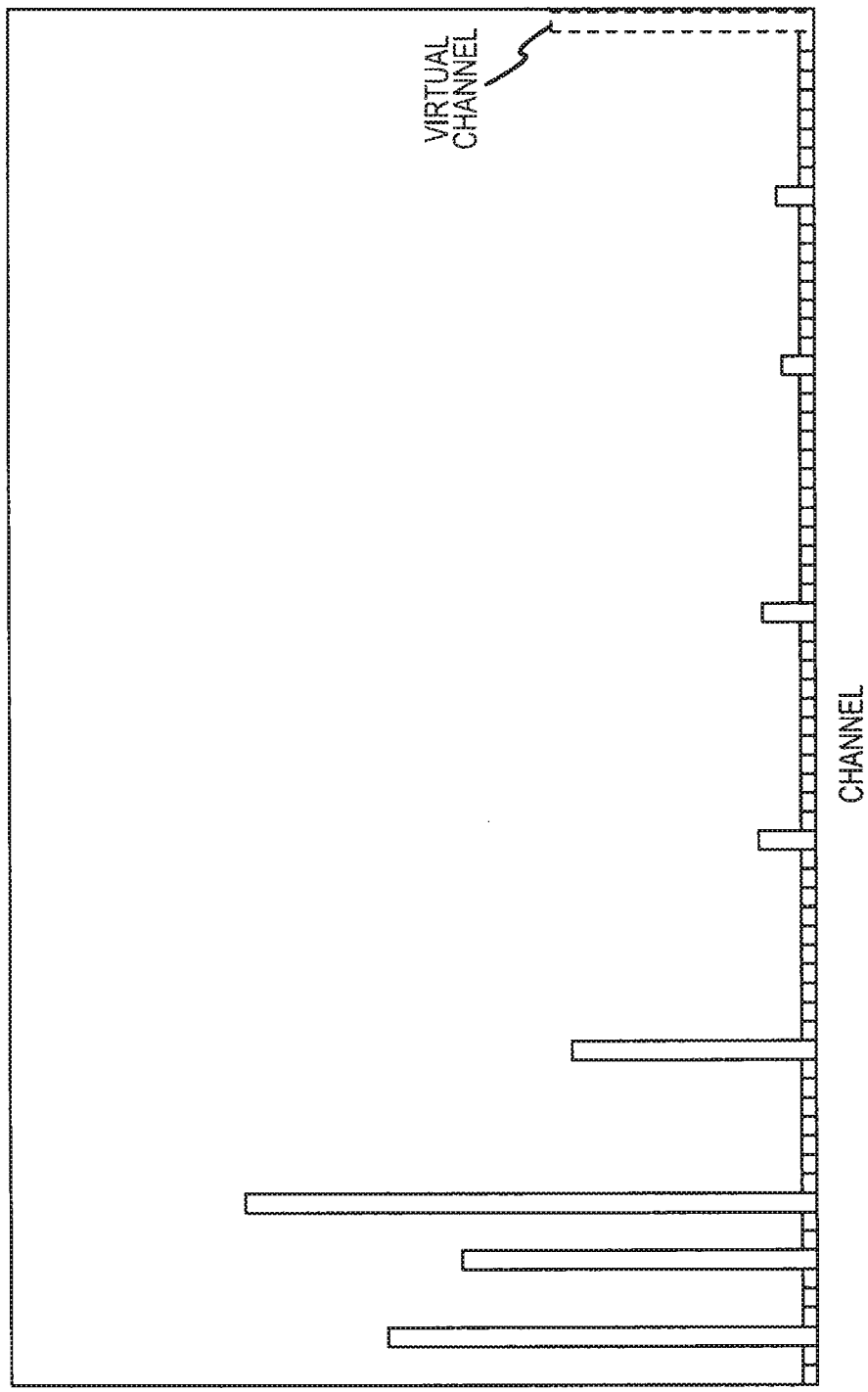
FIG. 7 illustrates a virtual channel in the context of audience aggregation.

With regard to audience measurement, the two-way communication between the platform 1304 and CPE 1308 allows for gathering information which may indicate, at least implicitly, information regarding audience size and audience classification composition. In this regard, individual CPEs 1308 may periodically or upon request provide a signal to the platform 1304 indicating, for example, that an individual CPE 1308 is active and what channel is currently being displayed by the CPE 1308. This information, which may be provided in connection with voting, reporting on other messages (e.g., messages dedicated to measurement) can be used to infer audience size and composition. Wholly apart from the targeted asset system, such information may be useful to support ratings and share information or for any other audience measurement objective. Such information may also be utilized to tailor transmissions to the CPE 1308 and reduce bandwidth and processing requirements. Referring briefly to FIG. 7, it is noted that of the available programming channels, four programming channels have the largest individual share of users (e.g., the four major networks). However, there are numerous other users in the network albeit in smaller shares of the total on a channel-by-channel basis. By providing a common set of asset options to the users of two or more of the programming channels having a small market share (or even to users of programming channels with large shares), a virtual channel may be created. That is, a common asset option or set of asset options may be provided to an aggregated group from multiple programming channels. Once combined, the effective market share of a virtual channel composed of users from small share channels may approximate the market share of, for example, one of the four major networks.

While the aggregation of the users of multiple programming channels into a virtual channel allows for providing a common set of asset options to each of the programming channels, it will be appreciated that the asset will generally be provided for each individual programming channel at different times. This is shown in FIG. 15 where two different programming channels (e.g., 1502 and 1504), which may be combined into a virtual channel, have different scheduled breaks 1512, 1514. In this regard, an asset may be provided on the first channel 1502 prior to when the same asset is provided on the second channel 1504. However, this common asset may still be provided within a predetermined time window (e.g., between 7 p.m. and 8 p.m.). In this regard, the asset may be delivered to the aggregated market share represented by the virtual channel (or a subset thereof) within defined constraints regarding delivery time. Alternatively, the size of such an aggregated audience may be estimated in advance based on previous reporting, ratings and census data, or any other technique. Thus measurement or voting is not necessary to accomplish targeting, though such detailed asset information is useful. Actual delivery may be verified by subsequent reporting. As will be appreciated, such aggregation allows a network operator to disseminate assets based on the increased market share of the virtual channel(s) in relation to any one of the subsumed programming channels, as well as allowing an asset provider to more effectively target a current viewing audience.

Figure 14:
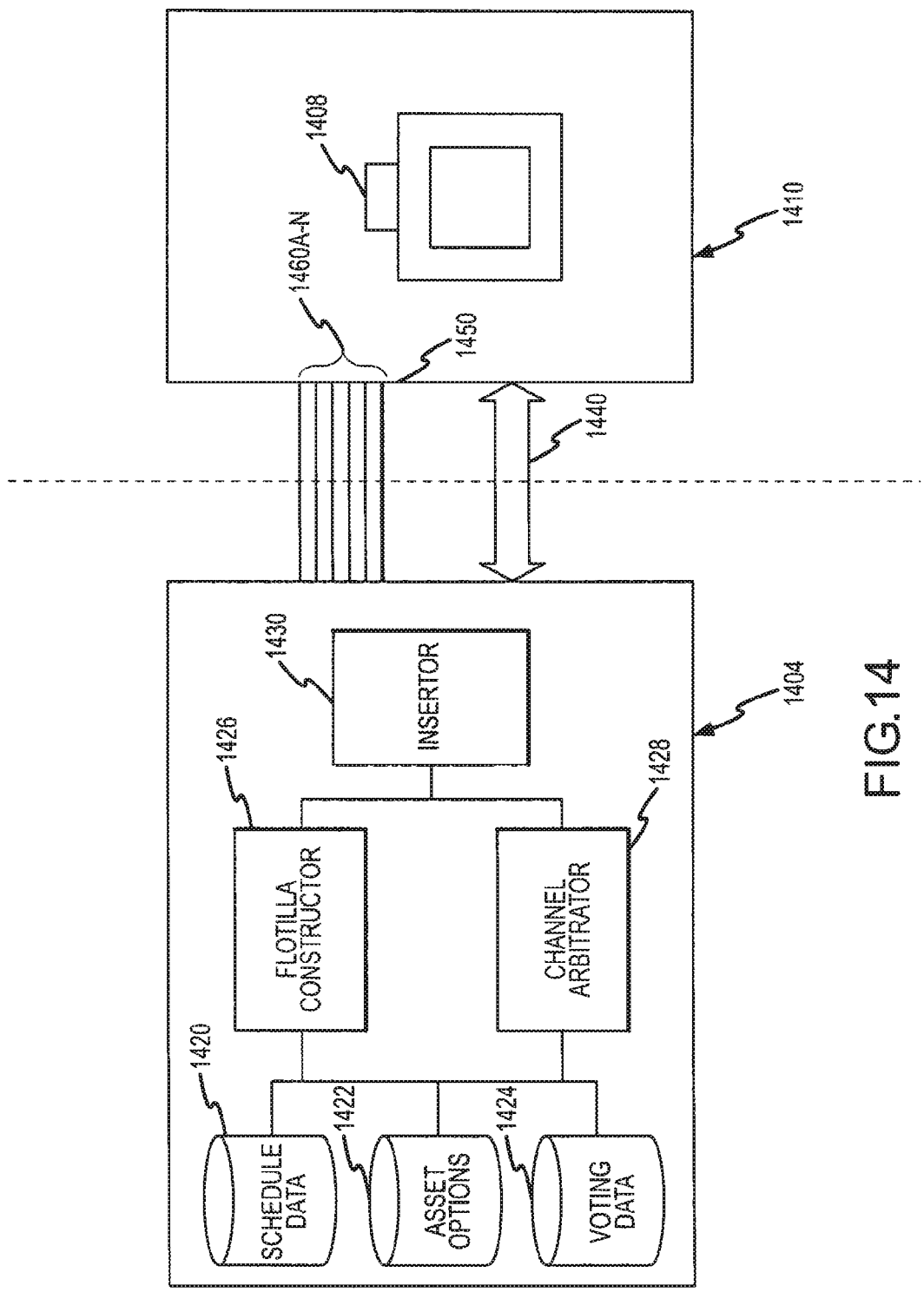
FIG. 14 illustrates an application that is supported by signals from CPEs and provides targeted assets to users of one or more channels within a network.

Another application that is supported by signals from CPEs is the provision of targeted assets to current users of one or more channels within the network, e.g., based on voting. Such an application is illustrated in FIG. 14, where, in one arrangement, signals received from CPEs 1410 (only one shown) may be utilized to select assets (e.g., a break asset and/or programming) for at least one programming channel 1450. In this regard, such assets may be dynamically selected for insertion into the data stream of the programming channel 1450, for example, during a break or other designated time period. In a further arrangement, unused bandwidth of the network is utilized to provide parallel asset streams during a break or designated time period of the targeted channel 1450. In the context of a break, multiple asset channels 1460A-N may be used to provide asset options during a single break, wherein each asset channel 1460A-N may provide options directed to different groups of viewers and/or otherwise carry different assets (e.g., users having similar audience classification parameters may receive different assets due to a desired sequencing of packaged assets as discussed below).

In such an arrangement, the CPE 1410 may be operative to select between alternate asset channels 1460A-N based on the noted signals from the CPE 1410. In addition to targeted audience aggregation, such a system may be desirable to enhance revenues or impact for programming, including large share programming (spot optimization). That is, a single break may be apportioned to two or more different asset providers, or, a single asset provider may provide alternate assets where the alternate assets target different groups of users. Though discussed herein as being directed to providing different break or interstitial assets to different groups of users, it should be noted that the system may also be utilized to provide different programming assets.

An associated asset targeting system implementing a voting process is illustrated in FIG. 14. The asset targeting system of FIG. 14 has a platform 1404, which includes a structure of the network (i.e., upstream from the users/households) that is operative to communicate with CPEs 1410 (only one shown) within the network. The illustrated CPE 1410 includes a signal processing device 1408, which in the present illustration is embodied in a DSTB. Generally, the platform 1404 is operative to communicate with the CPE 1410 via a network interface 1440. In order to provide parallel asset channels 1460A-N during a break of a programming channel, e.g., channel 1450, the platform 1404 is in communication with one or more of the following components: a schedule database 1420, an available asset option database 1422, voting database 1424, a flotilla constructor 1426, a channel arbitrator 1428, and an inserter 1430. Of note, the listed components 1420-1430 do not have to be located at a common network location. That is, the various components of the platform

1404 may be distributed over separate locations within the network and may be interconnected by any appropriate communication interfaces.

Generally, the schedule database 1420 includes information regarding the timing of breaks for one or more programming channels, the asset option database 1422 includes available asset metadata identifying the asset and targeted audience classification parameters, and the voting database 1424 includes voting information obtained from one or more CPEs for use in targeting assets. The actual assets are generally included in a separate database (not shown). The flotilla constructor 1426 is utilized to populate a break of a programming channel and/or asset channels 1460A-N with selected assets. The channel arbitrator 1428 is utilized to arbitrate the use of limited bandwidth (e.g., available asset channels 1460A-N) when a conflict arises between breaks of two or more supported programming channels. Finally, the inserter 1430 is utilized to insert selected assets or targeted assets into an asset stream (e.g., of a programming channel 1450 and/or one or more asset channels 1460A-N) prior to transmitting the stream across the network interface 1440. As will be discussed herein, the system is operative to provide asset channels 1460A-N to support asset options for breaks of multiple programming channels within the network.

In order to provide asset channels 1460A-N for one or more programming channels, the timing of the breaks on the relevant programming channels is determined. For instance, FIG. 15 illustrates three programming channels that may be provided by the network operator to a household via a network interface. As will be appreciated, many more channels may also be provided. The channels 1502, 1504 and 1506 comprise three programming streams for which targeted assets are provided. Users may switch between each of these channels 1502, 1504 and 1506 (and generally many more) to select between programming options. Each channel 1502, 1504 and 1506 includes a break 1512, 1514 and 1516, respectively, during the programming period shown. During breaks 1512-1516 one or more asset spots are typically available. That is, a sequence of shorter assets may be used to fill the 90-second break. For example, two, three or four spots may be defined on a single channel for a single break. Different numbers of spots may be provided for the same break on different channels and a different number of channels may be used for different portions of the break.

In order to provide notice of upcoming breaks or insertion opportunities within a break, programming streams often include a cue tone signal 1530 (or a cue message in digital networks) a predetermined time before the beginning of each break or insertion opportunity. These cue tone signals 1530 have historically been utilized to allow local asset providers to insert localized assets into a network feed. Further, various channels may provide window start times 1532 and window end times 1534 during which one or more breaks will occur. These start and end times define an avail window. Again, this information has historically been provided to allow local asset providers to insert local assets into a broadcast stream. This information may also be utilized by the targeted asset system to determine when a break will occur during programming. Accordingly, the system may be operative to monitor programming channels, e.g., 1502, 1504 and 1506, for cue tone signals 1530 as well as obtain and store information regarding window start and end times (e.g., in the schedule database 1420). The available window information may be received from the T&B system and may be manually entered.

Due to the limited bandwidth available for providing targeted asset delivery, it may be desirable to identify one or more characteristics associated with each programming channel 1502, 1504 and 1506 when determining which channel(s) should receive targeted asset delivery for conflicting breaks or how available bandwidth should be apportioned among the conflicting programming channels. In this regard, it will be noted that breaks on different channels are often at least partially overlapping. For instance, the break 1514 of channel 1504 partially overlaps the break 1516 on channel 1506. Accordingly, it may be desirable to arbitrate the limited resources available for targeted asset delivery between the two channels 1504 and 1506.

For instance, the arbitrator 1428 (See FIG. 14) may determine that the first channel 1506 does not currently have enough users to warrant use of any available bandwidth to provide targeted asset delivery. Alternatively, the available bandwidth may be split between the first and second channels 1504, 1506 such that targeting asset delivery may be provided for each break 1514, 1516. As a further alternative, the available asset channels may be split between supporting the first and second channels 1504, 1506, for example, in proportion to their respective audience sizes. It is noted that it may be possible to use a given asset channel in support of only a portion of a break, for example, in connection with partially overlapping breaks, though this involves certain practical difficulties related to scheduling and flotilla construction. This may also require knowledge of the underlying break structure, e.g., to ensure that the viewer is not returned to the second half of a sixty-second asset. This information will generally not be available to the CPE. Also, different numbers of asset channels may be available at different time periods of a break. Signals received from CPEs, e.g., recent or historical signals, may be utilized for arbitration purposes. Further, it will be appreciated that in some instances one or more channels may include aligned breaks. For instance, channels having a common ownership entity (e.g., ESPN and ABC) may have aligned breaks for certain programming. Accordingly, bandwidth for targeted asset delivery for these common channels may be shared.

Referring again to FIG. 14, the use of signals from the CPE 1410 may allow for providing assets that are tailored to current users or otherwise providing different assets to different groups of users. In this regard, an asset that has targeting parameters that match the classification parameters of the greatest number of users may be provided within the broadcast stream of a supported programming channel 1450 during a break. It is noted that the most appropriate asset may thereby be provided to analog or otherwise nonparticipating users (assuming the voters are representative of the relevant user universe), yielding a degree of targeting even for them. Moreover, some targeting benefit can be achieved for a large number of programming channels, even channels that may not be supported by asset channels with respect to a given break.

Alternatively or additionally, different assets may be provided on the asset channels 1460A-N during the break of a programming channel. During a break where asset channels 1460A-N are available, a CPE 1410 of a particular household may, based on a determination implemented at the CPE 1410, switch to one of the asset channels 1460A-N that contains appropriate assets. Accordingly, such assets of the asset channel 1460(A-N) may be displayed during the break. During the break, the CPE 1410 may stay on one asset channel 1460A-N (in the case of a break with multiple spots in sequence) or may navigate through the break selecting the most appropriate assets. After the break, the CPE 1410 may switch back to the original programming channel (if necessary). This switching may occur seamlessly from the point of view of a user. In this regard, different assets may be provided to different users during the same break. As will be appreciated, this allows asset providers to target different groups during the same break. Further it allows for a network operator to market a single spot to two different asset providers on an apportioned basis (or allow a single asset provider to fill a single spot with multiple asset options). Each asset provider may, for example, thereby pay for an audience that better matches its target.

Figure 16A:
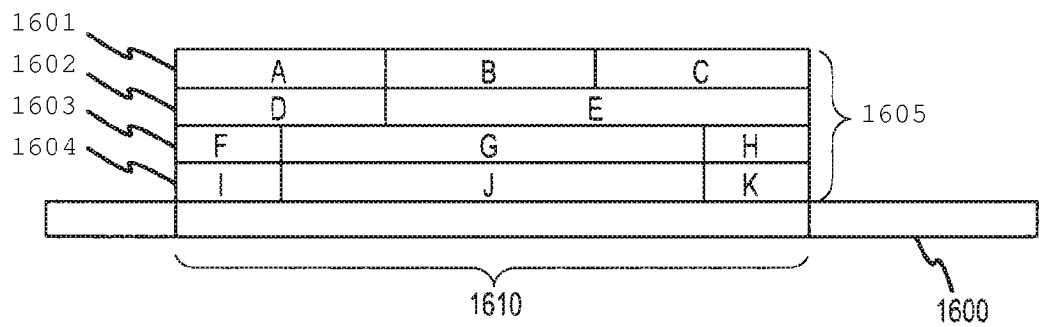
FIG. 16A illustrates the use of asset channels for providing assets during a break of a programming channel.

The number of asset channels available for targeted asset delivery may be limited by the available bandwidth (e.g., unused channels) of a given network operator. As discussed below, the system may make use of channels that are opportunistically available, e.g., channels that are used for VOD at night may be available to support asset options during the day, or unused bandwidth within a node filter area may be used for this purpose. FIG. 16A illustrates the use of four asset channels 1601-1604 for providing assets during a break 1610 of a programming channel 1600. As shown, on each asset channel 1601-1604, the break 1610 may be separated into one or more asset slots that may have different durations. However, in the case of FIG. 16A, the start and end times of the asset sets A-C, D-E, F-H and I-K carried by the asset channels 1601-1604 are aligned with the start and end times of the break 1610. Each of the asset channels 1601-1604 may carry an asset that is targeted to a specific audience classification of the users of the targeted channel 1600 or the users of additional programming channels having a break aligned with the break 1610 of the programming channel 1600.

Figure 16B:
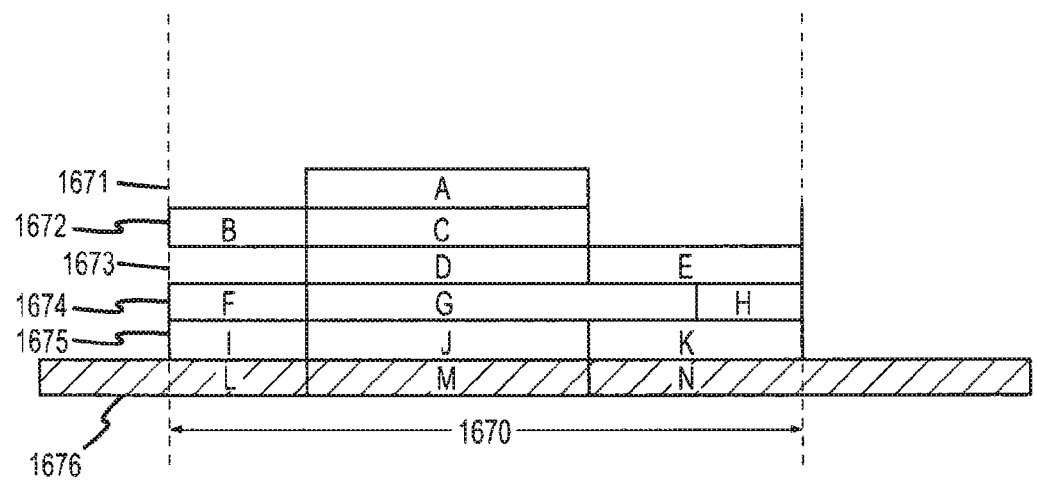
FIG. 16B illustrates an exemplary asset flotilla.

It should be noted that flotillas need not be rectangular as shown in FIG. 16A. That is, due to conflicts between breaks or the intermittent availability of certain asset channels as discussed above, the total number of asset channels used to support a given programming channel may change during a break. This is illustrated in FIG. 16B. As shown, assets A-N are provided during a break 1670 on asset channels 1671-1675 and the supported programming channel 1676. In this case, channels 1674 and 1675 (as well as programming channel 1676) provide assets throughout the break 1670. Channel 1673 does not provide assets until sometime after the break begins. Channel 1672 provides assets from the beginning of the break, but ceases to provide assets prior to the end of the break 1670. Channel 1671 starts providing assets after the start of the break 1670 and ceases providing assets prior to the end of the break 1670. It will be appreciated that complex flotilla shapes may be implemented.

Referring again to FIG. 16A, each asset channel 1601-1604 includes a different combination of assets A-K that may be targeted to different viewers of the channel 1600 during a given break 1610. Collectively, the assets A-K carried by the asset channels 1601-1604 define a flotilla 1605 that includes assets that may be targeted to different groups of users. The most appropriate assets for a given user may be on different ones of the channels 1601-1604 at different times during the break 1610. These can be delivered to the user by channel hopping during the break with due consideration given to the fact that spots on different channels 1601-1604 may not have the same start and end times. How the various spots in the flotilla 1605 are populated with assets is described in more detail below.

The four asset channels 1601-1604 may be utilized to provide multiple asset options for different programming channels. For instance referring to FIG. 15, programming channels 1502 and 1506 have temporally distinct breaks 1512 and 1515. Accordingly, the system may provide a first four-channel asset flotilla having a first set of assets during the first break 1512 for the first channel 1502. Likewise a second four-channel asset flotilla having a second set of assets may be provided during the second break 1516 for the second channel 1506. In this regard, use of the bandwidth available for asset channels may be shared between programming channels 1502 and 1506. In cases where breaks overlap (e.g., breaks 1514 and 1516), one channel may be selected for targeted asset delivery, or, the available bandwidth for the asset channels may be split between the conflicting breaks. For example, each programming channel may be supported by a two-channel asset flotilla or one programming channel may be supported by three asset channels and the other programming channel supported by only one asset channel, for example, due to relative audience sizes or asset delivery values. Arbitration of available bandwidth between conflicting channels is handled by the channel arbitrator 1428, as will be more fully discussed herein.

Selection of assets to fill a break of a programming channel, or to fill the available spots within each asset channel of a flotilla may be based on votes of users of the programming channel. That is, assets may be selected by the flotilla constructor 1426 (See FIG. 14) in response to signals received from CPEs 1410 within the network. As shown in FIG. 13, the process of selecting and providing targeted assets based on signals from CPEs includes four general steps. Initially, the platform 1304 provides (1320) an asset option list of proposed assets to the CPEs 1308 in the network. This may be based on asset provider contracts and associated ADRs. Next, each CPE 1308 votes (1330) on the most appropriate asset or assets from the asset option list. That is, each CPE 1308 provides a signal to the network 1304 that indicates the best matching asset(s) for the particular CPE 1308 based on a comparison of target information to audience classification information. Based on the votes (1330) from one or more CPEs 1308, the platform 1304 selects targeted assets from the available assets and generates (1340) an asset view list and an asset flotilla, which is provided to each voting CPE 1308. For example, the asset view list many indicate channels where assets are available and provide associated audience classification information (if necessary) to assist in asset selection. Each CPE 1308 may then receive the view list and flotilla.

The process by which the votes are used to populate the various asset spots in a flotilla may involve a number of considerations. Referring again to FIG. 16A, the flotilla defines a matrix of assets illustrated as including a horizontal time axis and a vertical axis of asset channels. In the simple case where all the assets correspond to spots of the same length (e.g., all 30 second spots and the same number of asset channels are used throughout the break) the matrix would define a neat arrangement of rows and columns. The flotilla constructor would then be operative, among other things, to map assets to row and column addresses of the matrix, for example, based on their vote rankings.

Some of the considerations that may be involved in this regard include the following. First, the programming channel 1600 itself may be populated with an asset sequence determined based on voting. The assets inserted into the programming channel will be delivered to analog and otherwise nonparticipating users, as well as to participating users whose CPEs select that asset sequence, and may therefore be expected to constitute the largest user segment of the flotilla. Accordingly, assets with higher vote rankings may be inserted on the programming channel 1600.

In addition, in the case of breaks including more than two spots, first and last spots may be deemed more valuable by asset providers than middle spots. Accordingly, higher vote ranking assets may be favored for first and last spots, resulting in population of the matrix more on a column-by column basis as a function of votes rather than on a row-by-row basis. However, and somewhat by contrast, it may be desired to time stagger the highest vote ranking assets, for example, so that a given user may have the opportunity to view both the top voted asset and the second-most voted asset.

The process of populating the flotilla matrix may also take into account demographics determined independent of the voting process. Thus, as noted above, if twelve spots are included in the flotilla, the spots may be apportioned to reflect, for example, the demographic composition of the program audience—e.g., two-thirds female and one-third male, or two-thirds female 18-34 years old and one-third female 34 and over—or the weighted average of the program audience (e.g., resulting in a disproportionate channel allocation for audience segments or assets deemed to have an exceptionally high or low per user value). Such information may be based, for example, on conventional ratings information.

Moreover, this flotilla population process may take into account system limitations. For example, if the system is implemented without the ability to navigate between or a preference against navigating between different channels during a given break, or if it is desired to minimize hops during a break, then the flotilla may be constructed so that a given channel has assets intended for a consistent audience classification throughout a break. That is, votes may be tabulated on a classification dependent basis and then corresponding rows may be populated based on the votes. Additionally, in connection with packaged assets having a desired sequencing, such sequencing may be considered in flotilla construction.

The flotilla construction process may also take into account the desirability of effectively navigating through an entire break, which may entail multiple channel hops. For example, it has been noted asset options may be included on the programming channel as well as on asset channels. However, the underlying structure of the assets interleaved into the programming content is generally not known. Accordingly, either information regarding such underlying structure can be provided through appropriate signaling or returns to the programming channel during a break can be precluded so as to avoid switching to an asset in progress.

It is also desirable that each customer premises equipment device be able to navigate across a break selecting assets that are appropriate for the current user. For example, a flotilla may include a number of columns correspondent to a sequence of asset spots for a break. If one column included all assets directed to children, non-children users would be left without an appropriate asset option for that spot. Thus, options for avoiding such situations include making sure that a widely targeted asset is available in each column or time period, or that the union of the subsets defined by the targeting constraints for each asset in a column or time period represents the largest possible subset of the universe of users. Of course, this may conflict with other flotilla construction goals and an optimal solution may need to be arbitrated. In addition, where an issue arises as to which assets to include in a flotilla, the identity of the relevant asset providers may be considered (e.g., a larger volume asset provider or an asset provider who has paid for a higher level of service may be given preference).

It will be appreciated that a variety of factors may be reflected in an algorithm for using the vote information to populate a flotilla. For example, Gantt chart logic or other conditional scheduling logic may be implemented in this regard.

Alternatively, asset options may be provided via a forward-and-store architecture in the case of CPEs with substantial storage resources, e.g., DVRs. In this regard, an asset may be inserted into a designated bandwidth segment and downloaded via the network interface to the storage of the CPE. Accordingly, the CPE may then selectively insert the asset from the storage into a subsequent break. Further, in this architecture, the assets of the stored options and associated metadata may include an expiration time. Assets may be discarded (e.g., deleted) upon expiration regardless of whether they have been delivered. In this architecture, it will be appreciated that the transmission of assets does not have a real-time component, so the available bandwidth may vary during transmission. Moreover, a thirty second asset may be transmitted in five seconds or over thirty minutes. The available assets may be broadcast to all CPEs with individual CPEs only storing appropriate assets. In addition, due to storage limitations, a CPE may delete an asset of interest and re-record it later.

In contrast, in the asset channel architecture, the flotilla is transmitted in synchronization with the associated break and requires little or no storage at the CPE. In either case, once an asset from the storage or flotilla is displayed, each CPE 1308 may provide (1350) an asset delivery notification (ADN) to the network platform 1304 indicating that the particular asset was delivered. The platform 1304 may then provide aggregated or compiled information regarding the total number of users that received a given asset to a billing platform 1360. Accordingly, individual asset providers may be billed in accordance with how many users received a given asset. Each of these steps 1320-1350 is more fully discussed herein.

As noted, signals from the individual CPEs 1308 may be utilized for targeted asset system purposes. However, it will be appreciated that while it is possible to receive vote signals from each CPE 1308 in a network, such full network 'polling' may result in large bandwidth requirements. In one alternate implementation, statistical sampling is utilized to reduce the bandwidth requirements between the network 1304 and the CPEs 1308. As will be appreciated, sampling of a statistically significant and relevant portion of the CPEs 1308 will provide a useful representation of the channels currently being used as well as a useful representation of the most appropriate assets for the users using those channels.

Figure 17A:
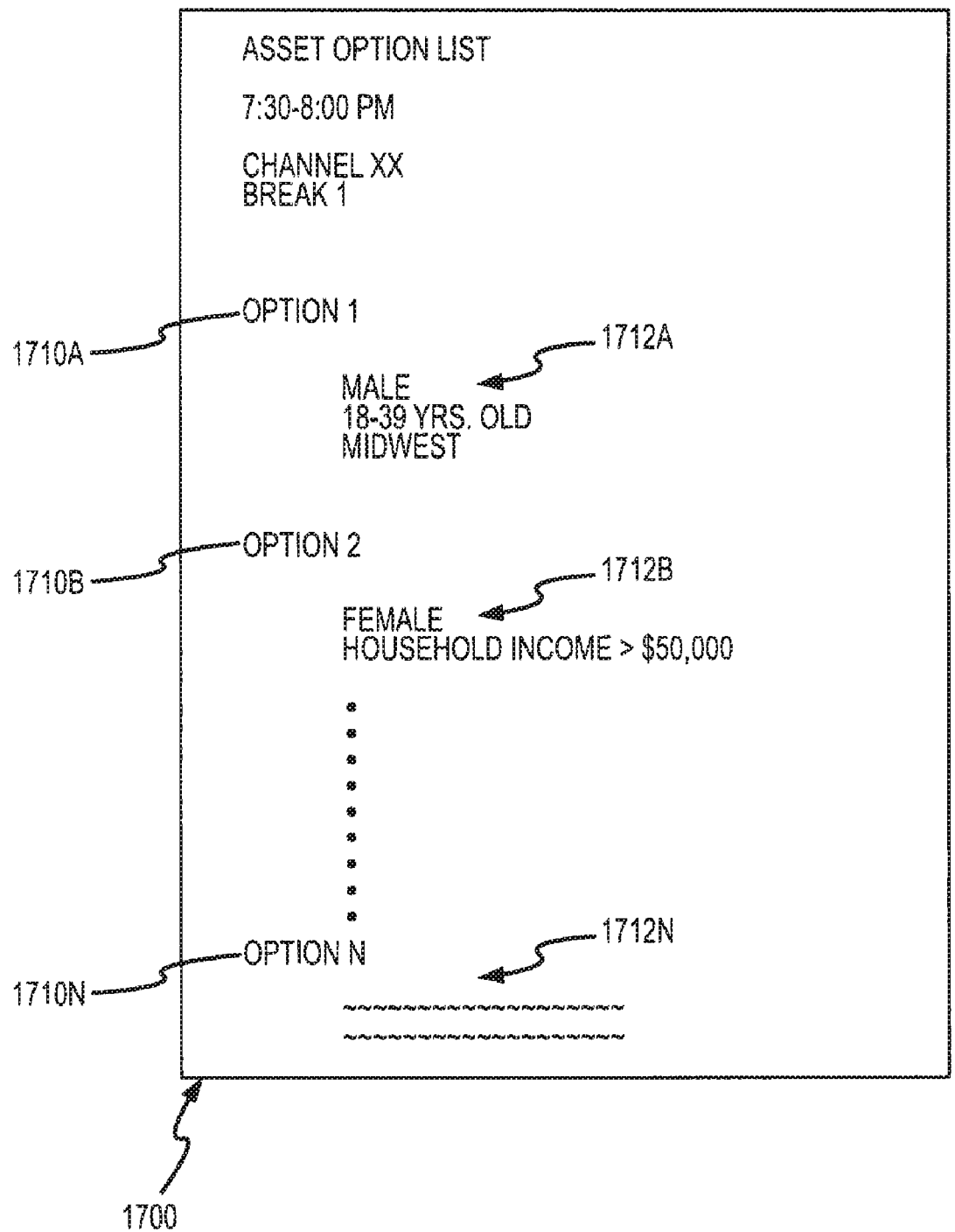
FIG. 17A shows an asset option list for a per break/per channel basis.

In order to provide statistical sampling for the network, a sub-set of less than all of the CPEs 1304 may provide signals to the network platform 1304. For instance, in a first arrangement, each CPE 1308 may include a random number generator. Periodically, such a random number generator may generate an output. If this output meets a predetermined criteria (e.g., a number ending with 5), the CPE 1308 may provide a signal to the network 1304 in relation to an option list. Alternatively, the platform 1304 may be operative to randomly select a subset of CPEs 1308 to receive a request for information. In any case, it is preferable that the subset of CPEs 1308 be large enough in comparison to the total number of CPEs 1308 to provide a statistically accurate overview of current network conditions. However, where a fully representative sampling is not available, attendant uncertainties can be addressed through business rules, e.g., providing a reduced price or greater dissemination to account for the uncertainty. Referring again to FIG. 14, as noted, a network operator initially provides an asset option list (the same as list 1010 of FIG. 10) to at least the CPEs within the network that will vote on assets from the list. Generally, the asset option list includes a list of available assets for one or more upcoming breaks. In this regard, it will be appreciated that a platform 1404 within the network, see FIG. 14, may be operative to obtain schedule information for all programming channels that have been identified to be supported by targeted assets. The platform 1404 may then use the schedule information to communicate with CPEs 1410 over the network interface 1440 prior to a break. In particular, the platform 1404 may be operative to provide the asset option list to CPEs 1410, for example, periodically. FIGS. 17A-17B illustrate exemplary asset option lists 1700. Specifically, FIG. 17A shows assets listed on a per break, per channel basis. FIG. 17B shows assets listed for multiple breaks (specifying audience classification parameters and, optionally, channels including virtual channels) in a single list. Each asset option 1710A-N in the list 1700 of FIG. 17A is available for viewing during a subsequent break. In this regard, an asset provider may have requested that each such asset option 1710A-N be made available for a particular time window and/or for a particular channel (i.e., which may include virtual channels). Furthermore, the asset option list 1700 may include one or more constraints 1712A-N for each available asset option 1710A-N. Such constraints 1712A-N may include, without limitation, audience classification parameter information such as the desired age range, gender, geographic location and/or household income of the target audience for each asset 1710A-N. Once the list 1710A-N of asset options is sent to a CPE 1410, the CPE 1410 reviews the asset options and votes on the suitability of providing those asset options to a current user of the CPE 1410. In the case of FIG. 17B, CPEs may vote with respect to all asset options matching the current programming channel or another channel deemed relevant.

Figure 18:
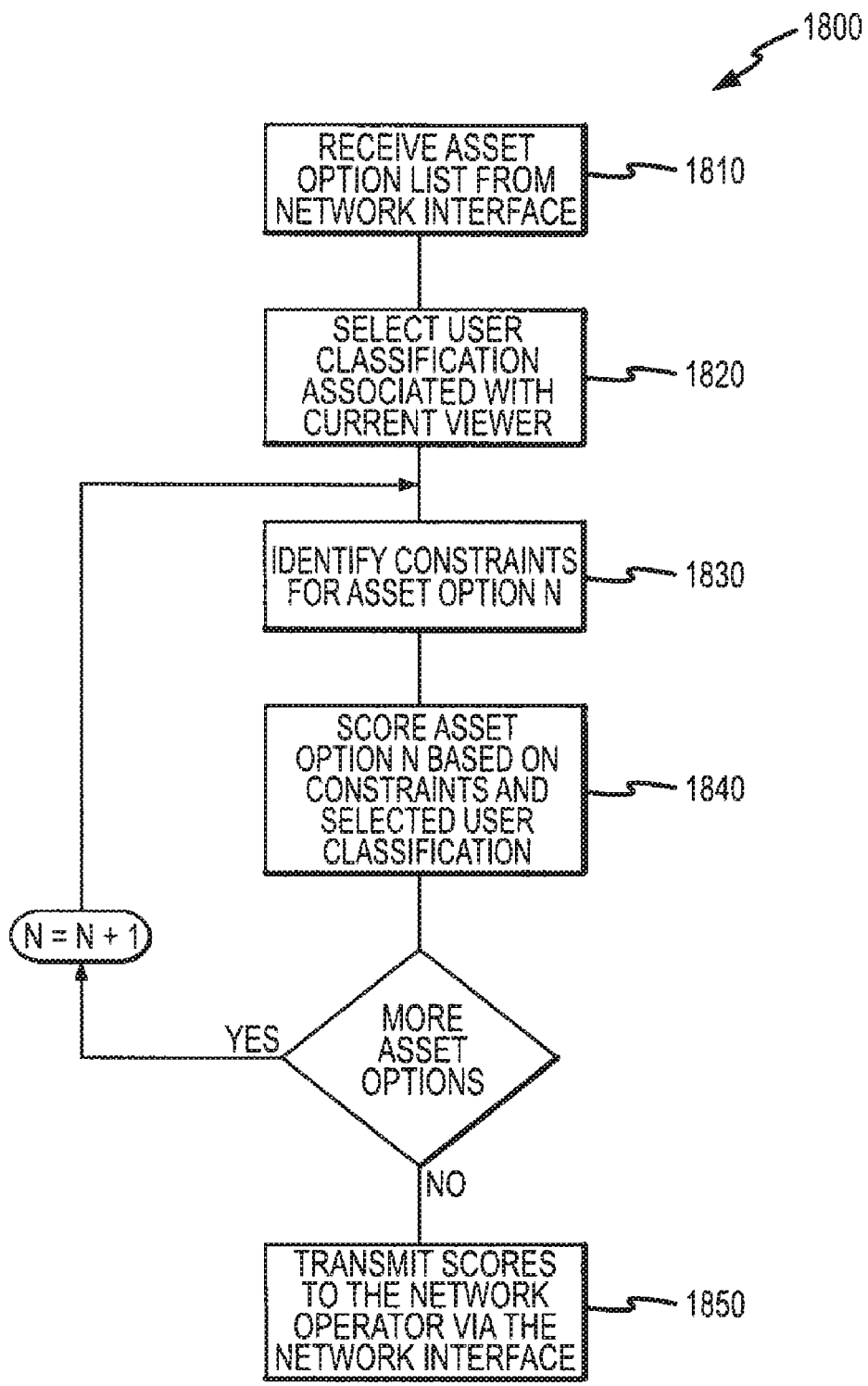
FIG. 18 illustrates a process in which CPEs may vote with respect to asset options for a programming channel.

This process 1800 is illustrated in FIG. 18. As shown, the CPE initially receives (1810) an asset option list corresponding to the assets that are available for at least one upcoming break. The CPE then selects (1820) current classification information, which includes putative information associated with one or more users of the household. The CPE then identifies (1830) constraints for a first asset within the list and scores (1840) the asset according to the suitability of the asset for insertion at a subsequent break. In general, the asset options are scored (1840) based on the constraints of the asset as well as the audience classification information. For instance, an asset having an age constraint (at least for the age parameter) specifying users between the ages of 50 and 60 may be scored low or not at all (at least for the age parameter) in relation to an audience classification indicating a current viewer is between the ages of 18 and 39. In one arrangement, the more closely the asset targeting constraints (which may be expressed in terms of audience classification parameters) and the audience classification information for a user match, the higher the score for that asset. Likewise, the greater the divergence between the targeting constraints and the audience classification information, the lower the score for that asset. In another arrangement, a simple positive (i.e., matching targeting constraints and audience classification) or negative (i.e., mismatch of targeting constraints and audience classification) may be provided.

A determination is then made as to whether there are additional assets for scoring. If so, the identification (1830) and scoring (1840) steps are repeated for each asset. Once each relevant asset within the asset option list has been scored (1840), the scores are transmitted (1850) to the network operator via the network interface. For example, the CPE may be instructed to return scores for the top N assets for a given break or spot, where N is dynamically configurable. By returning scores to the network operator rather than providing audience classification information for a particular user, information regarding a current network audience is gathered without exposing sensitive information to the network.

Generally, scores from the individual CPEs are tallied to form a composite score. The composite score indicates the degree to which, independent of a specific user, a particular asset would be suitable for viewing by a current audience during a subsequent break. In this regard, a network controller may rank the assets according to their composite scores for subsequent insertion during a break.

A number of factors in addition to vote scores may be relevant in this regard. First, CPEs may express a negative preference or exclusion. For example, in connection with a child user, certain subject matter may be excluded. This may be implemented by having the asset provider, a network operator or another party such as a regulatory entity enter an "adult only" or similar constraint in connection with the asset metadata. An appropriate field may be provided in connection with a GUI of platform 1370. In this manner, offensive asset delivery can be reduced or avoided for sensitive users. Asset providers or networks (to the extent that laws or regulations allow) may also define exclusions. Thus, an asset provider may indicate that an asset should or should not be run in connection with certain types of programs (e.g., that it should not be run in connection with a "G" rated program). As a further example, a political candidate may enter an exclusion to avoid airing assets on a news network or other network perceived to have a conflicting political base or agenda (or the network may exclude assets from that candidate). Commodity codes may also be used in this regard. Thus, assets may be associated with commodity codes relating to the subject matter of the asset. These codes may be used by asset providers, network operators or others to avoid undesired association (e.g., successive ads for competitive products). Similarly, networks having a religious affiliation may exclude assets deemed repugnant. Many more examples may be envisioned in this regard. Moreover, negative preferences or exclusions may be specific to users or households and may be implemented at the CPE. For example, parental control or idiosyncratic concerns may be addressed in this manner. It will thus be appreciated that exclusions or negative preferences may be entered by a variety of entities via a variety of interfaces and may be reflected in asset metadata, voting metadata, selection algorithms or other places.

An additional factor that may be considered in relation to voting and asset selection relates to the concepts of asset frequency and progress. Frequency defines the number of times that an asset provider desires an asset to be shown at a given CPE (or, in the present context, to a particular user) during a given time period (may be a week, a month, during a whole campaign or other period). Progress measures how well a given CPE (or user) is doing in achieving this target. These factors may be used in voting and asset selection. For example, if inadequate progress has been made to date by a user for a specific asset, that user's CPE will be more likely to vote for the asset at issue and to select it if available. Moreover, these factors may be considered at the headend. For example, if a large number of users are behind in terms of progress, that asset may be inserted in a flotilla regardless of voting and may be designated for obligatory delivery by at least the appropriate users.

More specifically, the flotilla constructor 1426 (See FIG. 14) may create a view list and/or populate a flotilla for a subsequent break. As shown in FIG. 16A, the flotilla includes multiple slots, e.g., of varying length, on asset channels 1601-1604. In one arrangement, the entire flotilla 1605 may be populated with assets based on the overall vote scores of the assets. For instance, the assets from the asset option list having the highest scores may be selected. The combined length of any sequence of assets selected for a given asset channel 1601-1604 will match the length of the break 1610. Alternatively, each asset channel may be populated with assets based on their scores as well as one or more demographic constraints.

For instance, during a major sporting event it may be anticipated (or verified from vote information) that a majority of the expected users of the relevant programming channel are males. Accordingly, three of the asset channels 1601-1604 may be populated with assets targeted to males. Alternatively, a designated proportion of the overall spots A-K may be dedicated to assets targeted to males, or voting may simply be allowed to proceed, presumably resulting in a large proportion of the inserted assets being male targeted assets (though it may be desired to reserve some spots for minority classification users). In this regard, the highest scoring assets directed to male viewers may be selected. Further, the three asset channels 1601-1603 (or individual spots) may be directed to sub-groups of male viewer (e.g., based on age and/or income). In contrast, the fourth asset channel 1604 (or a set of spots) may be populated with assets directed towards female viewers to provide asset delivery to a previously non-represented portion of the audience or all spots may be allocated based on voting, which may or may not apportion the spots as described. As will be appreciated, assets may be selected for the fourth asset channel 1604 to include, for example, the highest scoring assets from the asset option list that have a constraint indicating that the asset is targeted towards females. Once the flotilla is populated, the CPE of each household may select a particular asset channel for viewing during the break or may switch between assets contained on different asset channels within the flotilla based on audience classification information of the current user of the CPE.

It will be appreciated that other considerations may be involved in flotilla construction. For example, asset providers often desire to place assets in the first or the last spot within a break (hence, breaks are often 60 seconds long so as to include only first and last 30 second spots). Moreover, asset providers may require a particular asset sequencing or pay a premium for a certain placement regardless of voting rank. Accordingly, significant care may be required in populating a flotilla with respect to rank or other factors.

To enable the CPE to switch to a designated asset channel for a break (or, for certain implementations, between asset options within the flotilla during a break) metadata may be provided in connection with each asset channel(s) and/or programming channel(s). As will be appreciated, each individual asset channel is a portion of an asset stream having a predetermined bandwidth. These asset channels may be further broken into in-band and out-of-band portions. Generally, the in-band portion of the signal supports the delivery of an asset stream (e.g., video). Triggers may be transmitted via the out-of-band portion of a channel. Further, such out-of-band portions of the bandwidth may be utilized for the delivery of the asset option list as well as a return path for use in collecting votes and reporting information from the CPE. More generally, it will be appreciated that in the various cases referenced herein where messaging occurs between the CPE and a network platform, any appropriate messaging channels may be used including separate IP or telephony channels.

The metadata for particular assets may be included in the out-of-band portion of an associated asset channel and may be in the form of text messages. For instance, these text messages may be DCII text messages/headers that are multiplexed into the out-of-band portion of each asset channel. In this regard, the CPE may review the metadata of each asset channel to identify which asset channel contains asset most closely aligned with an audience classification of a current user.

Based on the metadata, the CPE may select individual assets or asset sets depending on the implementation. Thus, in certain implementations, the CPE may select an asset for the first time-slot of a break that best corresponds to the audience classification of the current user. This process may be repeated for each time-slot within a break. Alternatively, an asset flotilla may include a single metadata set for each asset channel and the CPE may simply select one asset channel for an entire break.

Figure 19:
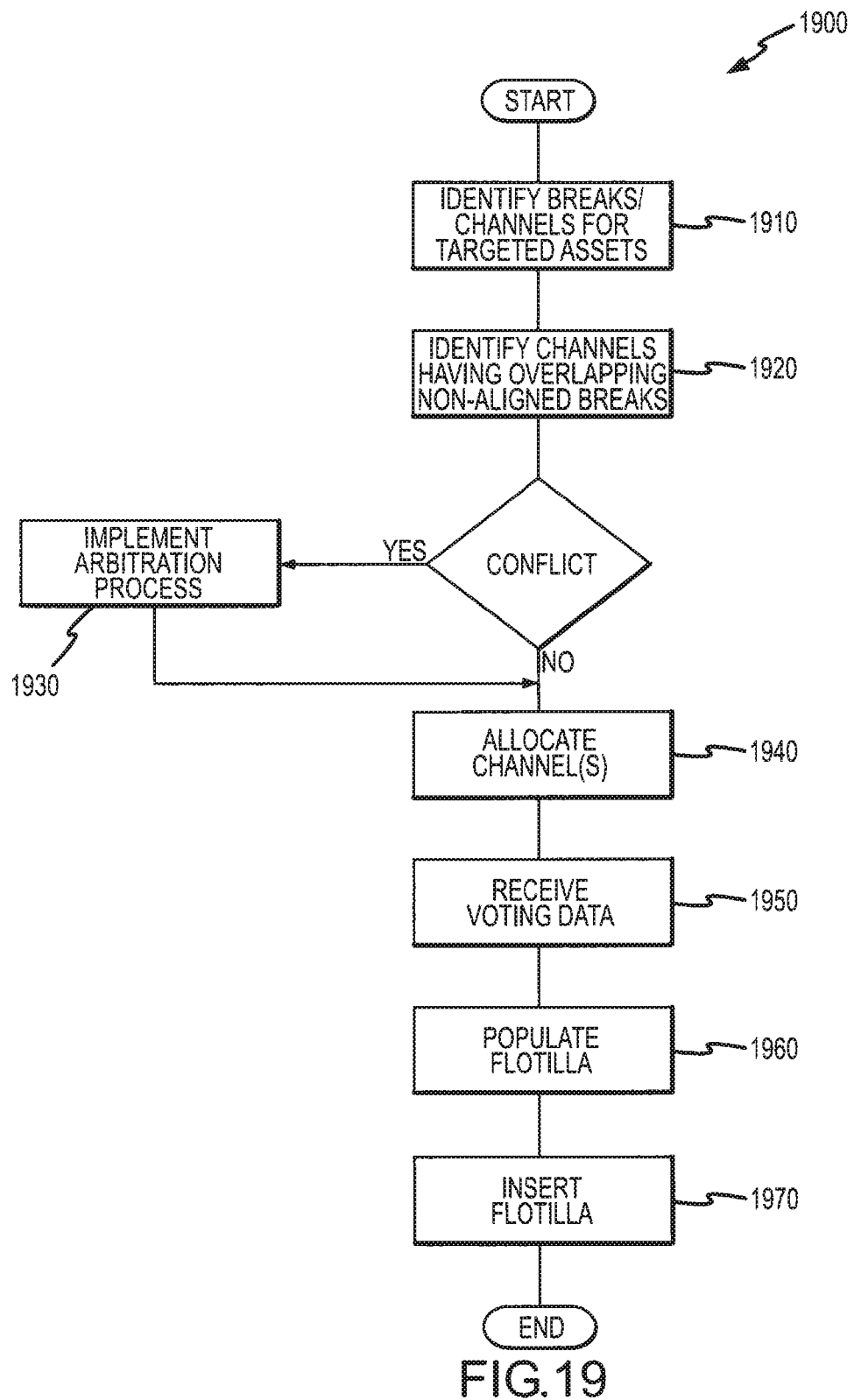
FIG. 19 illustrates a process of selecting assets for insertion into one or more asset channels.

Referring to FIGS. 14 and 19, the process 1900 of selecting assets for insertion into one or more asset channels is described. Initially, the platform 1404 identifies (1910) breaks in channels that are targeted for asset delivery. In this regard, the platform 1404 may access the schedule database 1420, which includes scheduling data for programming channels, to identify upcoming breaks. Further, the process may include identifying (1920) overlapping breaks of programming channels. If there is a conflict between two breaks identified for targeted assets, an arbitration process may be implemented (1930) by the arbitrator 1428. If no conflict exists, asset channels may be allocated (1940) to provide multiple asset options for an upcoming break. Accordingly, voting data may then be received (1950), for example from the voting data database 1424 (which stores data compiled from received votes), for an upcoming time period that includes the upcoming break.

Based on the voting data, the platform 1404 may access the asset options database 1422 to populate (1960) the asset channels that form the flotilla with assets for the upcoming break. Once the flotilla is populated (1960), it may be broadcast in synchronization with a break for which targeted asset delivery is provided. In this regard, the method may include inserting (1970) the flotilla into allocated asset channels and, perhaps, in the programming channel. As will be appreciated this step may include providing metadata in connection with the programming channel, asset channels or other bandwidth such that a CPE is aware that asset channels having alternate assets are available and can select therefrom. For example, metadata on the programming channel may indicate to the CPE which asset channels are available such that the CPE may monitor the available asset channels and select assets based on the audience classification of a current user and the asset channel metadata.

Figure 20:
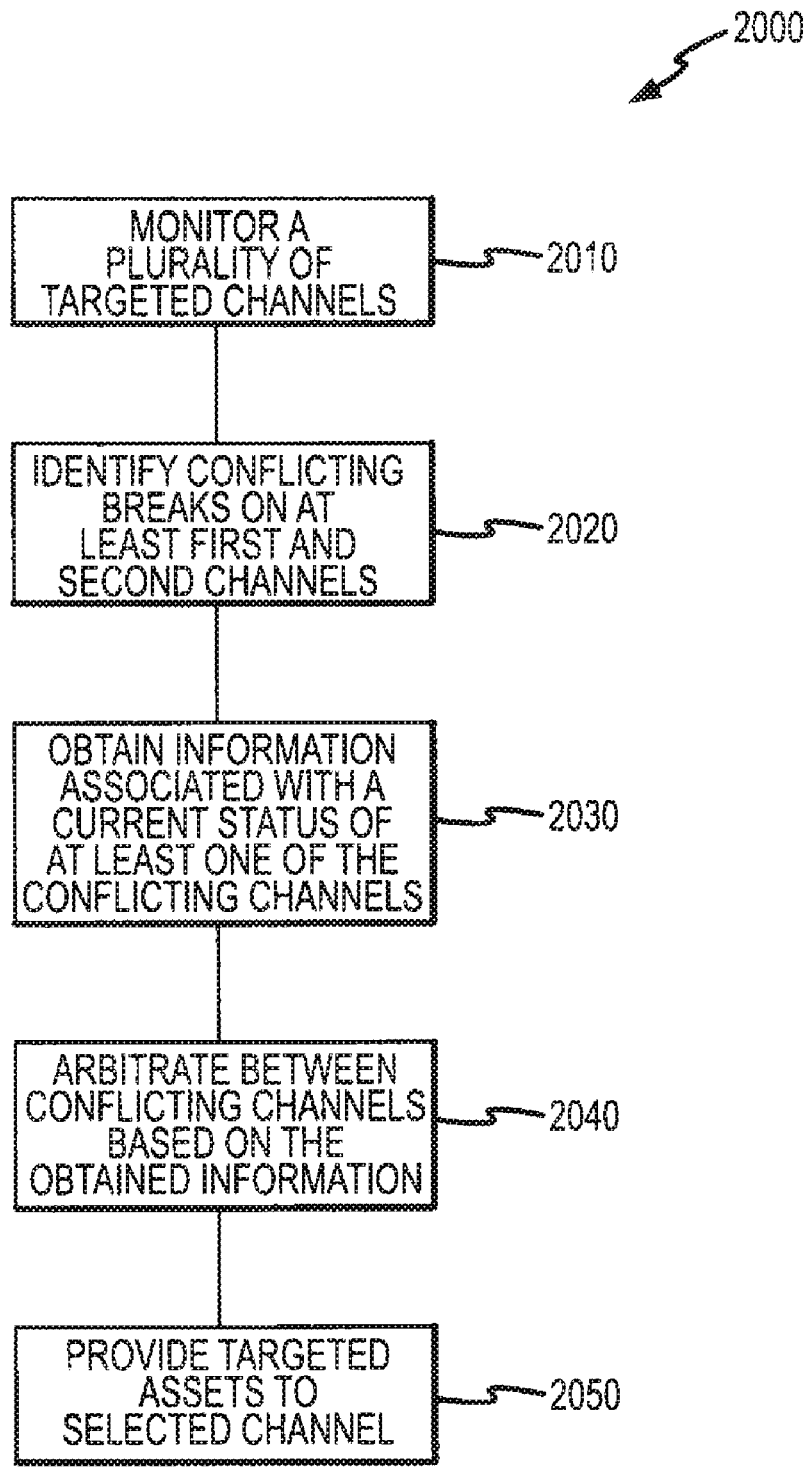
FIG. 20 illustrates an arbitration process wherein two or more programming channels have conflicting breaks.

Referring to FIG. 20, an arbitration process 2000 is illustrated. As noted above, in some instances two programming channels identified for targeted assets may have conflicting breaks. For instance, referring briefly to FIG. 15 it is noted that channels 1504 and 1506 have conflicting (i.e., non-aligned and overlapping) breaks 1514 and 1516. It should be noted that the exact timing of breaks cannot be determined with great precision and such timing is generally not known until a cue occurs. As discussed below, this timing can be estimated based on historical data to obtain a statistical probability function identifying when breaks will occur. Accordingly, in cases where limited bandwidth is available for providing targeted asset delivery, it may be desirable to arbitrate between channels apparently having conflicting breaks. This may allow, for example, asset providers to target one or more demographic groups that are better represented by one of the conflicting channels, to target the channel having a greater number of users or to proportionally allocate the bandwidth based on such factors. In this regard, the process may include monitoring (2010) a plurality of programming channels for which targeted asset delivery is provided and identifying (2020) a first upcoming break on the first channel and a second upcoming break on the second channel, where the first and second upcoming breaks are only partially overlapping. In the illustrated implementation, information associated with a current status of at least one, and more preferably both, of the first and second channels is obtained (2030). This information is utilized to arbitrate (2040) between the first and second channels in order to provide targeted asset delivery for at least one of the channels. For instance, the information may include information associated with a size of a current audience for one or both of the first and second channels. It may also include audience classification information. In this regard, it may be desirable to arbitrate (2040) between the first and second channel based on audience size; that is, to provide targeted asset delivery only or mostly for the channel having a larger viewing audience. Alternatively or additionally, audience classification information for the current users of the first and/or second channels may be obtained (it will often be desired to maximize revenues and, in this regard, an asset with a smaller target audience but a higher CPM may be selected for a given spot over an asset with a larger audience but lower CPM). As a further example, alternate flotillas may be constructed for a break based on voting and then the highest revenue flotilla may be inserted. Audience classification information may be inferred, for example, from the votes of CPEs of the first and second channels in responding to recently sent asset options lists. Likewise, arbitration (2040) may be made based on a desired audience classification parameter (e.g., high income individuals) irrespective of the overall size of the viewing audiences of the first and second channels. In this regard, the channel having a greater percentage or number of users of a desired classification may be selected. For example, an asset for a certain luxury car may have more value if delivered to a small audience, provided that that audience includes more prospective buyers. In this regard it is noted that flotilla optimization may involve maximizing factors other than vote scores, e.g., asset delivery revenues. Similarly, the criteria utilized for arbitration (2040) may be selected by asset providers. Once a channel is selected based on the arbitration (2040), targeted asset delivery may be provided (2050) to the selected channel. Of course, both channels may be supported with smaller flotillas.

B. Bandwidth Optimization

Bandwidth available for transmission of asset options is generally limited. Accordingly, the asset targeting system can be enhanced by optimizing the use of each asset channel and identifying additional bandwidth for exploitation. With regard to optimizing the use of each asset channel, scheduling information such as start times and end times for breaks may be obtained for each programming channel. That is, networks may define avail windows and this information may be accessed for use by the targeted asset delivery system. This information may be utilized to determine approximately when one or more breaks will occur on a given programming channel. Accordingly, such information may be utilized for targeting and arbitration purposes. For instance, referring to FIG. 15, it will be noted that channel 1506 includes separate avail windows 1550 and 1560 that correspond to two separate breaks 1516, 1562. However, in some instances a particular channel may not provide separate avail window information for separate breaks. For instance, for channel 1502, an avail window 1570 extends over the entire length of a programming period of the channel 1502. In these cases, multiple breaks may be defined within a single window. Thus, the first break may be indicated by a first cue tone (or message) for a window, a second break may be indicated by a second cue tone within a window, etc. It will be appreciated that, if a cue tone is missed in the conventional avail window context, the assets of all subsequent breaks may be affected.

Figure 21:
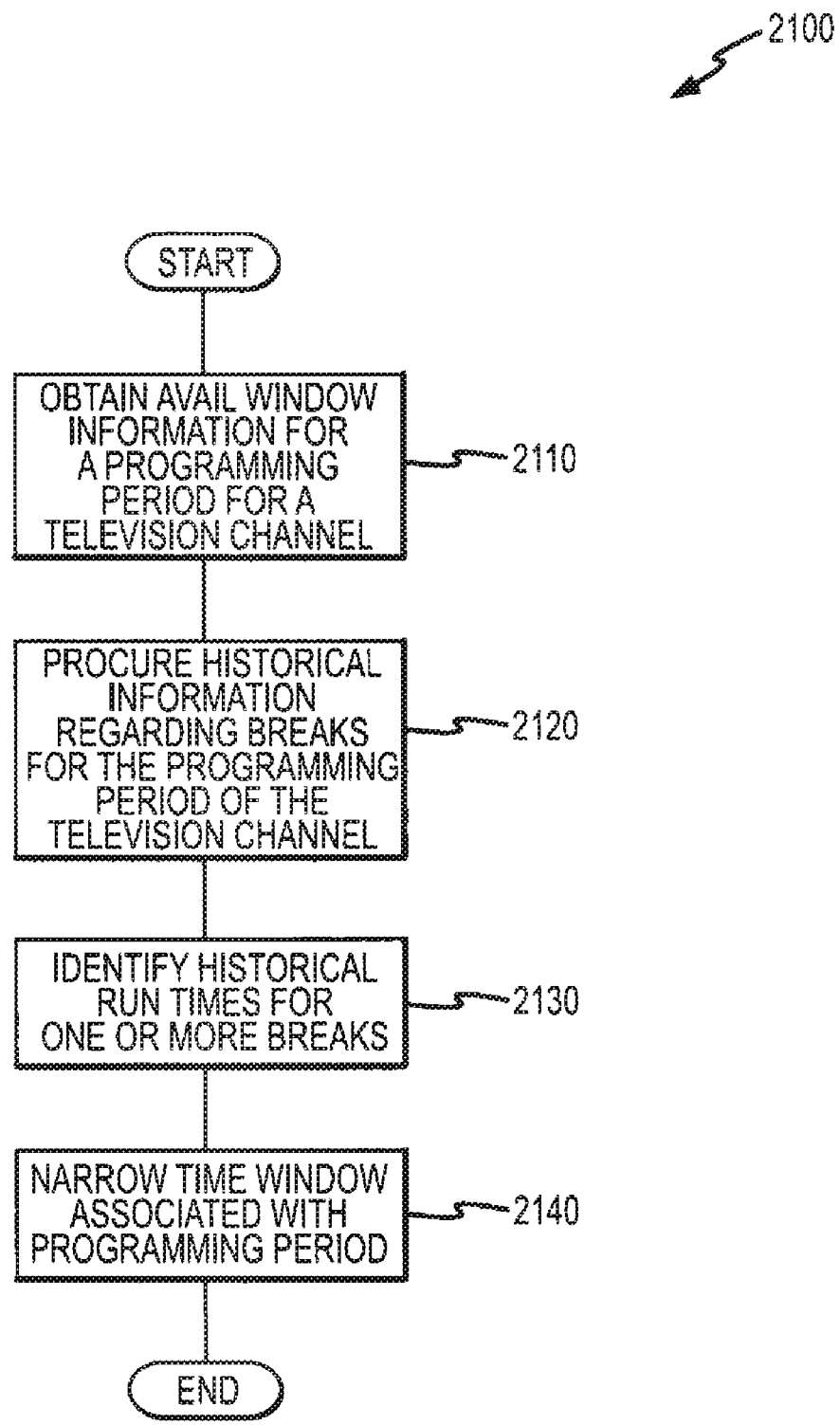
FIG. 21 illustrates a process of shortening network provided avail window information for a programming period of at least a first programming channel.

As avail window information does not correspond directly to break start and end times, information about the avail windows 1550, 1560 and 1570 may not alone allow for identifying when breaks will occur and/or if breaks on different channels will be overlapping. Accordingly, a process is provided for narrowing avail windows such that available bandwidth for targeted asset delivery may be more effectively utilized and/or allocated. Referring to FIG. 21, the process (2100) begins by obtaining (2110) network provided avail window information for a programming period of at least a first programming channel. The avail window information identifies at least a first time period during which one break occurs. More generally, avail window information may be obtained (2110) for a plurality of channels (e.g., channels 1502, 1504 and 1506). Once the network provided window information is obtained (2110), historical information associated with the programming period of the programming channel(s) is procured (2120). For example, the system of the present invention may gather actual break times and statistically process this information. The historical information is analyzed to identify (2130) historical run times for one or more breaks of the programming period for the programming channel(s). In this regard, the system may begin with only the available window information or with baseline estimates of break times (which may be wrong). In either case, the system can then learn break times by monitoring breaks on channels of interest. The system may be seeded with some historical information.

For instance, it may be determined that for a specified 30 minute programming period of a sitcom, that a first break may start between four and six minutes after the hour or half-hour and end between six and eight minutes after the hour or half-hour. Likewise, the beginning and ending times of other breaks during the programming may be determined. Based on the historical information, the avail windows for a given channel may be narrowed (2140) to better correspond with historic break start times and end times. For instance, an average start time for a break may be at five minutes after the hour, however, the start time may vary between four and six minutes. Accordingly, the avail window start time may be set at three and a half minutes after the hour to provide a buffer period. An end time for the avail window may likewise be set to extend beyond an expected/historic end time for the break. In this regard, a single avail window (e.g., avail window 1570 of channel 1502) may be shortened to correspond more closely with a break (e.g., break 1512) and/or broken into temporally separate time periods that correspond with separate breaks. As noted above, probability functions can be generated to describe when breaks will occur, and the best allocation of available bandwidth can be based on these probabilities. In some cases, breaks will not occur when expected and, therefore, unexpected conflicts may arise. It is expected that arbitration processes can be implemented with little lead time in these cases. In any event, if asset channels are unavailable, targeted assets will still be available on the programming channel.

Figure 16C:
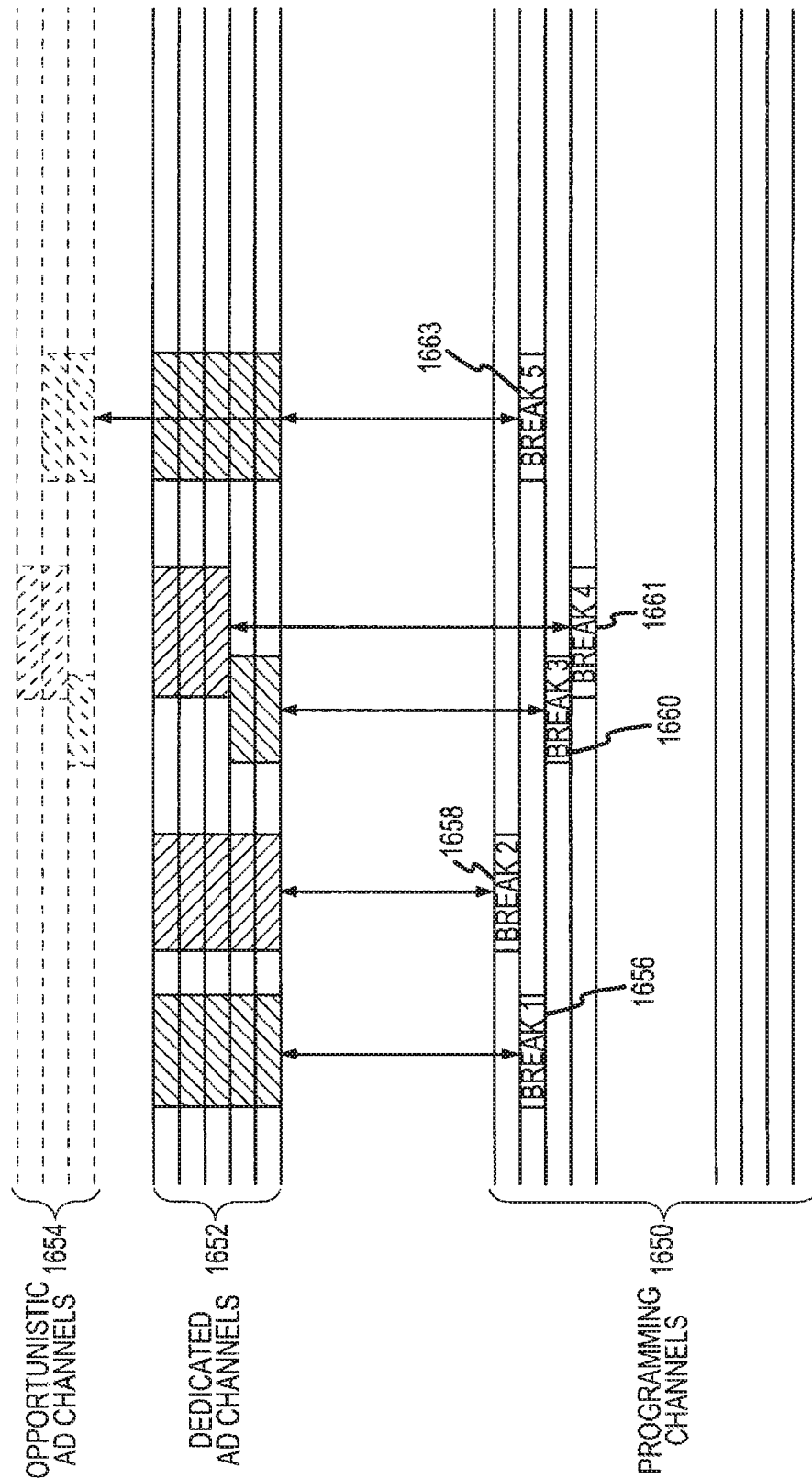
FIG. 16C illustrates improved asset options via an increase in available bandwidth

As will be appreciated, by narrowing the windows on two or more programming channels, it may be determined that breaks of those channels are non-overlapping. This may allow for providing targeted asset delivery using all available asset channels for both programming channels. Alternatively, it may be determined that breaks of first and second channels are partially overlapping and that arbitration between the channels is required. In any case, once the asset windows are narrowed, the system may limit monitoring for each programming channel to the narrowed avail time windows. Narrowing the avail windows improves use of the available bandwidth. In this manner, asset options can be enhanced by a process of asset bandwidth multiplexing. Thus, a given asset channel may support asset options for a first programming channel at a first time, for a second programming channel at a second time, and so on. This multiplexing is enhanced by narrowing the avail windows on a statistical basis as discussed above. Asset options can be further improved by increasing the available bandwidth. This is illustrated in FIG. 16C. The network bandwidth includes programming channel bandwidth 1650 which may be divided into a number of programming channels, dedicated asset channel bandwidth 1652 which, as described above may include a number of channels that are dedicated to delivery of asset options, and opportunistic asset channel bandwidth 1654 which includes channels that, although not dedicated to delivering asset options, may be available for this purpose from time to time. The system of the present invention is operative to identify and exploit the opportunistic asset channels. For example, certain channels in a cable television network may be used at certain times to deliver video on demand content. When these channels are not being used to deliver video on demand content, they may be exploited by the present invention to provide additional asset options. Similarly, as discussed above, networks often include node filters that utilize available bandwidth to deliver programming channels only upon demand by users within the node area. In these cases, where the node area users have not demanded programming channels that fully utilized the available bandwidth, channels may be opportunistically available for transmission of asset options.

In FIG. 16C, the dedicated asset channel bandwidth 1652 is illustrated as including five dedicated asset channels. In addition, for the illustrated time period, the network is shown as including opportunistic asset channel bandwidth 1654 including four additional opportunistic asset channels. The illustrated breaks of 1656, 1658, 1660, 1661 and 1663 illustrate a variety of ways in which the bandwidth 1652 and 1654 may be utilized. Thus, breaks 1656 and 1658 occur at non-overlapping times. Accordingly, each break 1656 or 1658 can be supported by all of the dedicated asset channels and, in this case, do not utilize the opportunistically available asset channels 1654 (though the opportunistic asset channels may be utilized to support a broader array of targeting options). Breaks 1660 and 1661 overlap and thus present a conflict with regard to scheduling of the dedicated asset channels 1652. In the illustrated example, the dedicated asset channels are apportioned as between breaks 1660 and 1661, for example, in proportion to the size of the audience on those channels. Alternatively, the available asset options may be supplemented by using the opportunistic asset channel 1654 as indicated in phantom. Finally, for break 1663, all of the dedicated asset channels 1652 and some of the opportunistic asset channels 1654 are utilized to support an increased range of asset options in support of the break 1663.

C. Dynamic Scheduling

Figure 22:
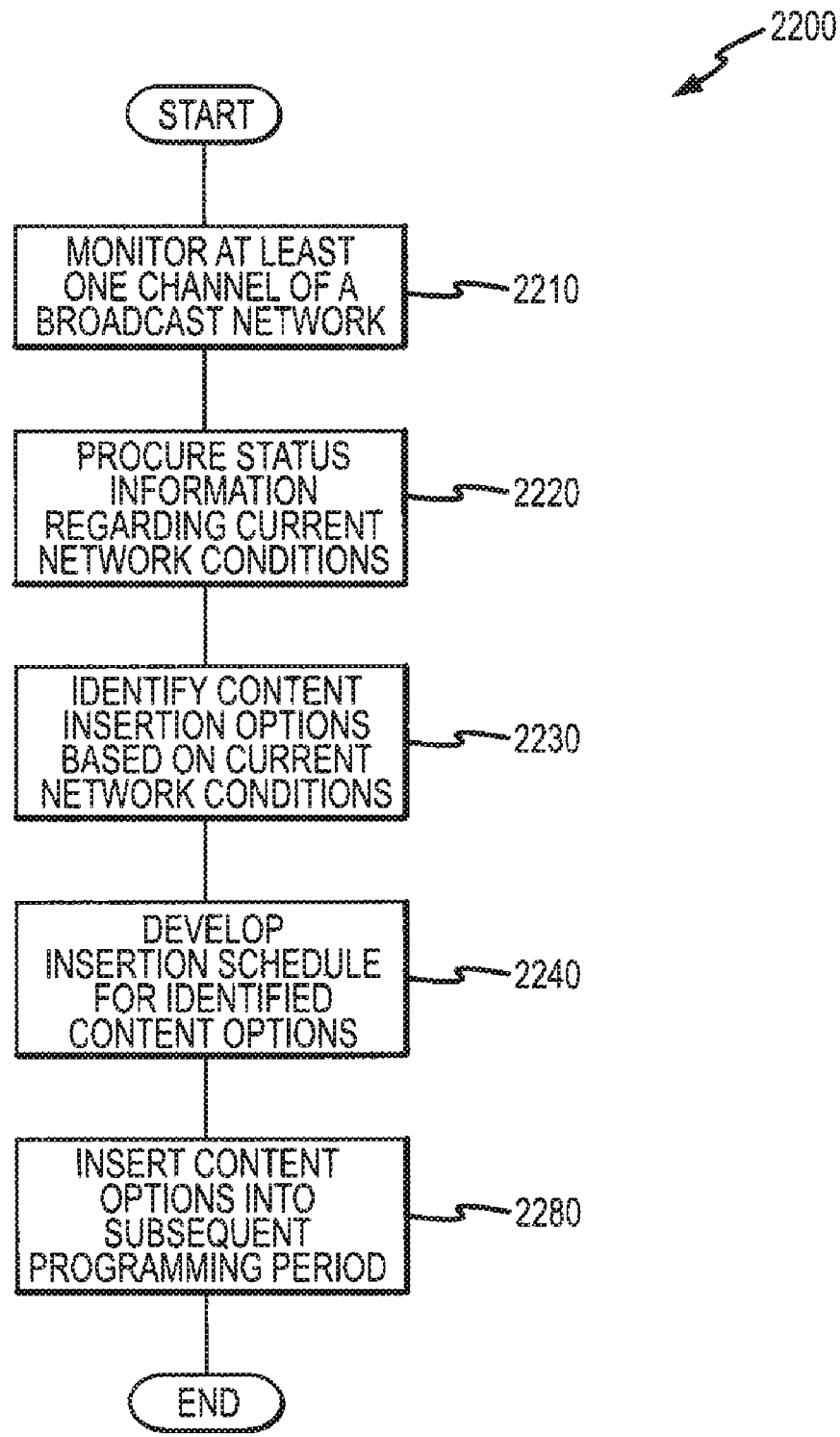
FIG. 22 illustrates a process directed to dynamic insertion of assets with respect to a break of a television programming.

As noted above, the system allows for dynamically inserting assets in support of one or more programming channels based on current network conditions. That is, assets may be selected for programming channels in view of current network conditions as opposed to being selected ahead of time based on expected network conditions. A process 2200 directed to dynamic insertion of assets with respect to a break of a television programming is illustrated in FIG. 22. As shown, the process begins by monitoring 2210 a programming channel, for example, to determine a current program or current audience size. It will be appreciated that a number of programming channels may be monitored. In any case, status information regarding a current status of at least one programming channel is procured (2220). Such procurement may include the receipt of signals from one or more CPEs (e.g., DSTBs) within the broadcast network. In this regard, such status information may be received in substantially real-time or at least within a time period that corresponds closely with the break for which targeted assets are provided. The status information may include, without limitation, the current programs, the size of the current audience for one or more programming channels, audience classification information regarding the audience of a current programming channel, and/or the geographic composition of an audience of a current programming channel and, of course, votes with regard to classification including geography. Such information is preferably acquired, if at all, with due care to address privacy concerns. Based on such current status information, asset insertion options may be identified (2230) for an upcoming programming period of one or more programming channels. For instance, asset options may be selected based on current network conditions. In one arrangement, an asset insertion schedule for a subsequent programming period may be developed (2240) based on the current network conditions. By way of example, an asset flotilla for a subsequent break may be populated with assets based on current network conditions. Accordingly, the selected assets may be inserted (2250) into the subsequent break.

Such a process may ensure that high value air time is populated with appropriate assets. For instance, where current network conditions may indicate that an audience is larger than expected for a current programming period, higher value assets may be utilized to populate breaks. Such conditions may exist when, for example, programming with high asset delivery value and a large expected audience extends beyond a predetermined programming period into a subsequent programming period with low asset delivery value (e.g., a sporting event goes into overtime). Previously, assets directed to the subsequent low value programming period might be aired to the larger than expected viewing audience based on their pre-scheduled delivery times resulting in reduced revenue opportunities. The present system allows for dynamic (e.g., just-in-time) asset scheduling or, at least, overriding pre-scheduled delivery based on changing network conditions.

D. Reporting

It would be possible to implement the targeted asset system of the present invention without receiving reports from CPEs indicating which assets, from among the asset options, were delivered to the user(s). That is, although there would be considerable uncertainty as to what assets were delivered to whom, assets could be priced based on what can be inferred regarding current network conditions due to the voting process. Such pricing may be improved in certain respects in relation to ratings or share-based pricing under the conventional asset delivery paradigm. Alternatively, pricing may be based entirely on demographic rating information such as Nielsen data together with a record of asset insertion to build an estimate of the number of users who received an asset. For example, this may work in connection with programming channels that have good rating information.

However, in connection with the CPE selection model of the present invention, it is desirable to obtain report information concerning actual delivery of assets. That is, because the asset selection occurs at the CPE (in either a forward-and-store or synchronized transmission architecture) improved certainty regarding the size and audience classification values for actual delivery of assets can be enhanced by way of a reporting process. As described below, the present invention provides an appropriate reporting process in this regard and provides a mechanism for using such report information to enable billing based on guaranteed delivery and/or a goodness of fit of the actual audience to the target audience. In addition to improving the quality of billing information and information available for analysis of asset effectiveness and return on investment, this reporting information provides for near real time (in some reporting implementations) audience measurement with a high degree of accuracy. In this regard, the reporting may be preferred over voting as a measurement tool because reports provide a positive, after-the-fact indication of actual audience size. Accordingly, such information may allow for improved ratings and share data. For example, such data may be licensed to networks or ratings measurement entities.

Figure 23A:
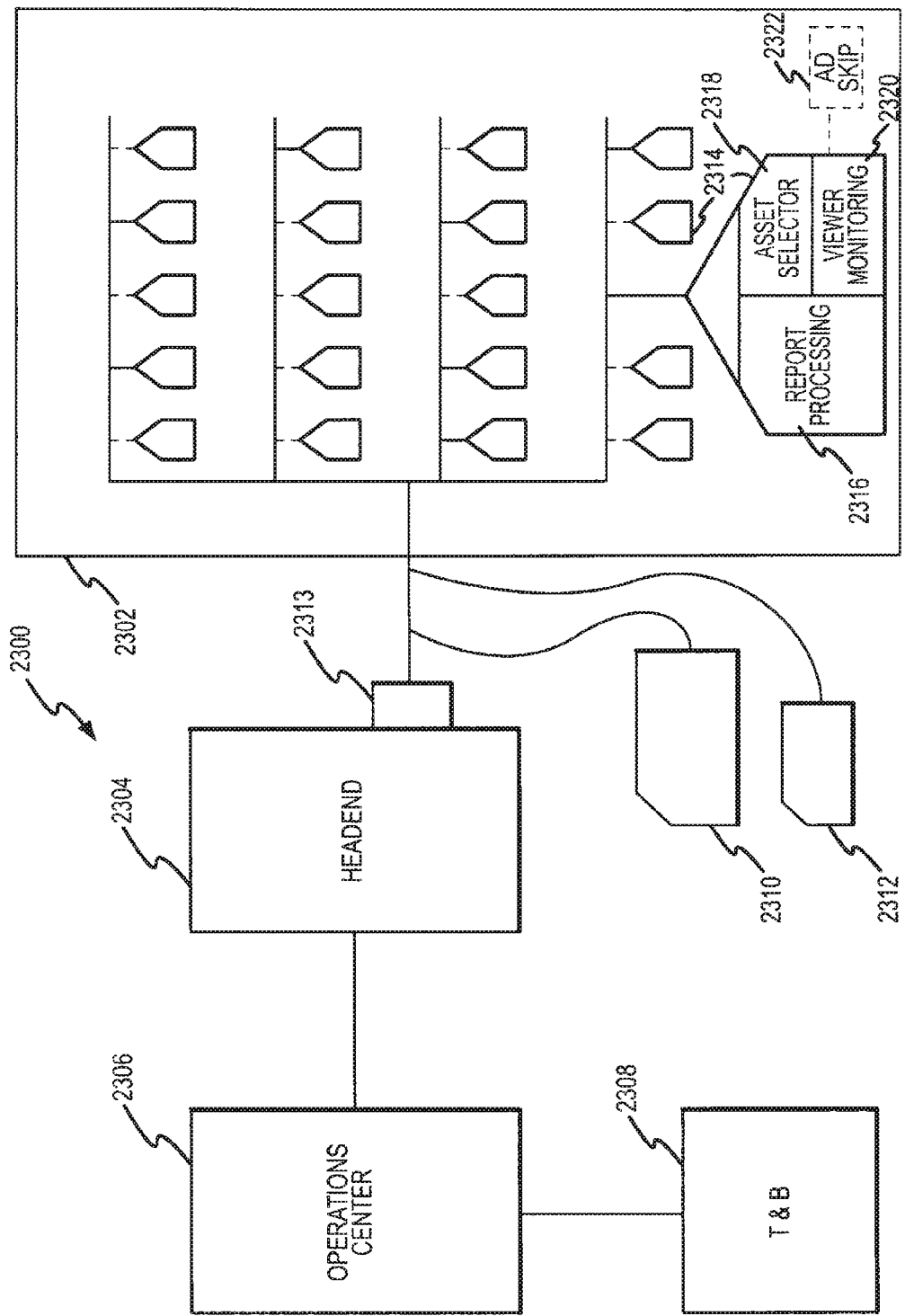
FIG. 23A illustrates a reporting system.

FIG. 23A illustrates a reporting system 2300 in accordance with the present invention. The reporting system 2300 is operative to allow at least some users of a participating user group, generally identified by reference numeral 2302, to report actual asset delivery. In the illustrated implementation, such report information is transmitted to a network platform such as a headend 2304. The report information may be further processed by an operations center 2306 and a traffic and billing system 2308.

More specifically, report information is generated by individual CPEs 2314 each of which includes a report processing module 2316, an asset selector module 2818 and a user monitoring module 2320. The user monitoring module 2320 monitors inputs from a current user and analyzes the inputs to determine putative audience classification parameter values for the user. Thus, for example, module 2320 may analyze a click stream from a remote control together with information useful for matching a pattern of that click stream to probable audience classification parameter values.

These classification parameters may then be used by the asset selector module 2318 to select an asset or asset sequence from available asset options. Thus, as described above, multiple asset sequences may be available on the programming channel and separate asset channels. Metadata disseminated with or in advance of these assets may identify a target audience for the assets in terms of audience classification parameter values. Accordingly, the module 2318 can select an asset from the available options for delivery to the user (s) by matching putative audience classification parameter values of the user to target audience classification parameter values of the asset options. Once an appropriate asset option has been identified, delivery is executed by switching to the corresponding asset channel (or remaining on the programming channel) as appropriate.

The report processing module 2316 is operative to report to the headend 2304 information regarding assets actually delivered and in some implementations, certain audience classification parameter values of the user (s) to whom the asset was delivered. Accordingly, in such implementations, the report processing module 2316 receives asset delivery information from module 2318 and putative audience classification parameter information for the user (s) from the user monitoring module 2320. This information is used to populate various fields of a report file. In other implementations, audience classification information is not included in the report. However, it may be presumed that the asset was delivered to a user or users matching the target parameters. Moreover, such a presumption may be supported by a goodness of fit parameter included in the report. Thus, audience classification information may be inferred even where the report is devoid of sensitive information.

In a preferred implementation of the present invention, the reporting system 2300 may operate in a standard mode or an exposed mode. In the standard mode, the transmitted report file 2312 is substantially free of any sensitive information. Thus, for example, the file 2312 may identify the assets actually delivered, on what channel and, optionally, goodness of fit measures as described above. The file 2312 may also include an identification code for the user at least in its header field. This identification code and any other information that may be deemed sensitive from a privacy perspective may be deleted or hashed as an early step in report processing. In the illustrated implementation, a sanitizing module 2313 deletes or hashes such information before further processing at the headend 2304. Additionally, in the standard mode, the report information may be anonymized and aggregated by module 2313 prior to further processing, for example, for purposes of publishing audience size and demographics or estimating the target universe for future broadcasts.

In the exposed mode, a report file 2310 may include more information including sensitive information. For example, information such as name, age, gender, income and the like for a user may be included in the file 2310. In this regard, various levels of exposed mode may be defined corresponding to various levels of allowed potentially sensitive information. This information may be useful, for example, for comparison with estimated values to monitor system performance and to diagnose errors. This information also allows for demonstration that targeting works. It will be appreciated that operation in the exposed mode may be limited to a small number of users who have consented to inclusion of potentially sensitive information in report files. In this regard, there may be individual control of participation in exposed mode operation (and at what level of exposed mode) at the CPE level.

The report files pass through the headend 2304 and are processed by an operations center 2306. The operations center 2306 is operative to perform a number of functions including processing report information for submission to billing and diagnostic functions as noted above. The operations center 2306 then forwards the processed report information to the traffic and billing system 2308. The traffic and billing system 2308 uses the processed report information to provide measurement information to asset providers with respect to delivered assets, to assign appropriate billing values for delivered assets, and to estimate the target universe in connection with developing new asset delivery contracts.

In order to reduce the bandwidth requirements associated with reporting, a statistical reporting process may be implemented similar to the statistical voting process described above. In particular, rather than having all CPEs report delivery with respect to all breaks, it may be desirable to obtain reports from a statistical sampling of the audience 2302. For example, the CPE of each user may include a random number generator to generate a number in connection with each reporting opportunity. Associated logic may be configured such that the CPE will only transmit a report file when certain numbers are generated, e.g., numbers ending with the digit "5". Alternatively, the CPE may generate reports only upon interrogation by the headend 2304 or the headend 2304 may be configured to interrogate only a sampling of the audience 2302. Such statistical reporting is graphically depicted in FIG. 23 where users selected to report with respect to a given reporting opportunity are associated with solid line links and deselected users are associated with a broken line links. Moreover, reporting may be batched such that all reports for a time period, e.g., 24 hours or seven days, may be collected in a single report transmission. Such transmissions may be timed, for example, to coincide with low messaging traffic time periods of the network. Also, the reports from different CPEs may be spread over time as described below.

The reporting system 2300 may optionally be configured to implement asset skip functionality. In certain cases, it may be possible for users to skip assets as by fast forwarding through the asset delivery time period. In these cases, the asset provider suffers a diminution of return on its investment. Specifically, as noted above, a programming asset is provided at considerable cost. In the case of asset supported networks, this cost is subsidized in whole or in part by asset delivery revenues. That is, asset providers pay for the opportunity to deliver commercial impressions to users. In the context of the system of the present invention, the cost of these assets can be readily translated into a cost per consumer per asset. That is, because the number of targeted impressions is known from the reporting information, and the cost per asset is known from the contact information, a cost per user per asset can be directly calculated. When a user skips an asset, the value to the asset provider is diminished by this amount. In the illustrated system 2300, asset skipping events can be detected and this information can be reported. The injured asset provider can then be compensated for this diminution in value and/or the user can be billed to compensate for such asset skipping. For example, in the latter regard, programming assets can be delivered at a discount to users who agree to accept delivery of assets. In VOD or DVR contexts, other users can skip those assets. This facilitates asset delivery support in certain contexts that have previously been limited, as a practical matter, to pay-per-view. For example, movies or near-term (e.g., next day) re-runs of network programming provided via a forward-and-store architecture may be asset supported as asset providers will have reasonable assurance that their assets have been delivered.

Figure 23B:
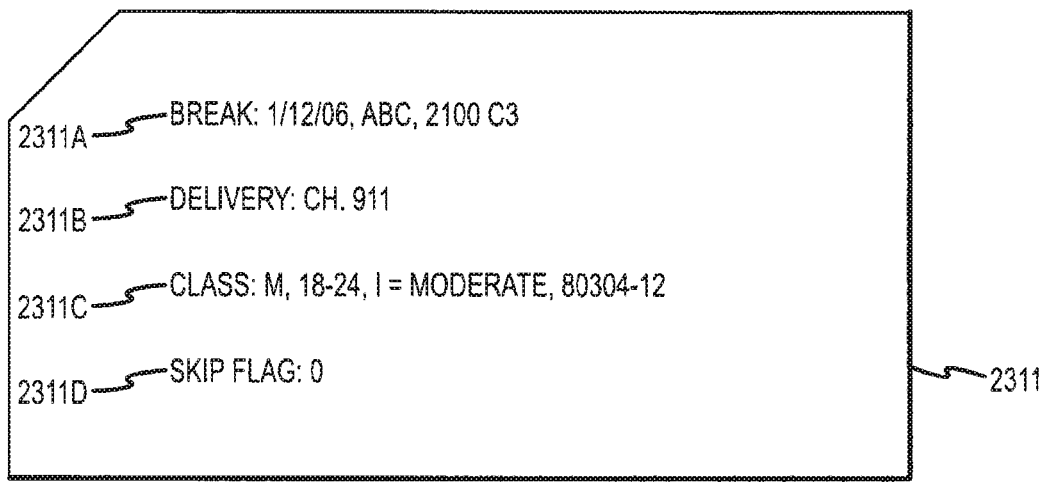
FIG. 23B illustrates information that may be included in a report file.

In this regard, the illustrated system 2300 optionally includes an asset skip module 2322. The asset skip module 2322 is operative to identify asset skip events (full or partial) and to report this information to the network. For example, asset skip events may be identified based on monitoring a click stream from a remote control or otherwise monitoring the video stream delivered to the user. As shown in FIG. 23B, appropriate information may be included in this regard in a report file 2311. For purposes of illustration, the file 2311 includes four types of report information 2311A-D. 2311A identifies the break or spot at issue. Field 2311B indicates the asset option that was selected by the CPE. For example, the selected asset may be identified by reference to an associated asset channel. This information is useful to identify the injured asset provider so that the asset provider may optionally be compensated for the asset skip. Field 2311C identifies certain audience classification parameter values for the user, which may be included, for example, in exposed mode operation. Finally, field 2311D includes a skip flag to indicate whether or not the asset was skipped. This field 2311D allows for compensating asset providers and appropriately billing users in relation to asset skipping.

Figure 24:
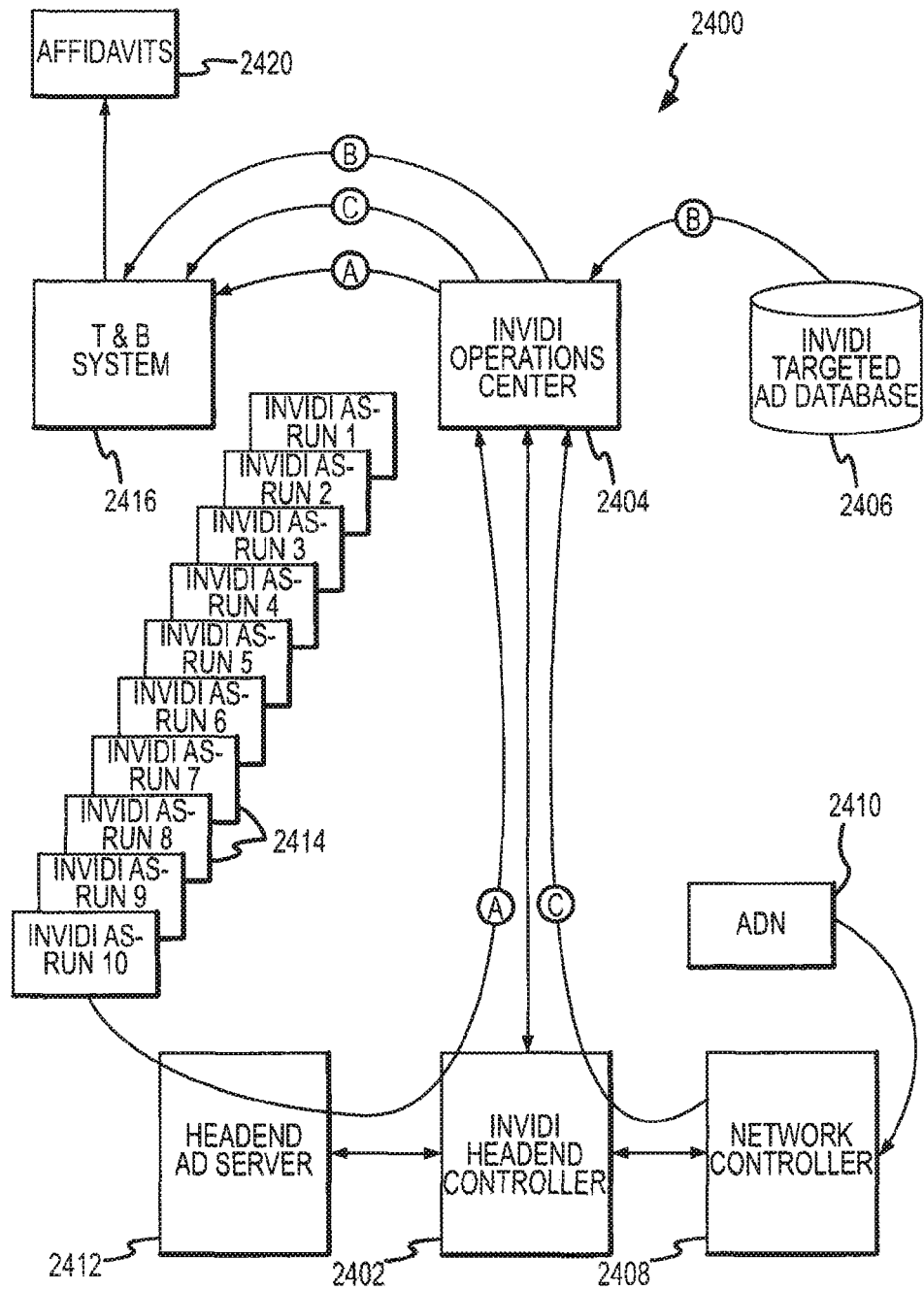
FIG. 24 illustrates various network components of a reporting system and their connections to other functional components of the overall targeted billing system.

FIG. 24 illustrates the various network components of a reporting system 2400, as well as their connection to other functional components of the overall targeted billing system. The illustrated system includes a headend controller 2402, an operations center 2404 and a T&B system 2416. In conventional networks without targeted asset delivery, the traffic and billing system generally serves a number of functions. Among these, a trafficking function involves order entry and assigning assets to spots. In this regard, an asset delivery schedule is built such that the headend knows to insert a particular asset upon receiving an identified cue. Another function relates to billing. When the headend inserts an asset, it generates an as run log. These as run logs are used by the traffic and billing system to generate affidavits verifying delivery of the assets for purposes of billing. In the case of conventional networks, this is a straightforward process because the headend knows what was inserted and therefore what was delivered. Moreover, conventional networks do not directly measure delivery.

In the case of a targeted asset delivery system in accordance with the present invention, this is somewhat more complicated. Order entry involves audience aggregation, spot optimization and other concepts as described herein. An interface for facilitating this process is described in detail below. With regard to billing, it is desired to provide the T&B system 2416 with information analogous to the conventional as run logs (plus report information), but delivery information originates from the CPEs. Moreover, knowledge of what asset was delivered in connection with what programming channel generally requires: 1) a report from the CPE indicating what asset channel was employed for what spot; 2) what asset was inserted on that asset channel for that spot; and 3) what programming channel that asset channel was associated with for that spot.

The illustrated headend controller 2402 generates as-run logs 2414 for all asset channels identifying the targeted assets that have been transmitted via the asset channels. Thus, in step A of the illustrated system 2400, the as-run logs 2414 from the headend controller 2402 are processed by the operations center 2404. This processing provides a network based accounting for use by the T&B system 2416 of all targeted assets that were inserted by the asset server 2412 on the asset channels. In step B, virtual channels are correlated to programming channels based on information from the targeted asset database 2406. In step C of the illustrated system 2400, report information is processed. Specifically, an Asset Delivery Notification (ADN) 2410 including report information is obtained via network controller 2408 in connection with each asset delivery by the CPEs or a representative sampling thereof. This information identifies at least the spot or break and the asset or asset channel selected. As noted above, all digital set top boxes can be configured to either return or not return ADNs.

The as run logs 2414 together with the ADNs 2410 and targeted asset database information provide a clear picture of what targeted assets were played with respect to each programming channel and how many digital set top boxes actually delivered the assets. This information can be used to generate affidavits 2420 verifying actual asset delivery. As discussed in more detail below, this enables a new asset delivery paradigm involving a guaranteed delivery of targeted impressions.

Figure 25:
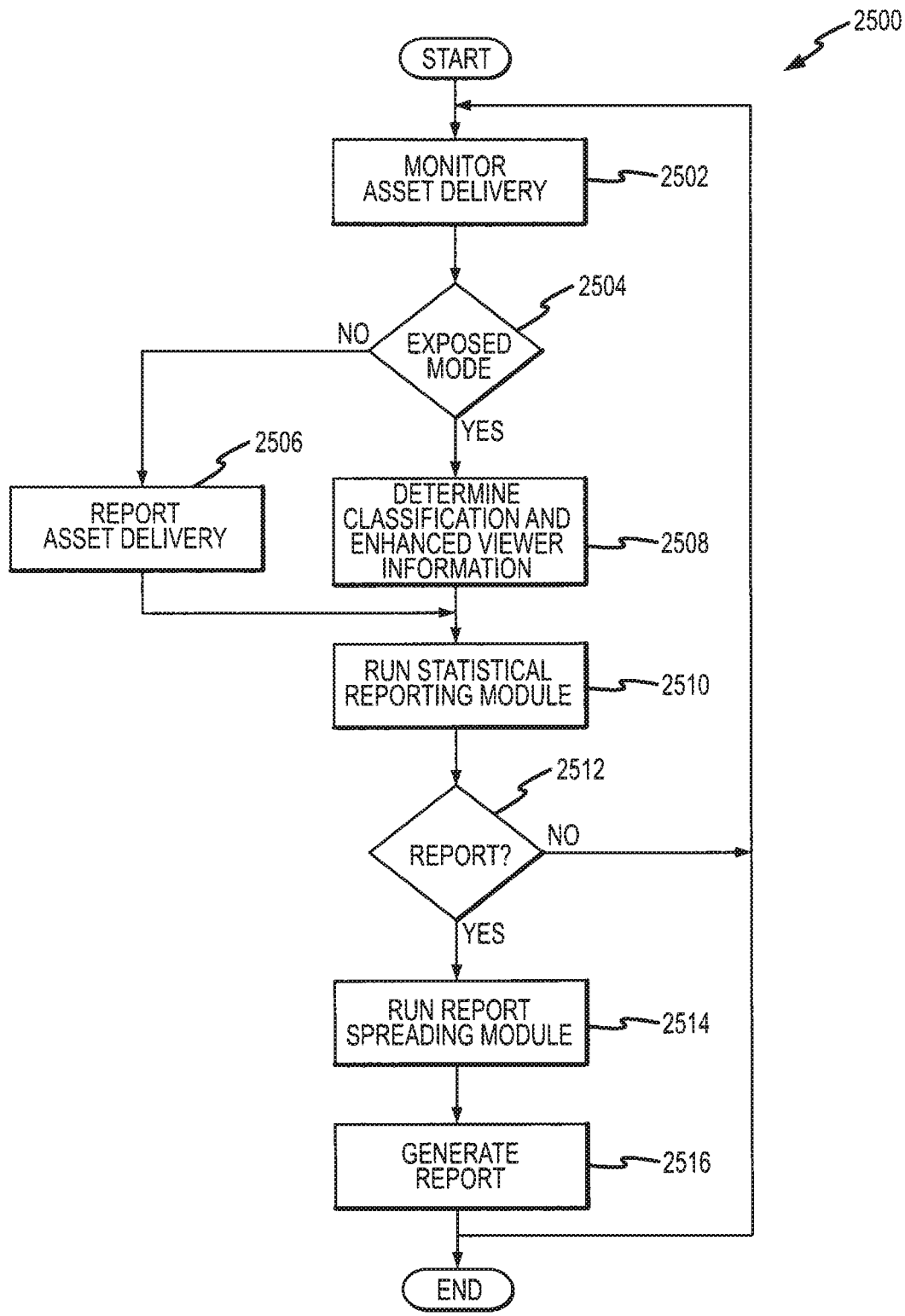
FIG. 25 illustrates a customer premises side process for implementing reporting functionality.

FIG. 25 generally illustrates a customer premises side process 2500 for implementing the reporting functionality. The illustrated process 2500 is initiated by monitoring (2502) asset delivery. That is, the CPE monitors the channels selected in connection with a given break for purposes of reporting asset delivery. A determination is then made (2504) as to whether the CPE will operate in the standard mode or the exposed mode and, in the latter case, what level of exposed mode, e.g., fully exposed or partially exposed. As noted above, exposed mode operation will generally be limited to users who have specifically assented to such operation. For operation in the standard mode, the CPE reports (2506) asset delivery and, perhaps, a goodness of fit measure free from any sensitive information. In the exposed mode, the CPE determines (2508) a greater level of information for reporting to the network. Such information may include sensitive information regarding the user. In either case, the CPE may run (2510) a statistical reporting module so as to make a determination (2512) as to whether to generate a report. Such statistical reporting reduces the bandwidth requirements associated with reporting. If no report is to be generated, the system returns to monitoring (2502) asset delivery.

On the other hand, where a report is to be delivered, a report spreading module may be run (2514). The report spreading module is operative to insure that reports from all reporting CPE are not generated at the same time. Thus, for example, the report spreading module may determine a particular time delay in connection with reporting delivery for a particular break. This time delay may be predefined and may be different for different CPEs. Alternatively, the delay may be variable and may be determined, for example, based on the output of a random number generator. As a still further alternative, reports may be stored up for delivery at a time of day (e.g., during the night) when bandwidth is expected to be more available. In that case, different CPEs may still report at different times. Reports may be stored for a longer period prior to transmission. Reports are then generated (2516) and transmitted as determined by the report spreading module. The system then continues monitoring (2502) asset delivery.

Figure 26:
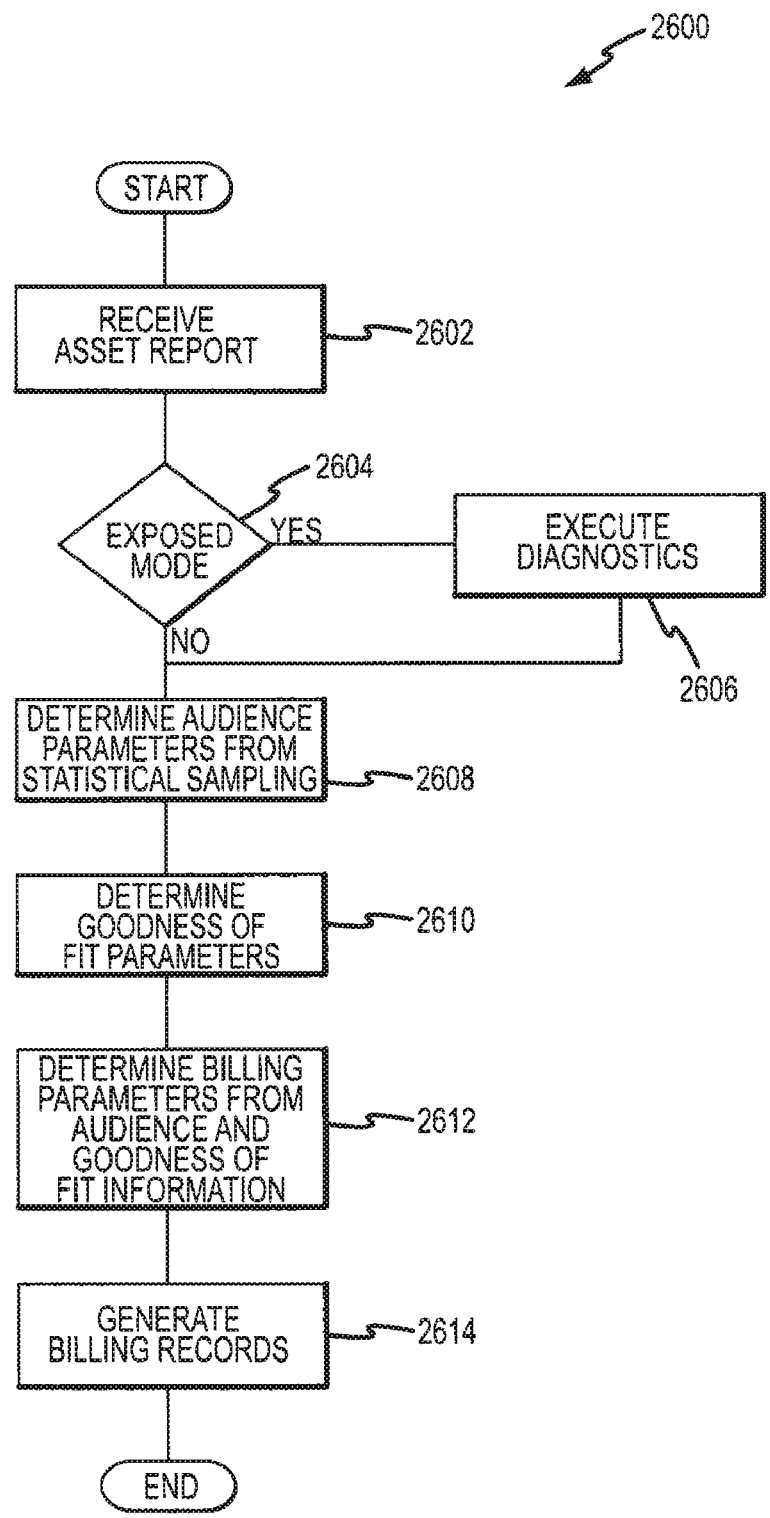
FIG. 26 illustrates a network side process in connection with the reporting functionality.

FIG. 26 illustrates a network side process 2600 in connection with the reporting functionality. The illustrated process 2600 is initiated by receiving (2602) asset reports indicating actual asset delivery. As noted above, the reports may include an identification code and other information deemed sensitive from a privacy perspective. Such information may be deleted or hashed as an early step in report processing. In addition, a determination is made (2604) whether the reports reflect standard mode or exposed mode operation. For example, a field may be included in the reports to identify exposed mode or standard mode operation, or the content of the various reporting fields may be analyzed to determine whether they reflect standard mode or exposed mode operation. In the case of standard mode reports, the report information may be anonymized and aggregated prior to further processing. Exposed mode reports may be used to execute (2606) certain diagnostics. For example, actual user identification information included in the exposed mode report may be compared to putative audience classification parameter values (indicated by asset selection) to examine the accuracy of the user identification logic. Alternatively, in the exposed mode, the report may simply include an identifier that can be used to access information regarding a user or household stored at the headend. In the case of statistical reporting, both the standard mode and the exposed mode records may be used to determine (2608) audience parameters. As discussed above, in order to reduce bandwidth requirements associated with reporting, less than all CPEs, for example, a statistical sampling thereof, may provide reports. Accordingly, a statistical model may be used to determine the audience size and the size of various audience segments based on the report data.

Billing parameters and goodness of fit information may then be determined (2610 and 2612) based on the report information. The billing parameters will generally include information regarding the size of the audience to whom an asset was delivered. The goodness of fit information relates to how well the actual audience matched the target audience of the asset provider. In this regard, a premium may be extracted where the fit is good or a discount or credit may be applied, or over delivery may be provided where the fit was not as good. Based on this information, the T&B system can then generate billing records (2614). It will be appreciated that such billing reflects guaranteed delivery of targeted impressions with compensation for less than optimal delivery.

As noted above, a platform and associated graphical user interface may be provided for receiving asset contract information. As will be described in more detail below, asset providers can use this interface to specify targeting information such as geographic information, demographic information, run-time information, run frequency information, run sequence information and other information that defines asset delivery constraints. Similarly, constraint information may be provided from other sources. This contract information may also include certain pricing information including pricing parameters related to goodness of fit. Moreover, in accordance with the present invention, report information can be utilized as described above for purposes of traffic and billing. All of this requires a degree of integration between the T&B system, which may be a conventional product developed in the context of the conventional asset delivery paradigm, and the targeted asset delivery system of the present invention, which allows for implementation of a novel asset delivery paradigm.

Among other things, this integration requires appropriate configuration of the T&B system, appropriate configuration of the targeted asset delivery system, and a definition of an appropriate messaging protocol and messaging fields for transfer of information between the T&B system and the targeted asset delivery system. With respect to the T&B system, the system may be configured to recognize new fields of traffic and billing data related to targeted asset delivery. These fields may be associated with: the use of reporting data, as contrasted to ratings or share data, to determine billing values; the use of goodness of fit parameters to determine billing parameters; and the use of report information in estimating the target universe for subsequent broadcasts. Accordingly, the T&B system is configured to recognize a variety of fields in this regard and execute associated logic for calculating billing parameters in accordance with asset delivery contracts.

The targeted asset system receives a variety of asset contract information via a defined graphical user interface. This asset contract information may set various constraints related to the target audience, goodness of fit parameters and the like. In addition, the graphical user interface may be operative to project, in substantially real time, an estimated target universe associated with the defined contract parameters. Consequently, integration of the targeted asset delivery system with the T&B system may involve configuring the targeted asset delivery system such that inputs entered via the graphical user interface are mapped to the appropriate fields recognized by the targeted asset delivery system. In addition, such integration may involve recognizing report information forwarded from the targeted asset delivery system for use in estimating the target universe. Generally, the T & B system is modified to included logic in this regard for using the information from the targeted asset delivery system to project a target universe as a function of various contract information entered by the asset provider via graphical user interface.

In addition, the interface between the targeted asset system and the T&B system may be expanded in relation to conventional interfaces to accommodate the targeted asset delivery functionality as set forth above. That is, because billing is based on a targeted impressions, additional asset delivery report information is required by the T&B system to compute billing parameters. Similarly, information from the targeted asset system is required to inform the T&B system in estimating a target universe. Moreover, contract information defining targeting constraints is passed from the T&B system to the targeted asset system. Accordingly, a variety of fields are defined for transmission between the systems as described above. These fields are accommodated by expanding the messaging interface between the systems. In addition, an appropriate messaging protocol is defined for accommodating this expanded messaging asset.

Figure 27:
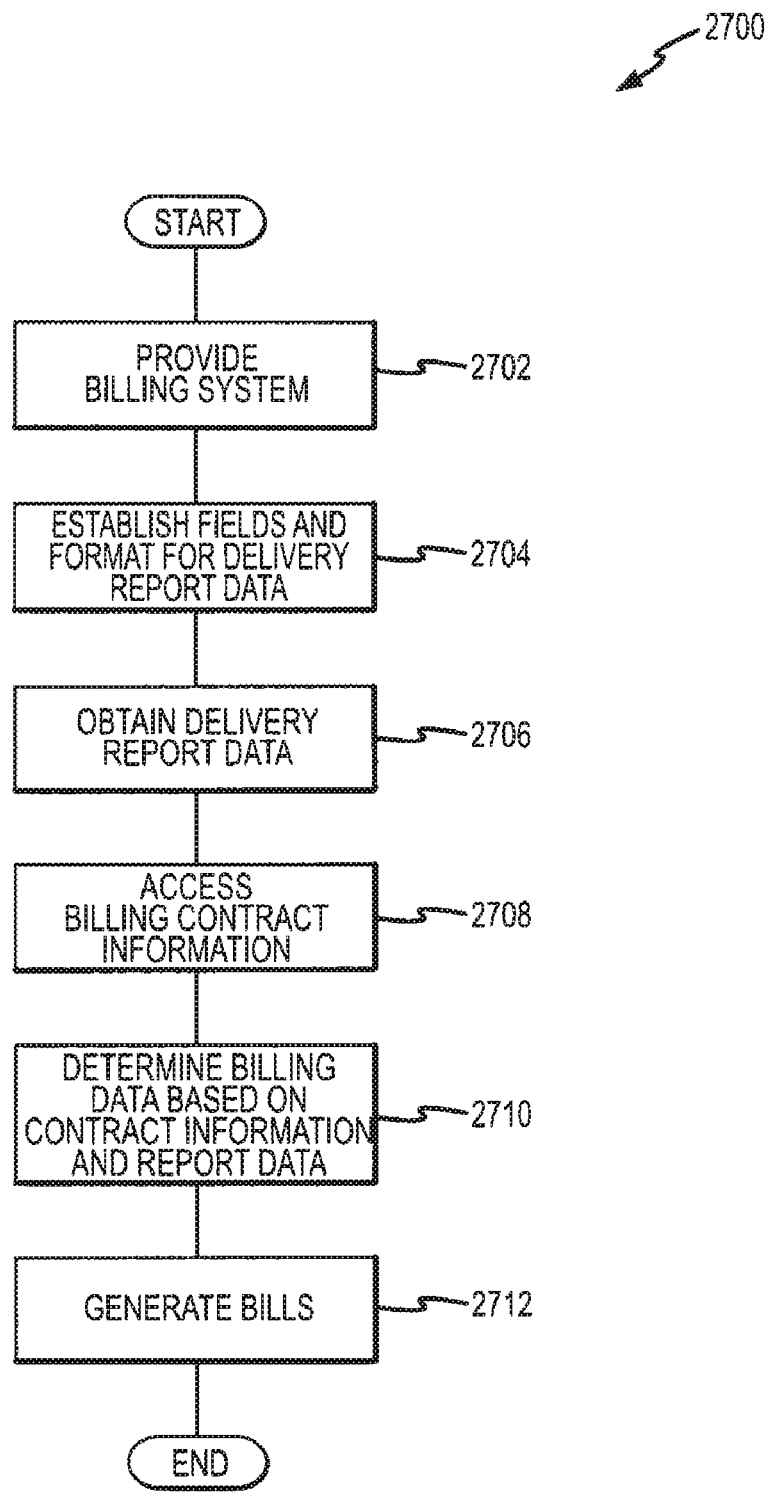
FIG. 27 illustrates a process for interfacing a targeted asset system with a T&B system.

FIG. 27 illustrates a process 2700 for interfacing the systems in this regard. The illustrated process 2700 is initiated by providing (2702) a T&B system. As noted above, the starting point for providing the T&B system may involve using a conventional T&B system developed in the context of the conventional time-slot buy asset delivery paradigm. Fields and a format for receipt of report data may then be established (2704) and integrated into the T&B system. In addition, certain fields and formats may be provided for exporting information from the T&B system to the targeted asset delivery system, for example, for use in targeting assets. In operation, contract information including targeting constraints for particular assets is exported (2705) from the T&B system to the targeted asset delivery system. Assets are delivered in accordance with the constraints as described above. Delivery report data is then obtained (2706) by the T&B system. This report data may be transmitted from CPEs and processed by an operations center prior to delivery to the T&B system as described above. In addition, the T&B system accesses (2708) contract information relating to a relevant asset delivery contract. This information may specify certain billing parameters as a function of audience size and goodness of fit information. The T&B system is then operative to determine (2710) billing data based on the contract information and the report data and to generate (2712) appropriate bills.

IV. Exemplary System Impementations

The discussion above described a system for providing targeted assets in a broadcast network. In that discussion, there were a number of references to providing targeted advertising in a cable television network. In addition, references were made to implementing the targeted advertising system using certain conventional components, with appropriate addition and modification, at the headend, the CPEs and T&B platforms. This represents an advantageous, though not limiting, application of the present invention. This section will describe this application of the invention in further detail with examples of specific implementation details.

It should be appreciated that the examples that follow are provided to illustrate specific implementations of the invention and are not intended to limit the scope of the invention. For example, the invention, as noted above, is not limited to the cable television environment, nor to targeting of advertisements. In addition, the systems described below make use of a variety of communications between CPEs and a network platform such as a headend. Specific communication processes are described below for purposes of illustration involving in-band and out-of-band pathways. It will be appreciated that such communications may be accomplished by any available means using cable network pathways or separate networks. Moreover, though the system described below involves specific voting and reporting processes by which ads are targeted by matching advertiser targeting constraints to audience classification parameters and confirmation of delivery is obtained, it will be appreciated that certain aspects of the invention can be implemented without voting or reporting.

Figure 28:
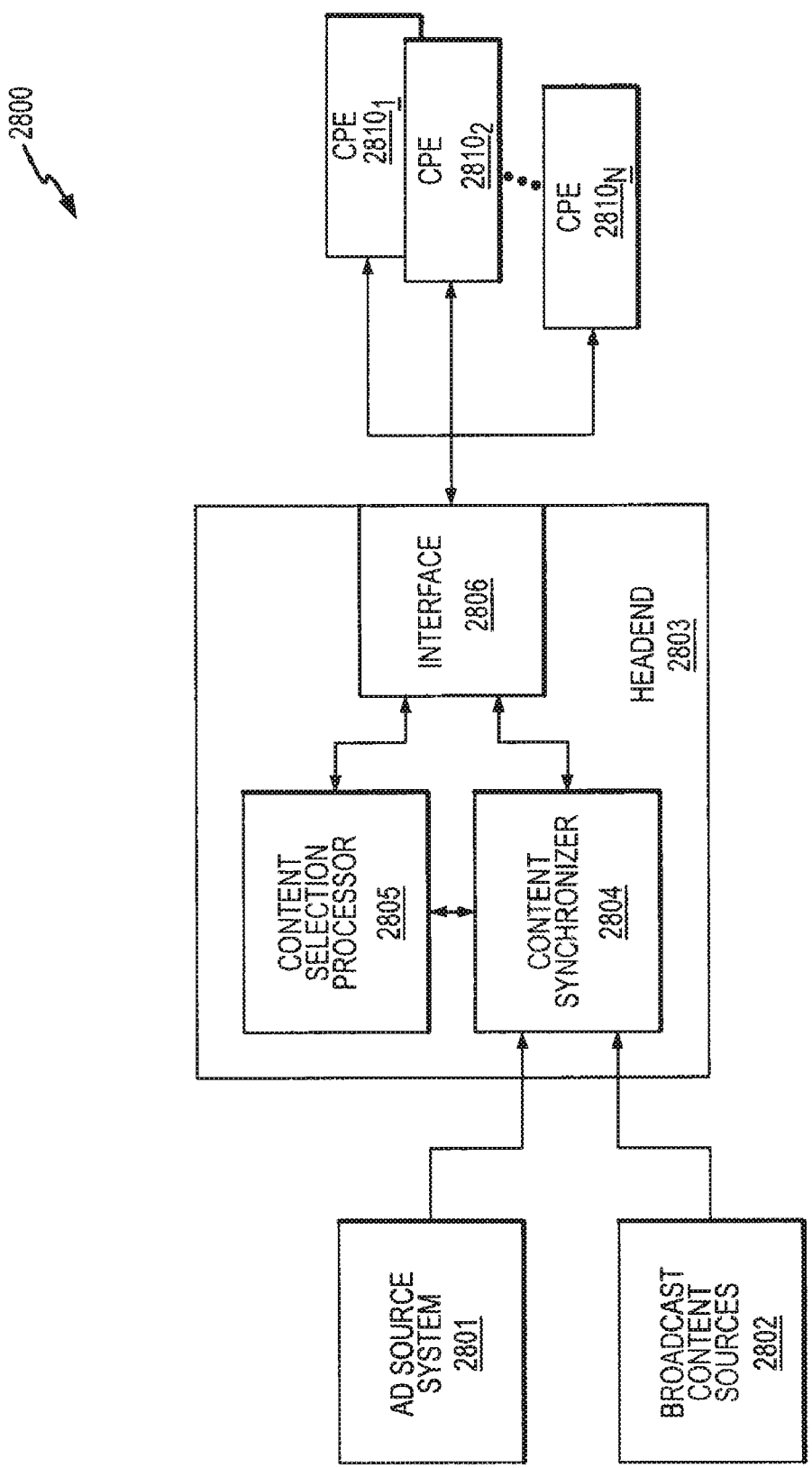
FIG. 28 is a block diagram of an exemplary system that targets content for broadcast networks.

Additionally, targeting may be executed with respect to constraints determined by a user, network operator, content provider or others rather than by the advertiser. As an example in this regard, as noted above, a user may define exclusions in an optional implementation, for example, to protect children or other sensitive viewers from certain content. In the same manner, a user may define preferences in such an optional implementation. However, the system is described below with an emphasis on advertising defined targeting constraints which represents a commercially significant application of the invention. Based on the foregoing, the following description should be understood by way of illustration of specific implementations and not by limitation. Turning now to FIG. 28, a block diagram of system 2800, which is used to target ads for broadcast telecommunications networks, is presented. It is noted that the illustrated system is a headend insertion system, though targeted advertisements may be inserted at the CPEs as will be discussed below. The illustrated system 2800 includes a platform such as a headend 2803 that may receive audio and/or video content from a number of sources, such as an ad source system 2801 and broadcast content sources 2802 (e.g., of a television network program providers). The source system 2801 and sources 2802 may provide the audio and/or video content using digital communications, analog communications, or combinations thereof. The illustrated system 2800 also receives communications from broadcast network users for use in targeting ads, providing selected broadcast content and reporting delivery as will be described below. In this regard, each user of a cable-television network may have a CPE 2810 that allows the user to receive content, such as television programs and advertisements. A user's particular CPE 2810 may estimate audience classification parameters of a current user or users and compare those parameters to targeting constraints of an ad. Accordingly, each user's particular CPE 2810 may transmit a vote to headend 2803 so that headend 2803 may configure the ads and/or broadcast content for delivery to the individual CPEs $2810_{1...N}$.

To assist in configuring the content for delivery to CPEs $2810_{1...N}$, the illustrated headend 2803 includes content selection processor 2805 and content synchronizer 2804. Content synchronizer 2804 receives ads from asset server 2801 and broadcast content from broadcast content server 2902. For example, broadcast content sources 2802 may provide various types of audio and/or video content, such as television programs. Ad source system 2801 may also provide types of audio and/or video content in the form of advertisements (e.g., commercials). Content synchronizer 2804 receives broadcast content from broadcast content sources 2802 to selectively insert ads from ad source system 2801 into the broadcast content. This may involve interleaving ad assets into the programming content stream and/or inserting ad assets into separate bandwidth such as dedicated ad channels. Ad assets may also be transmitted to the CPEs by other means. Content synchronizer 2804 may then coordinate the combined content for delivery to CPEs $2810_{1...N}$.

In one embodiment, CPEs $2810_{1...N}$ independently vote on the ads to be delivered as described above. For example, CPEs $2810_{1...N}$ may include set-top boxes ("STB") configured for receiving cable television inputs. In this regard, a cable television user may selectively receive broadcast content by changing channels at the set-top box (e.g., each channel may be configured for conveying a unique stream of video and audio content). At certain intervals (often predetermined and defined with cues) in the broadcast content, ads may be inserted by the headend (in headend insertion implementations) and conveyed to a customer via the set-top box. Specifically, logic resident on the CPE $2810_{1...N}$ may analyze user inputs and other information as described above to estimate audience classification parameters for the current user or users. These parameters are then compared to targeting constraints associated with particular ads (which may be represented by an ad ID and associated targeting constraint information). Based on the comparison, votes including fit scores may be transmitted to the headend 2803.

In the illustrated embodiment, headend 2803 receives votes from a number of CPEs $2810_{1...N}$ (from all participating CPEs or a sampling thereof) in communication therewith via network interface 2806. Network interface 2806 may transfer the votes to content selection processor 2805 to aggregate the votes and make ad insertion selection with due consideration of available bandwidth. For example, the number of CPEs 2810 and thus users may greatly exceed the available bandwidth such that the best fit ad (or another ad individually selected for the user) cannot be provided. Content selection processor 2805 receives the votes from CPEs 2810$_{1...N}$ and tallies the votes by ad. A limited number of ads are provided based on the votes and other consideration. These ads are inserted into the available ad bandwidth (e.g., on the programming channel and/or ad channel(s)) and the CPEs 2810$_{1...N}$ select from available ad options (if an), for example, based on audience classification information for the current users. CPEs 2810$_{1...N}$ may continually transfer votes to headend 2803 such that content selection processor 2805 and content synchronizer 2804 continue to deliver ads during programming channel breaks in the case of synchronous asset insertion implementations.

To deliver the targeted ads the system 2800 may operate essentially in three modes: a first mode that involves insertion of a flotilla ad option at the headend 2803 coupled with delivery of the ads through channel switching at the CPE 2810$_{1...N}$ (flotilla mode); a second mode that involves delivery by interleaving the ads with programming content at headend 2803 (interleaving mode); and a third mode that includes delivery by insertion of the ads at CPEs 2810 (CPE insertion mode). In the flotilla mode, content synchronizer 2804 transfers a flotilla to CPEs 2810 such that the CPEs choose ads therefrom and substantially seamlessly change channels to an ad (some ad options may be provided on the programming channel) channel. In such an embodiment, CPEs 2810 may subsequently change to another ad channel or the programming channel. In the interleaving mode, content selection processor 2805 may select an ad for delivery during a predetermined spot within a broadcast network break (e.g., a "commercial break" observable via a cue in the broadcast network content). At that time, content selection processor 2805 may direct content synchronizer 2804 to synchronize the ad with the broadcast content. Content synchronizer 2804 may insert the selected ad into the broadcast content stream. In the case of the CPE insertion (or forward-and-store) mode, ads are transferred to the CPEs 2810$_{1...N}$ ahead of time (e.g., via an ad channel, another available channel or any other transfer mechanism) such that the CPEs 2810$_{1...N}$ can insert ads stored therewith at predetermined times, or upon detecting cues, within the broadcast network content. For example, CPEs 2810 may be configured to receive and store ads from content selection processor 2805. CPEs 2810 may then retrieve selected ads and insert those ads into the broadcast content at appropriate times. Such an embodiment is disclosed in greater detail below in connection with FIG. 30. Although discussed with respect to three alternative embodiments (e.g., flotilla mode, interleaving mode and CPE insertion mode), those skilled in the art should readily recognize that the invention is not intended to be limited to a particular embodiment. For example, content synchronizer 2804 may transfer a control message that directly controls CPEs 2810 to either channel switch or insert. Additionally, system 2800 may be configured to implement one or more of the above-mentioned embodiments. For example, while CPEs 2810 may be configured to retrieve ads stored therewith and insert that content into a programming stream, headend 2803 may override such ad insertion and direct the CPEs to switch channels to an ad channel.

Nor should the invention be limited to a particular group size. For example, content selection processor 2805 may direct ads to individual CPEs 2810 (e.g., a group of one). Additionally, the invention should not be limited to a number of advertisers or broadcast content providers. Rather, broadcast network content and ads may typically be provided by a number of content providers and asset providers.

Figure 29A:
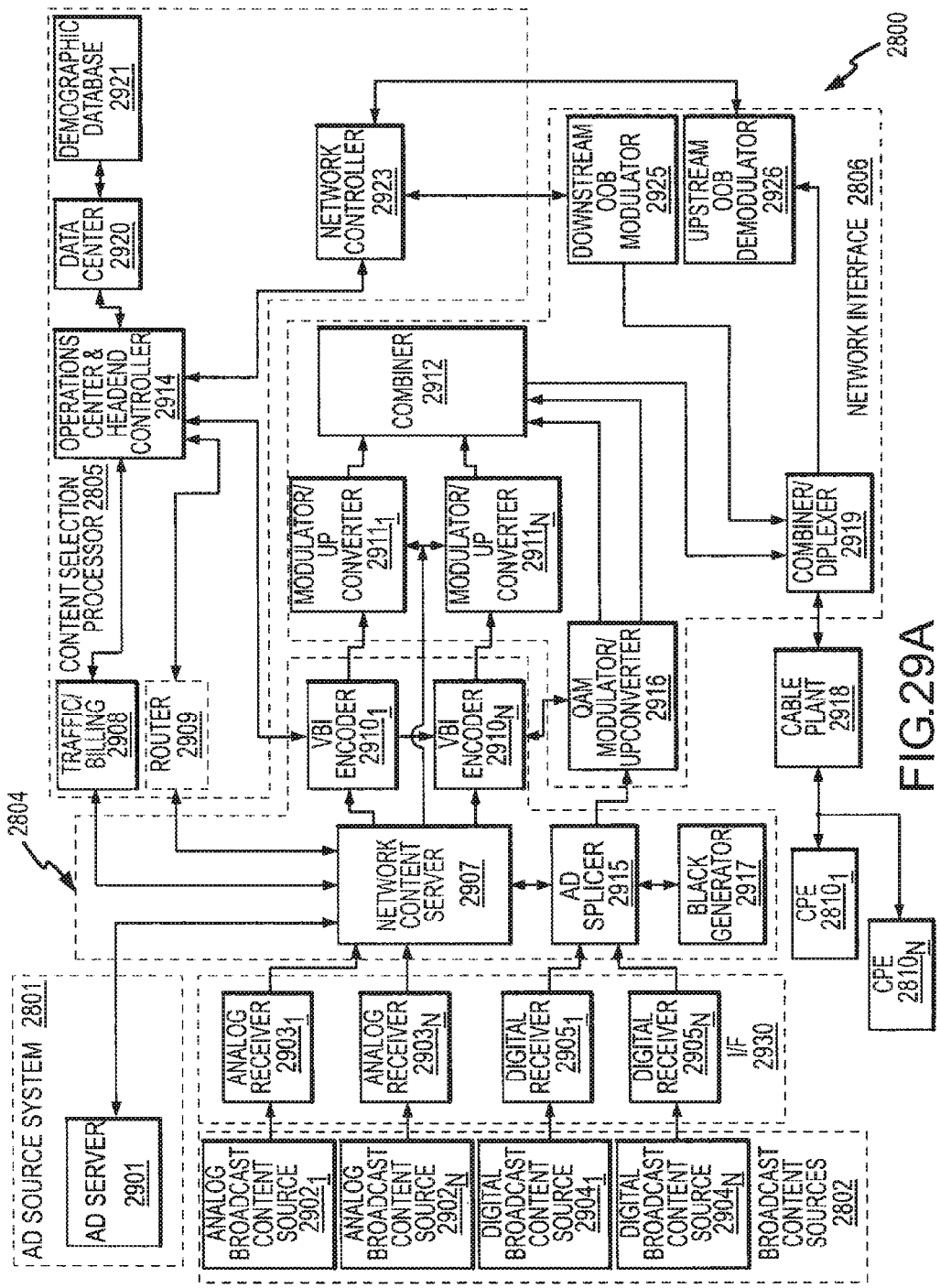
FIG. 29A is an exemplary component-level block diagram of the system of FIG. 28 that targets content for broadcast networks.

FIG. 29A is an exemplary component-level block diagram of system 2800 that targets content for broadcast networks. In this embodiment, broadcast content is obtained from a number of broadcast content sources 2802. For example, the sources may include a number of analog broadcast content sources 2902 as well as digital broadcast content sources 2904. Some non-limiting examples of these broadcast content sources 2802 include broadcast television networks that provide original and/or replay television broadcast events (e.g., "reruns") and broadcast radio networks that provide audio content (e.g., talk shows, radio programs, etc.). Such content may be provided digitally by digital broadcast content sources 2904$_{1...N}$ and/or via analog transmission from analog broadcast content sources 2902$_{1...N}$. Headend 2803 (e.g., including, among other things, content synchronizer 2804, content selection processor 2805, and network interface 2806) may thereby receive the broadcast content for which targeted ads are provided. Headend 2803 receives the broadcast and/or analog content via network interface 2930.

The illustrated network interface 2930 includes a number of analog receivers 2903$_{1...N}$ and/or digital receivers 2905$_{1...N}$. Analog receivers 2903$_{1...N}$ may be communicatively coupled to analog broadcast content sources 2902$_{1...N}$ to receive analog broadcast content. Similarly, digital receivers 2905$_{1...N}$ may be communicatively coupled to digital broadcast content providers 2904$_{1...N}$ to receive digital broadcast content. This content may include certain ads as provided. Additional ads may be interleaved with this content and still further ad options may be inserted in separate ad channels or other bandwidth.

In the case of interleaving mode operation and, perhaps, in the case of flotilla mode operation, ads are interleaved with programming in the programming channel content stream. The ad source 2901 stores ads to be interleaved with the broadcast content received via network interface 2930 or inserted into ad channels or other bandwidth. For example, in the case of interleaving, analog broadcast content may be received and stored on headend server 2907. Ad server 2901 may be communicatively coupled to the headend server 2907 such that the headend server 2907 may control insertion of the ads at predetermined times within the analog broadcast content. That is, server 2907 receives the analog programming from sources 2902$_{1...N}$ ads from ad source system 2801 and insertion information from content selection processor 2805. Upon detecting a tone in the programming content stream, server inserts an ad into the stream based on the insertion information.

Still in reference to ad interleaving, headend server 2907 may be configured for managing analog and/or digital data. For example, ad server 2901 may provide analog and/or digital ads to the content server 2907. Preferably, server 2907 configures received content (i.e., ads and broadcast network content) in a digital format. In this regard, the server 2907 may be associated additional components such as an analog-to-digital converter ("ADC") to convert received analog content and storage to store the received content. Thereafter, the converted digital ads may be readily inserted into digital broadcast network content using, for example, ad splicer 2915. For example, ad splicer 2915 may interleave digital ad content with the digital broadcast network content to construct an MPEG transport stream containing the combined digital content. Once the combined digital content is formed by ad splicer 2915, the data thereof may be digitally transferred to QAM modulator/upconverter 2916 to prepare (e.g., convert to radio frequency, or "RF") the data for conveyance CPEs 2810.

Additionally, combined content (i.e., ads and broadcast network content) may be transferred in the analog domain for ultimate conveyance to CPEs 2810. For example, headend server 2907 may receive ads and analog content and transfer the ads to ad splicer 2915 for ad insertion. Thus, content (i.e., ads and/or broadcast network content) received by headend server 2907 may be in a digital format and/or an analog format. The server 2907 may convert any analog content to digital and convey the broadcast network content and the ads to ad splicer 2915 for insertion of the ads within the broadcast network content. Upon insertion of the ads within the broadcast network content, ad splicer 2915 may transfer the combined content to server 2907 such that the combined content may be converted back to an analog format (i.e., a continuous waveform). Such may be useful in cable headends having analog networks. Transfer of this content from ads to splicer 2915 to headend server 2907 may be performed using one or more of the Society of Cable Television Engineers ("SCTE") standards. These standards are known to those skilled in the art.

In this regard, the analog combined content may then be transferred to Vertical Blanking Interval ("VBI") encoders 2910$_{1 \ldots N}$ for insertion of data. For example, a VBI$_1$ is generally an interval in a signal (e.g., television video signal or other video display unit signal) that temporarily suspends transmission of the signal. This temporarily suspended transmission may allow time for an electron gun of a television or another video display unit to move and trace a next screen field. The VBIs may be used to carry data because data sent during a VBI would not be displayed. Examples of such data include test signals, time codes, closed captioning, teletext, Copy Generation Management System ("CGMS-A") copy-protection indicators, content ratings for V-chip use, and other data which can be sent during this time period. As such, headend server 2907 may transfer analog video of the combined content to VBI encoders 2910$_{1 \ldots N}$ such that the VBI encoders may insert data during intervals in which no analog video content is transferred. Additionally, the VBIs may be used to transfer control signals to CPEs 2810$_{1 \ldots N}$ (e.g., to direct the CPEs to change channels, as described hereinabove). However, as noted above, any available transmission mechanisms via the cable television networks or other networks may be used for unidirectional communications between the CPEs 2810 and the server 2907.

Similar processing is employed in the case of flotilla mode and CPE insertion mode operation. That is, the headend server 2907 still receives ads from the ad source system 2801 and instructions from content selection processor 2805. In the case of flotilla mode operation, the instructions indicate what ads should be included on which ad channels (and, perhaps, indicate that an advertisement should be placed on the programming channel) during which breaks and spots. The server 2904 is then operative to direct insertion of the ads as described above. In the case of CPE insertion, ads may be transmitted to the CPEs 2810 via ad channels, off-air programming channels or other available bandwidth. In this regard, the server 2907 may direct insertion as described above, except such insertion generally will not be synchronized with any programming channel break. Accordingly, insertion generally will not be in response to a cue. Moreover, there is generally not a real time component to such transmission. So ads may be transmitted asynchronously, e.g., in data packets, and transmission of, for example, a thirty-second ad may take less or considerably more than thirty seconds as bandwidth allows. In any case, the combined content (i.e., the broadcast content and ads) or ad content is transferred to individual CPEs 2810 via network interface 2806. For example, network interface 2806 may include modulator/upconverters 2911$_{1 \ldots N}$ that receive analog video input streams from VBI encoders 2910$_{1 \ldots N}$. Modulator/upconverters 2911$_{1 \ldots N}$ respectively convert those analog streams to the RF to form individual RF "channels". Modulator/upconverters 2911$_{1 \ldots N}$ also receive the analog audio content from headend server 2907 to be included with the analog video content. The combined RF channels are then transferred to combiner 2912 for multiplexing into an RF television signal. With regard again to the digital ad insertion, ad splicer 2915 may receive digital broadcast content from digital receivers 2905$_{1 \ldots N}$ and directly interleave digital ads with the digital broadcast network content. Accordingly, when the ad-interleaved digital broadcast network content is decoded and converted to analog for display with a television, the ads may display at predetermined times within the broadcast content. Additionally, content synchronizer 2804 may include black generator 2917 for providing "black" content during ad insertion opportunities on ad channels or programming channels. For example, at periods in broadcast content intended for ad insertion, black generator 2917 may provide content that displays as black segments when displayed. This is necessary to provide a content stream into which the ads may be inserted. Additionally, the black content is useful because, among other reasons, ads may be configured with durations that may not necessarily correspond to exact durations of predetermined time intervals in the broadcast content. The black content may thus provide a blank canvas for the ad to be inserted allowing for ads to be "framed" by black content during commercial breaks.

As mentioned, ad splicer 2915 transfers the interleaved digital content to QAM modulator/upconverter 2916 for conversion to RF. For example, QAM modulator/upconverter 2916 may receive interleaved digital data (i.e., digital ads interleaved with digital broadcast content) or non-interleaved digital data. QAM modulator/up-converter 2916 may modulate the data onto one or more RF carriers using quadrature amplitude modulation ("QAM") techniques to generate RF channels. QAM modulator/upconverter 2916 may transfer the RF channels to combiner 2912 such that the RF channels may be multiplexed into an RF television signal.

Generally, cable systems in North America operate with 6 MHz channel bands (with different standards in Europe and elsewhere), each channel having a QAM signal conveying between 3 and 16 digital video data streams with their associated audio and data streams (e.g., television channels). As such, combiner 2912 may combine the signals into a single RF television signal. One example of such an RF television signal may include a Frequency Division Multiplexed ("FDM") signal that is delivered to a cable system (e.g., cable plant 2918) via combiner/diplexer 2919. However, other forms of signaling/multiplexing may be incorporated to transfer a plurality of digital data streams to a cable system. One example of such may include time division multiplexing ("TDM").

With the analog or digital/interleaved or non-interleaved content formed into an RF television signal, combiner 2912 may transfer the RF television signal to combiner/diplexer 2919 such that the RF television signal may be split into multiple RF television signals (e.g., typically, with each conveying the same information) for transfer to one or more cable plants 2918. For example, the network may interface with a plurality of cable plants, such as cable plant 2918, to deliver the RF television signal to a plurality of associated locales (e.g., communities). Combiner/diplexer 2919 may split a received television signal to correspond to the number of cable plants interfacing with network. Each cable plant 2918 may, in turn, transfer the RF television signal to CPEs $2810_1 \ldots _N$ such that each CPE may select a channel from the RF television signal for observation (e.g., viewing and/or listening).

To assist in determining which ads are synchronized with broadcast content, in the case of synchronous flotilla mode or interleaving mode operation, system 2800 includes content selection processor 2805 as described in FIG. 28. Content selection processor 2805 includes operations center and headend controller 2914, which directs operations of the content selection processor 2805. For example, operations center 2914 may interface with optional router 2909 to direct content synchronizer 2804 to synchronize ads with broadcast content. For example, router 2909 may be provided to limit access to other headend systems by content selection processor 2805. Generally, operations center 2914 requires network schedules from broadcast network content providers 2904, as well as ad contract information from traffic/billing 2908. These network schedules may be transferred with a file transfer protocol ("FTP") from either traffic/billing 2908 or ad server 2901. This transfer may be automated to occur at the same time that network schedules are distributed from traffic/billing 2908.

Additionally, content selection processor 2805 may interface with CPEs 2810 to receive votes from the CPEs, ad delivery reports from the CPEs and/or convey information to the CPEs such that the CPEs may insert ads. For example, CPEs 2810 may generate votes based on the channel selections, volume control inputs and other click stream information of their respective users. These votes may be transferred to content selection processor 2805. As discussed above, participating CPEs (or at least a sampling thereof) may also provide report information identifying at least the ads or ad channels selected for a particular break. Content selection processor 2805 may, in turn, aggregate report information and provide the information to traffic/billing 2908, e.g., for use in certifying to advertisers delivery of targeted impressions or estimating the target universe in connection with ad campaigns under consideration. In the case of CPE insertion, content selection processor 2805 may also transfer ads to the CPEs such that the CPEs may select ads for display to their respective users.

It will thus be appreciated that communications between the CPEs 2810 and the operations center 2914 may be employed for a variety of purposes and, as noted above, such communications may be via the cable television network (involving in-band and out-of-band pathways) or any other means. For purposes of illustrations, certain cable television network pathways are discussed below. With regard to upstream communications, CPEs 2810 may transfer messages to their associated cable plant 2918. Cable plant 2918 may forward the messages to network interface 2806 as individual RF signals. The RF signals may be received by network interface 2806 via combiner/diplexer 2919 such that they may be transferred upstream to content selection processor 2805. In this regard, network interface 2806 may convert the RF signals to processable data via upstream out-of-band demodulator 2926. For example, upstream out-of-band demodulator 2926 may receive the modulated RF signal to demodulate the signal and extract data (e.g., votes or report information) therefrom. The data may then be transferred to network controller 2923 using common data transfer techniques. Operations center 2914 may access the stored votes, reports and other CPE information on an "as needed" basis, for example, to determine appropriate ads to be delivered or provide report information to traffic/billing 2908.

Generally, "out-of-band" refers to data transmitted outside a typical path used by primary communications (e.g., the RF television signal). As such, "in-band" generally refers to the path used by the primary communications such as the RF television signal. In this regard, in-band paths are generally used only for downstream messages whereas out-of-band paths may be used bi-directionally. In some networks, e.g., satellite television networks, only in-band paths may be available and upstream communications may require use of separate communications networks. However, upstream communications may optionally utilize out-of-band paths in the illustrated cable television network. An example of upstream out-of-band demodulator 2926 may include the RPD 2000 by Motorola, Inc. In this regard, network interface 2806 may communicate to CPEs 2810 via upstream and downstream out-of-band signaling while the CPEs 2810 are receiving the RF television signal that includes the broadcast network content on a separate in-band path. For example, CPEs 2810 may use out-of-band signaling to communicate data on a separate in fixed radio frequency. The invention, however, is not intended to be limited to components that simply perform either in-band or out-of-band communications. For example, such features may be combined into a single component, such as the DVB Interactive Network Adapter INA2320 by Cisco Systems Inc. In one embodiment, the out-of-band communications are performed using Internet Protocol ("IP") and/or the Data Over Cable Service Interface Specification (DOCSIS).

As noted above, CPEs 2810 may switch to ad channels to deliver ads. To assist CPEs 2810 in implementing the channel changes, operations center 2914 may transmit an ad option list for one or more upcoming breaks together with targeting information, and may subsequently transfer ad option lists and other messages to network controller 2923. For example, operations center 2914 may access vote information from carousel system 2922 and select ads to be delivered to CPEs 2810. Operations center 2914 may, in turn, direct the network controller 2923 to notify CPEs 2810 of ad delivery. In this regard, network controller 2923 may format messages that include delivery information of the ads. That is, the messages may include channel locations of ads that may be selected for delivery by individual CPEs 2810. In certain implementations where control information is directed to specific CPEs (e.g., sending marketing labels or location information, or controlling CPE insertion from the headend), the message may also include information pertaining to individual CPEs 2810 (e.g., serial numbers, STB card numbers, and/or other identifiers).

The formatted messages may be transferred to CPEs 2810 via network interface 2806. Network interface 2806 may receive the messages via downstream out-of-band modulator 2925 to format and transfer the messages as an RF signal for use by CPEs 2810. In this regard, out-of-band modulator 2925 may modulate the messages (i.e., data thereof) onto an RF signal. An example of out-of-band modulator includes 2925 the OM-1000 MPEG2/Digital Out-Of-Band Modulator by Motorola, Inc.

The modulated RF signal conveying the out-of-band information may then be transferred to combiner/diplexer 2919 such that the RF signal may be transferred along with the RF television signal (i.e., conveying the in-band information) from combiner 2912. The signals may then be split by combiner/diplexer 2919 based on the number of cable plants 2918 associated with system 2800. Each cable plant 2918 may then transfer its RF signals to CPEs 2810. Based on the out-of-band information included in the RF signals, CPEs 2810 may switch to ad channels or insert ads into broadcast network content (i.e., ads as voted on by the CPEs).

The various types of signaling shown and described herein (e.g., in-band signaling and out-of-band signaling) are not intended to be limiting. Often, such signaling techniques may be implemented in a variety of ways. Additionally, the invention should not be limited to RF cable communications as other forms of communication may be used for ad delivery. For example, system 2800 may be implemented with a hybrid fiber/cable network where ads and/or broadcast network content are delivered in a combination of RF and optical digital data techniques. Yet, other embodiments may include ad insertion being performed through mainly RF networks, such as terrestrial and/or satellite radio. In the case of CPE insertion mode operation, ads may be downloaded to the individual CPEs 2810 via out-of-band paths. For example, CPEs 2810 may include storage units, such as hard disk drives in digital video recorders ("DVRs"). These storage units may be used to store ads for later viewing. As such, the out-of-band information transferred in the RF signal may be used to direct individual CPEs 2810 to retrieve certain ads during predetermined intervals of the broadcast content for display to the viewer. For example, during a break in the broadcast content, the out-of-band information may request that an individual CPE 2810 retrieve ads meeting advertiser delivery constraints from the storage unit and display that ad with the user's television. The headend may direct selection of particular ads or the CPE may select ads, for example, by matching audience classification parameters of a current user to targeting constraints of an ad. In such cases, voting may not be employed, though voting may still be used to select ads transmitted to the CPEs. Similarly, in certain contexts within flotilla mode operation (for example, spot optimization implementations where an advertiser brings a spot but provides multiple ad options for the spot), voting may be unnecessary, though voting may be employed to select the ad options in case of limited bandwidth for the options.

Other components of content selection processor 2805 include traffic/billing 2908 and data center 2920. Traffic/billing 2908 may be configured to receive ad contract information including targeting constraints and to collect information about the ads that were delivered by CPEs 2810. For example, CPEs 2810 may provide reports regarding ad delivery. As those reports are collected, traffic/billing 2908 may accumulate a count of targeted impressions, or actual deliveries, of those ads such that the provider of such ads may be billed based on an accurate number of individual impressions. This information may also be used for network measurement (ratings-like data) as well as to estimate the target universe with respect to ad campaigns under development. In this regard, traffic/billing 2908 may be communicatively coupled to content server 2907 to collect information about insertion of ads from ad server 2901. Operations center 2914 may provide operational control of traffic/billing 2908 such that operational protocols are not breached (e.g., to ensure that traffic and billing are not fraudulently manipulated and/or to ensure that information entered through traffic/billing 2908 is not compromised). Examples of traffic and billing interfacing are shown and described below in FIGS. 36A, 36B and 37.

Data center 2920 may be configured for collecting data pertaining to CPEs 2810 as may be desired in certain implementations, e.g., involving marketing labels. Data center 2920 may be an optional feature of system 2800 that stores information regarding users of CPEs 2810. For example, as CPEs 2810 cast votes for certain ads, operations center 2914 may determine various putative attributes of a user or an aggregated group of audience members users (e.g., age, income level, etc.). These attributes may be stored with data center 2920 for use as a byproduct of system 2800. That is, system 2800 can be configured for selectively delivering ads with broadcast content or controlling or influencing CPE insertion. Information derived about users of CPEs 2810 may advantageously provide information about audiences of delivered content to advertisers and/or broadcast content providers. In one embodiment, data center 2920 may store attributes of individual users.

In addition to data center 2920, system 2800 may optionally include demographic database 2921. Demographic database 2921 may be configured to receive demographic information from sources external to system 2800. For example, survey takers may compile demographic information of people in a particular region. Also, census information, financial information, magazine subscriptions and other information may be available from a variety of sources. This compiled demographic information may be transferred to demographic database 2921 to request delivery of ads to users of CPEs 2810 in lieu of, or in conjunction with, vote casting by CPEs 2810.

Although one embodiment has been shown and described herein, those skilled in the art should readily recognize that the invention is not intended to be limited to the illustrated components. Rather, certain components may be modified and/or combined to have essentially the same functionality as the larger system 2800 described herein. An example of such an embodiment is shown and described below in FIG. 29B.

Figure 29B:
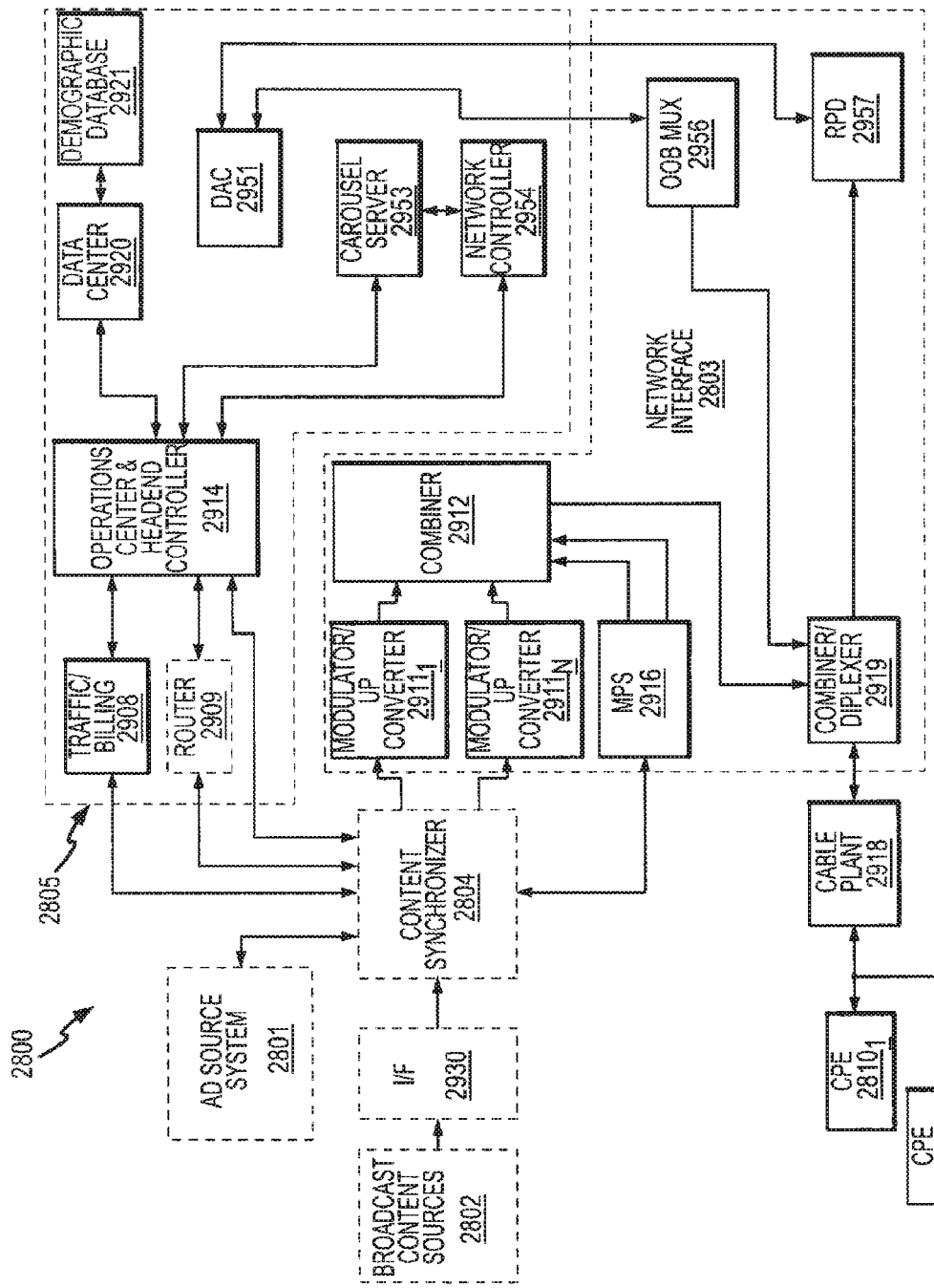
FIG. 29B is an exemplary alternative component-level block diagram of the system of FIG. 28 that targets content for broadcast networks.

FIG. 29B is an exemplary alternative component-level block diagram of system 2800 of FIG. 28 that targets content for broadcast networks. In this embodiment, content selection processor 2805 is configured to provide Internet Protocol (IP) distributed communications. For example, triggers sent via out-of-band signaling may be transferred via IP communications through carousel server 2953 because, among other reasons, certain CPEs 2810 are not configured to process triggers. An example of such a CPE 2810 includes the DCT-2000 by Motorola Inc. Operations center and headend controller 2914 may provide the out-of-band triggers via a carousel format, which is subsequently sent to carousel server 2953 for distribution.

Also included in this embodiment is a Digital Addressable Controller, such as model DAC-6000 by Motorola, Inc. DAC 2951 includes components that provide the security and control for flexible digital systems. Additionally, DAC 2951 provides support for addressable control functions including Internet Pay-Per-View ("IPPV"), Call Ahead PPV, subscriptions and interactive applications. DAC 2951 may also interact with traffic/billing 2908 to generate reports used in facilitating system management. System 2800 may also include a network controller 2954 such as the NC1500. Controller 2954 may function as a hybrid fiber coax (HFC) network controller that enables interactive applications with DCT2000 terminals. Controller 2954 may allow for interactive sessions between application servers and DCT2000 terminals by translating IP to deliver data packets through an out-of-band data channel. The return path serves as the upstream data path where Controller 2954 aggregates demodulated data bursts and routes the data to the appropriate server. As such, NC1500 2954 may be communicatively coupled to a Return Path Demodulator 2957 such as model RPD-2000 2957 by Motorola Inc.

RPD-2000 2957 provides an upstream link for communications with CPEs 2810 such as DCT 2000 terminals. Typically, such terminals provide data such as PPV purchase data, Video On Demand ("VOD") purchase data, and status monitoring data. RPD 2957 may receive the data using burst demodulator modules configured therewith. RPD 2957 may demodulate, provide forward error correction, and multiplex the data into a single data packet that may be transferred to operations center 2914 via Ethernet.

With respect to downstream data, system 2800 may employ an out-of-band multiplexer/modulator 2956 such as model OM-1000 2956 by Motorola Corp. OOB MUX 2956 provides an out-of-band data stream to CPEs 2810. This data stream may be primarily used as a signaling channel, but may also provide for the transmission of program guide information, code downloads, Infrared codes, application information, and/or ads. Moreover, OOB MUX 2956 may be utilized as a downstream path in an interactive system.

The input to OOB MUX 2956 may be configured with Ethernet and/or serial inputs. OOB MUX 2956 may include a Quadrature Phase Shift Key (QPSK) modulator that modulates data on a 1.5 MHz wide carrier, and OOB MUX 2956 may operate within a 71-129 MHz frequency band. Transmitted data packets are typically composed of data that can be multiplexed either in the OOB MUX 2956 or externally. RPD 2957 and OOB MUX 2956 may be communicatively coupled to DAC 2951.

Figure 30:
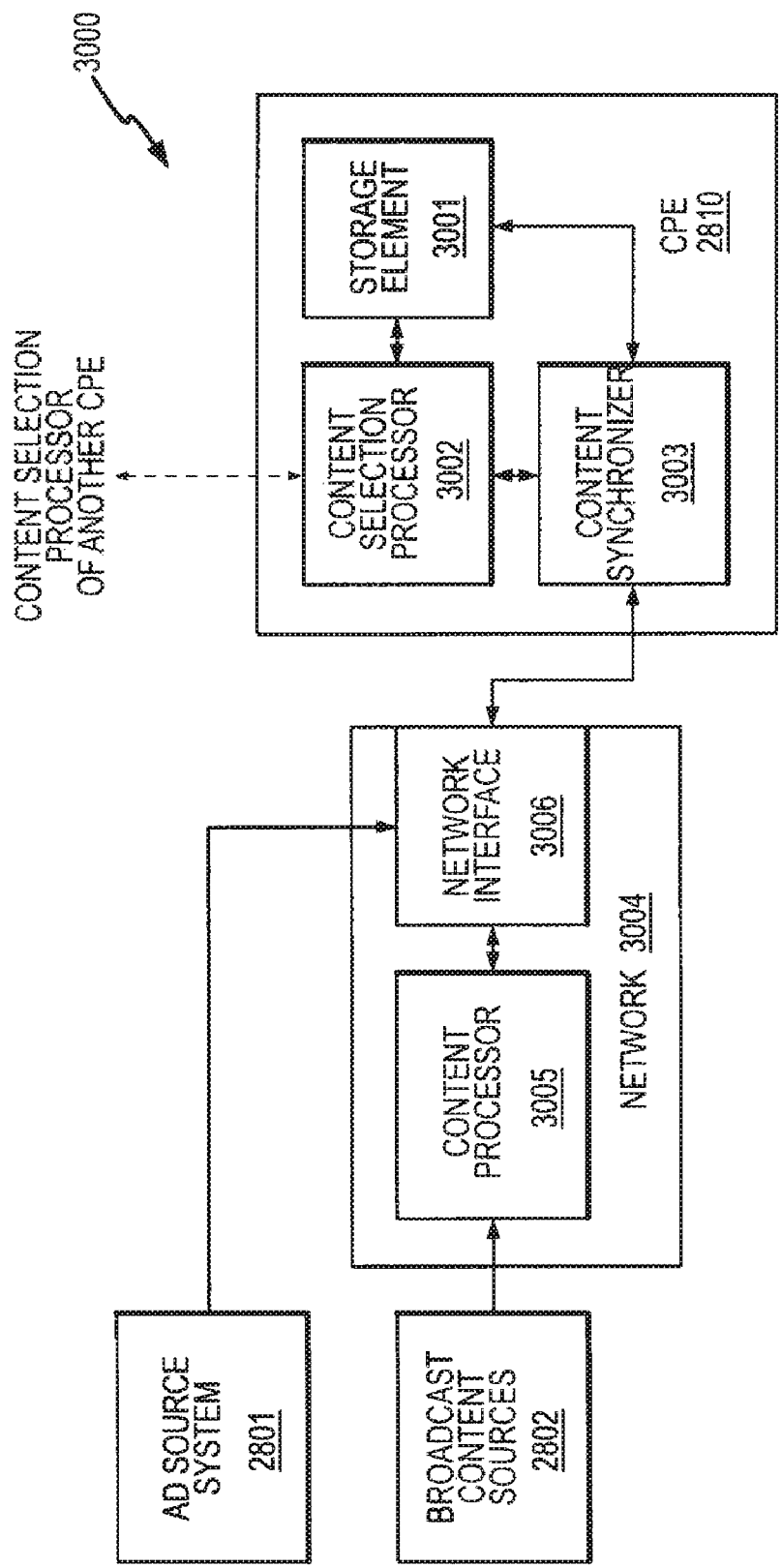
FIG. 30 is a block diagram of an exemplary system that directs CPEs to select informational content for insertion to broadcast content.

Thus, FIGS. 29A and 29B depicted a system adapted for flotilla mode or interleaved mode operation. In either case, insertion occurs at the headend. As noted above, insertion can also be implemented at the CPE 2810. FIG. 30 is a block diagram of system 3000 where CPEs 2810 select ads (e.g., from ad source system 2801) for insertion to broadcast or other content (e.g., from broadcast content provider 2802 at the CPE 2810). CPE 2810 may be configured for receiving a plurality of cable channels carrying content. The content is transferred from content sources 2801 to headend 3004 for delivery to CPE 2810. The content has intervals in which ads may be inserted. In this embodiment, system 3000 incorporates functionality of content selection processing and content synchronization, such as that respectively performed by content selection processor 2805 and content synchronizer 2804 of FIG. 28, at CPE 2810. As such, CPE 2810 may insert ads into content during breaks in the content.

More specifically, CPE 2810 may be configured with content selection processor 3002 to determine which ads should be inserted into received content. For example, CPE 2810 may cast votes for ads as described hereinabove. That is, CPEs may vote as to what ads should be transmitted from the headend 3004, for example, to reduce the number of ads transmitted while optimally targeting users. Instead of selecting ads for transmission to the CPEs 2810 based on voting, the headend may simply cycle through the available inventory of ads for transmission, where the rate at which ads are transmitted is a function of the available bandwidth or other constraints. It will be appreciated that such implementations without voting are particularly apt for systems without an upstream out-of-band pathway, such as certain satellite television implementations. Alternately, the audience classification information for the user, instead of being used for voting, may be used to select ads for storage and to select ads for insertion. That is, the audience classification information may be compared to targeting constraints such that only ads of potential interest are stored at the storage element 3001. Current audience classification information is then used, together with ad delivery constraints, to select ads for insertion at an insertion opportunity. With the ads retrieved, content synchronizer 3003 may insert those segments into broadcast content at certain intervals (e.g., commercial breaks). For example, content synchronizer 3003 may be communicatively coupled to network interface 3006 to receive broadcast content from network 3004. Content synchronizer 3003 may synchronize broadcast content intervals with ads retrieved by content selection processor 3002. An example of a device that may be configured to perform functionality of content selection processor 3002 and/or content synchronizer 3003 includes the BCM 3560 digital TV System-On-Chip by Broadcom Corp. In addition to performing such functionality, the BCM-3520 may perform out-of-band signaling.

Ads may be delivered to CPE 2810 and stored with storage element 3001 using out-of-band signaling techniques as described hereinabove. In addition, the ad content may be transmitted from headend 3004 via ad channels, programming channels or VOD channels that are opportunistically available, or other bandwidth ahead of time. For example, an ad server, such as ad source 2901, may store ads from advertisers. These ads may be transferred via network interface 3006 to CPE 2810 for storage with storage element 3001 using, e.g., in-band bandwidth as noted above or an out-of-band data network and downstream out-of-band modulator, such as out-of-band data network 2924 and downstream out-of-band modulator 2925 of FIG. 29A. Ads may then be combined with (e.g., interleaved with) the broadcast content at the CPE 2810. Content selection processor 3002 may extract ads from the content thus transmitted and store those ads with storage element 3001 for later viewing as determined by the content selection processor 3002. The invention, however, is not intended to be limited to out-of-band signaling or in-band signaling for ad delivery as described above. For example, other forms of ad delivery may include multiple tuners (e.g., a first tuner receiving broadcast network content any second tuner receiving ad content).

Also shown in this embodiment is content processor 3005 configured on headend 3004. Content processor 3005 may be configured to receive broadcast content from broadcast content provider 2802 to provide various features of a communications network, such as digital splicing, etc. Examples of components providing such features are shown and described in headend server 2907, ad splicer 2915, each of FIG. 29A. Upon processing, content processor 3005 may transfer the broadcast content to network interface 3006 such that the content may be delivered to CPE 2810.

Although shown and described with respect to a single broadcast content source 2802, those skilled in the art should readily recognize that broadcast content source 2802 may represent a number of broadcast content sources, such as those shown in FIG. 29A, transferring analog and/or digital content to network 3004. Similarly, ad source system 2801 may be representative of ads provided by a number of advertisers (e.g., analog and/or digital segments) to an ad source, such as ad source 2901 of FIG. 29A. Additionally, system 3000 describes a single CPE 2810. The invention, however, is not intended to be limited to a single CPE. Rather, network interface 3006 may be communicatively coupled to one or more cable plants, such as cable plant 2918 of FIG. 29A. Each cable plant may, in turn, communicatively couple to a plurality of CPEs 2810 within a particular locale. As such, network interface 3006 may deliver broadcast content and ads to many (e.g., hundreds of thousands) of CPEs and these CPEs may include many different models from various manufacturers with different capabilities.

In one embodiment, audience aggregation and spot optimization may be performed even though individual CPEs 2810 may retrieve ads from storage element 3001 configured therewith. With regard to spot optimization, it will be appreciated that different CPEs delivering the same programming content may insert different ads at a given break based on the operation of the content selection processor 3002 as described above. Similarly, with regard to audience aggregation, different CPEs delivering differing programming content may delivery the same ad or ads during a delivery window. Furthermore, content selection processor 3002 may optionally communicate with the content selection processors of other CPEs. The CPEs may be configured to voluntarily share information with one another as directed by a user. As such, the CPEs may transfer information to one another regarding preferred information of content segments choices and/or broadcast content choices. This information may be conveyed to network 3004 via out-of-band signaling techniques as described hereinabove such that preferred content may be delivered to those CPEs.

CPE insertion is not limited to inserting ads into real-time regular programming transmissions. In this regard, CPE insertion may be used to insert ads into VOD content, podcasts, time-shifted programming or other programming transmissions. In the case of VOD content or podcasts, for example, a programming server platform may be operative to forward ad metadata including targeting constraints (including target audience classification information and other constraints) together with or in advance of the programming content. This metadata can then be used by content selection processor 3002 as described above.

In the case of time-shifted content, broadcast or other content may be received from the headend 3004 and stored at the CPE 2810 (for example, including a DVR) for later playback. For example, prime-time broadcast programming may be viewed the following morning if a user so desires. At the time of viewing, content selection processor 3002 is operative to insert ads based on targeting constraints to, including not only matching targeting constraints to current audience classification parameters, but also matching targeting constraints to the current time. Thus, for example, the user viewing prime-time programming in the morning may receive a breakfast-oriented commercial whereas that commercial would probably not have been selected by the CPE during prime-time. In such cases, apportionment of revenues for such ad delivery as between network operators and content providers may be negotiated.

Figure 31:
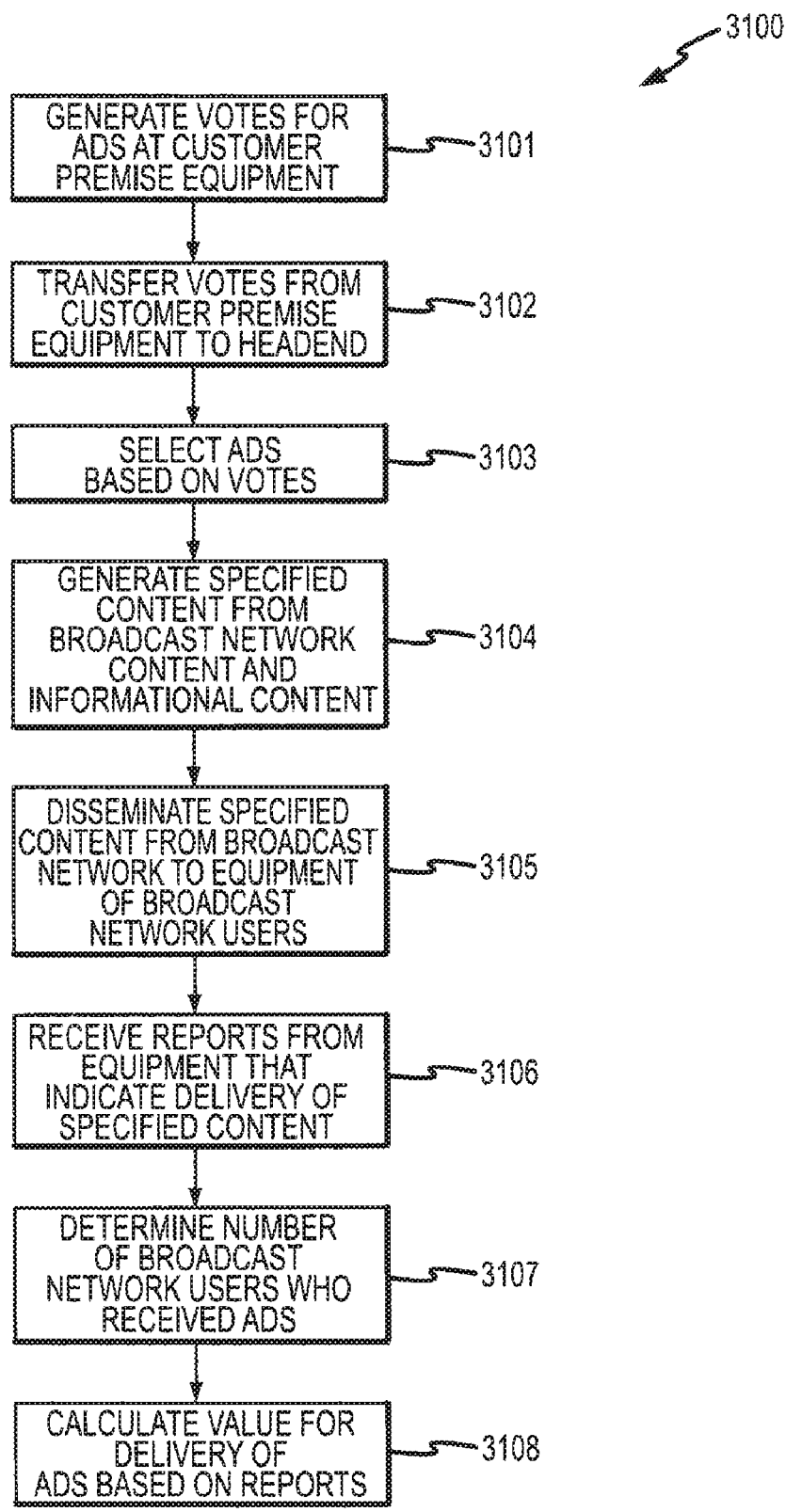
FIG. 31 is a flowchart of an exemplary targeted content process.

It is noted that the network configuration of FIGS. 29A and 29B, on the one hand, and FIG. 30, on the other, are not exclusive. Thus, as described above, a network including a particular CPE may implement any of flotilla insertion, headend interleaving and CPE insertion in different instances. For example, while delivering real-time programming, flotilla insertion and/or headend interleaving may be used to deliver ads during given breaks. Later, during VOD or time-shifted content delivery, CPE insertion may be used to deliver ads at the same CPE. For example, selection between these delivery modes may be made at the headend or at the CPE based on, for example, the source of the content (e.g., real-time headend feed or from DVR storage) or headend/CPE messaging. FIG. 31 is a flowchart of exemplary targeted content process 3100 applicable to the various ad delivery modes. Process 3100 may begin when broadcast network content is delivered to CPEs, such as CPEs 2810 of FIG. 28. For example, a broadcast network (e.g., cable television, satellite television, and/or satellite radio) interfacing with CPEs may deliver broadcast content to CPEs. As the CPEs receive the broadcast network content, they may begin collecting information regarding selections of the broadcast network content. Based on the selections, the CPEs may estimate audience classification information for the current user(s). In response to an ad list received from the headend, this classification information may be compared to targeting information to generate (3101) votes for ads. The votes may be transferred (3102) from the CPEs to the broadcast network. Alternatively, in the context of CPE insertion, the audience classification information may be used internally by the CPEs to select ads for storage and retrieve ads stored therewith for delivery.

The audience classification information or other information related to voting may be used to select (3103) ads for delivery. For example, the vote information may include information regarding a level of suitability to receive certain ads or a fit score. The ads with high fit scores may be delivered by the CPEs. Broadcast network content may be synchronized with ads to generate (3104) combined content. For example, the broadcast network content may include intervals in which ads may be inserted. During these times and based on the votes, the broadcast network may interleave ads into the broadcast network content for delivery to the CPEs as combined content. Alternatively, the ads may be inserted into ad channels or inserted by CPEs as described above.

In the case of flotilla mode operation, flotilla information for a flotilla of ads may be transferred to the CPEs, as described hereinabove (e.g., via out-of-band signaling, in band signaling, multiple tuners, etc.). Such flotilla information may describe the structure of the flotilla and locations (e.g., ad channels) of individual ads. The flotilla information may be used by the CPEs to switch channels to an ad channel conveying a suitable ad during the time interval of the broadcast content. In the case of CPE insertion, the ads are transferred to the CPEs and stored therewith for delivery during the intervals. For example, during predetermined intervals of the broadcast network content, the CPEs may retrieve stored ads and insert those segments into the intervals of the broadcast network content. In the case of headend interleaving, the ads are inserted into the programming channel at the headend (e.g., as determined by processed votes from the CPEs). In each of these embodiments, combined content is disseminated (3105) from the broadcast networks to the users of the CPEs. That is, the CPEs will ultimately deliver the combined information to the users.

Figure 32:
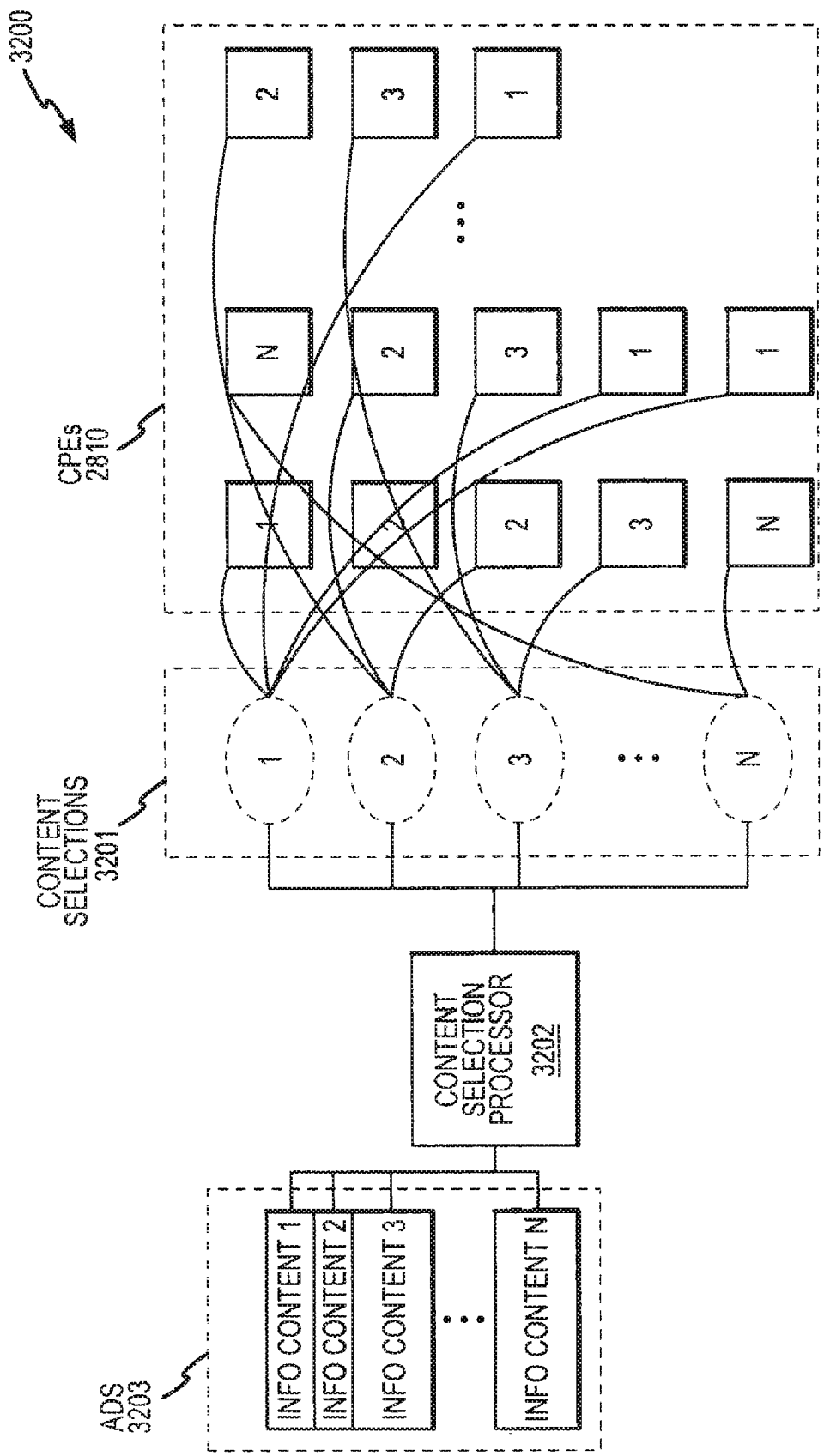
FIG. 32 is a block diagram of an exemplary audience aggregation system.

In addition to determining the suitability of ads, the illustrated process 3100 involves determination of cost allocations for delivered ads. For example, the headend may receive (3106) reports from CPEs to indicate delivery of ads. From those reports, a number of broadcast network users who receive the ads may be determined (3107). Because the ads are targeted, it may be assumed (or verified, based on exposed mode reports) that these ads were delivered to users matching the audience classification parameters of the targeting information. Alternatively, goodness of fit information from the reports (if available) may be used to estimate how well the actual audience matched the target audience. The value of delivered ads may then be calculated (3108) based on the reports. For example, each ad may have a predetermined value associated with a single delivery. By multiplying the number of targeted deliveries times the value associated with a particular ad, an overall value for the ad may be computed. FIG. 32 is a block diagram of exemplary audience grouping system 3200. That is, the diagram illustrates how audience grouping may result from operation of the systems as described above. In this embodiment, content selection processor 3202 receives votes from CPEs 2810 that indicate suitable ads from a collection of ads 3201-1 . . . N, where N is an integer greater than 1. For example, CPEs 2810 may be communicatively coupled to a broadcast network, such as a cable television network, to receive broadcast network content. Users of CPEs 2810 may vote for ads and then delivery suitable ads. As a result, groups of CPEs may show the same ad during a given break or during different breaks (e.g., of different programming channels) within a time window (audience aggregation).

System 3200 illustrates how CPE 2810 users may thus be grouped. For example, CPEs 2810-1 may determine, based on estimated audience classification parameters, to deliver ad 3203-1. Similarly, CPEs 2810-2 may deliver ad 3203-2, and so on. Accordingly, CPEs are grouped with respect to ad selection. In this manner, audience segments are grouped based on audience classification or the like rather than on their current programming selection as in the conventional paradigm.

Alternatively, content selection processor 3202 may be resident on CPEs 2810, thus using audience classification internally to store ads and to deliver ads stored therewith. As such, content selection processor 3202 may transfer the ads to a content synchronizer at CPE 2810 to synchronize the ads with broadcast network content. That is, the ads may be inserted at certain intervals while the broadcast network content is being transferred to CPEs 2810. In this case, grouping results from independent delivery selections by the CPEs. In one alternative embodiment, the grouping may be performed by CPEs 2810 communicating with other CPEs, as described hereinabove.

Although ads 3203 and content selections 3201 are shown herein having corresponding numbers, those skilled in the art should readily recognize that the invention is not intended to be limited to the illustrated embodiment. Rather, the content selections may involve programming, tags or other content, all of which may be targeted by the system of the present invention.

Figure 33:
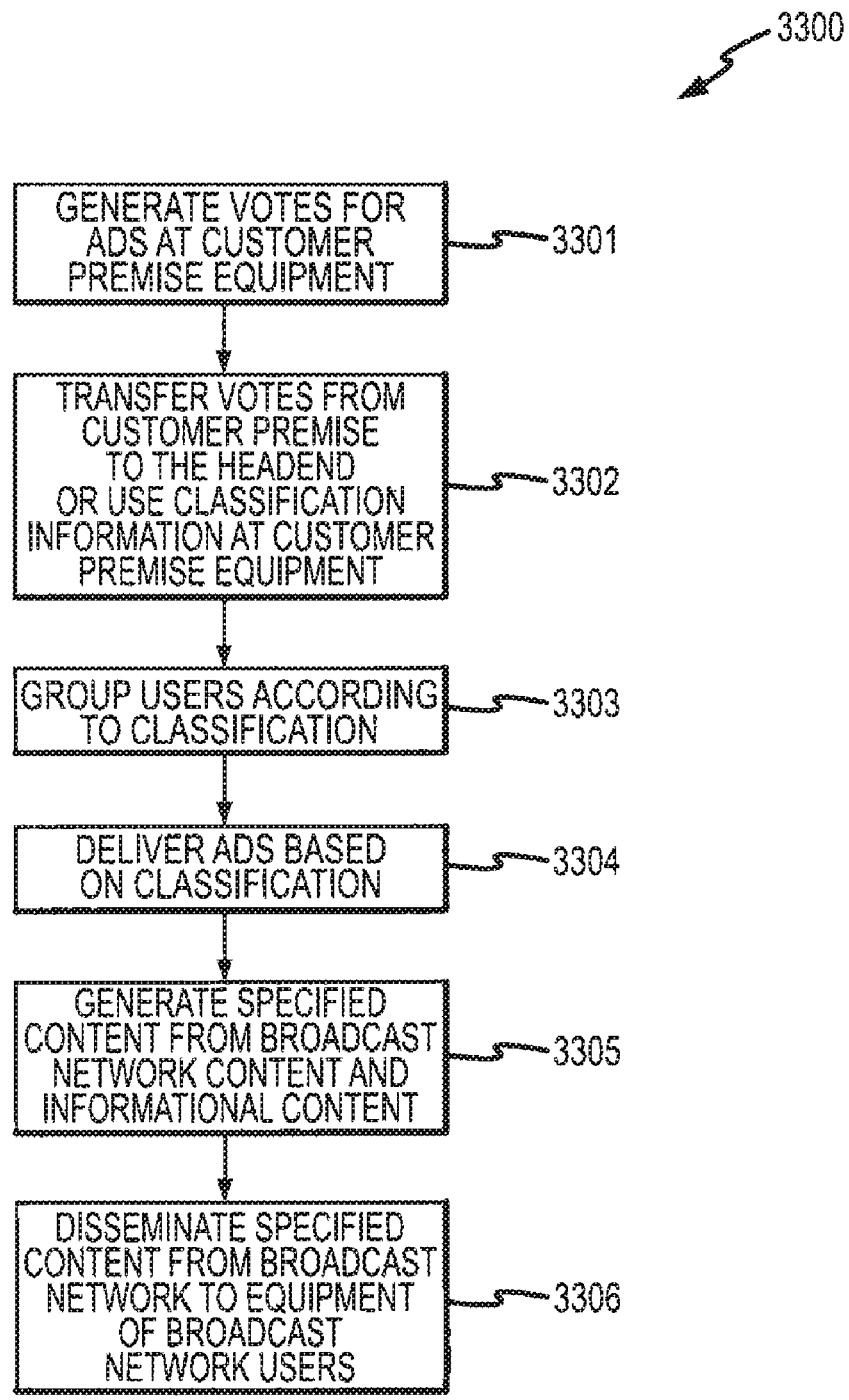
FIG. 33 is a flowchart of an exemplary audience aggregation process.

FIG. 33 is a flowchart of exemplary audience grouping process 3300. Initial features of process 3300 may be similar to features of process 3100. For example, process 3300 may also begin when broadcast network content is delivered to CPEs, such as CPEs 2810 of FIG. 28. As such, CPEs may generate (3301) votes for ads. These votes are then transferred (3302) from the CPEs to the broadcast network. Again, in CPE insertion cases, audience classification information may be used internally by the CPEs as described herein.

The votes may be used to group (3303) a plurality of broadcast network users. For example, a number of CPE users may have similar audience classification parameters. The CPEs may implicitly determine these attributes based on selections of the broadcast network content, volume selections and other click stream information. Examples of these classification parameters may include age, gender, ethnicity, income level, and other demographic information. In this regard, the CPEs may generate votes for ads that may be deemed suitable for the current users according to a particular attribute(s). The votes may then be transferred to and subsequently processed by a broadcast network platform, such as headend 2803 of FIG. 28. The headend may thereby determine a set of ad options to be transmitted. CPEs select from among these options based on the classification information and deliver (3304) the selected assets.

In any of the flotilla mode, headend interleaving mode and CPE insertion mode, ads are interspersed with programming at defined breaks to generate (3305) combined content. For example, a content selection processor, such as content selection processor 3202 of FIG. 32, may retrieve ads (or at least the schedule of ads) and pass the ads to a content synchronizer, such as content synchronizer 2804 of FIG. 28 or content synchronizer 3003 of FIG. 30. The content synchronizer may then insert selected ads or information may be provided for use by a CPE in changing channels to an ad channel or the CPE may be operated to insert the selected ads. In any case, ads may be synchronized with predetermined intervals (e.g., as indicated by cue tones) within the broadcast network content to generate a combination of broadcast network content and ads, as described hereinabove. The combined content is disseminated (3306) by any of various processes depending on the mode. For example, the ads may be inserted as the broadcast network content is being delivered to the CPEs or the CPEs may change to ad bearing channels at intervals to receive the ads.

Figure 34:
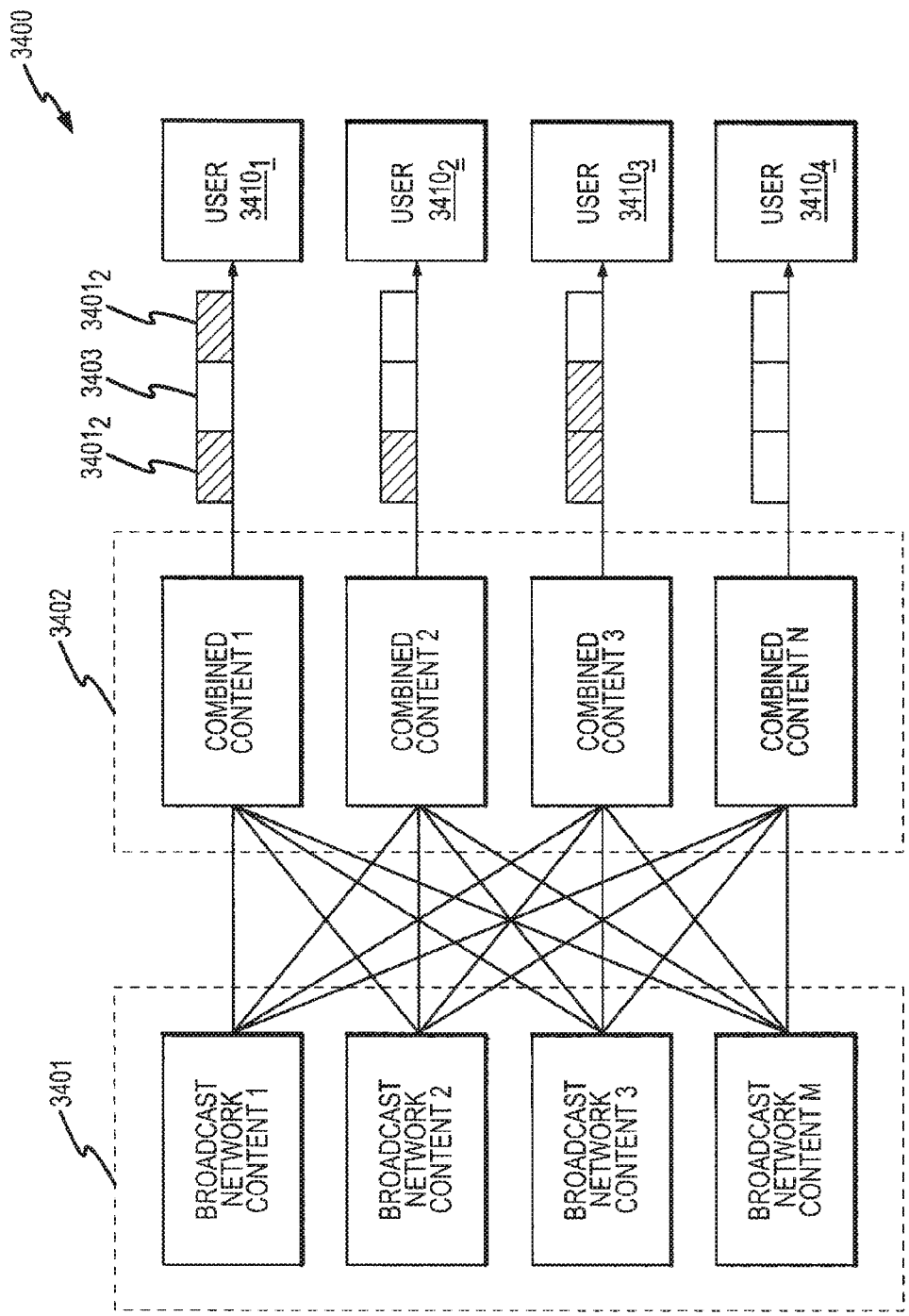
FIG. 34 is an exemplary channel scheduling diagram.

Although unlikely, groups of consumers may receive the same combined programming and ad content at least over a short period of time (over time, users will generally receive a unique combination of content as a function of a series of ad delivery decisions). Moreover, different users on the same programming channel will receive different combined content. Users on different programming channels may receive the same ad during an ad delivery time period. FIG. 34 is exemplary channel scheduling diagram 3400 in this regard. Channel scheduling diagram 3400 illustrates the generation of combined content 3402 (e.g., combined content 1 . . . N, where N is again an integer greater than 1) via combinations of ads (e.g., ad 3403) with programming content (e.g., programming network content 1 . . . M, where M is also an integer greater than 1). For example, in the use of network interleaving, broadcast network content 34012 may be delivered to a content synchronizer, such as content synchronizer 2804 of FIG. 28, where the broadcast network content 3401 is interleaved with ads. In the case of flotilla mode operation or CPE insertion, the broadcast network content 3401 may be combined with ads by inserting the segments into predetermined time intervals within the broadcast network content or by channel switching at the predetermined time intervals.

With regard to headend interleaving, insertion of ads may entail receiving broadcast network content from a plurality of broadcast network content sources as shown and described in FIG. 29A (e.g., via digital and/or analog communications). The content synchronizer may determine periods of time in the broadcast network content for which the ad(s) may be inserted in the programming channel. The content synchronizer may then insert the ad during a broadcast network content break (e.g. a commercial break). With the ad(s) inserted (e.g., ad 3403), the combined broadcast network content and ad(s) is transmitted in a continuous stream to CPEs of certain users 3410. In the case of CPE insertion, the ads 3403 may be combined with the programming content 3401 at the CPE. For example, ads 3403 may be downloaded to CPEs prior to insertion such that a content synchronizer configured with the CPEs may insert the ads at the predetermined intervals. An example of such is described hereinabove in FIG. 30.

With regard to flotilla mode operation, such operation also entails receiving broadcast network content from the broadcast network content providers. The content synchronizer may again identify breaks in the broadcast network content. Rather than interleaving the ads in the programming stream, the content synchronizer may insert the ads in ad channels and send CPEs flotilla information that assists the CPEs in switching channels to a channel conveying the ad(s). The channel(s) conveying the ad(s) may be synchronized to breaks in the programming channel such that, when the CPEs switch to the ad channel, the ad substantially seamlessly appears within the broadcast network content. At the conclusion of the ad(s), a content synchronizer may substantially seamlessly switch back to the programming channel.

Figure 35:
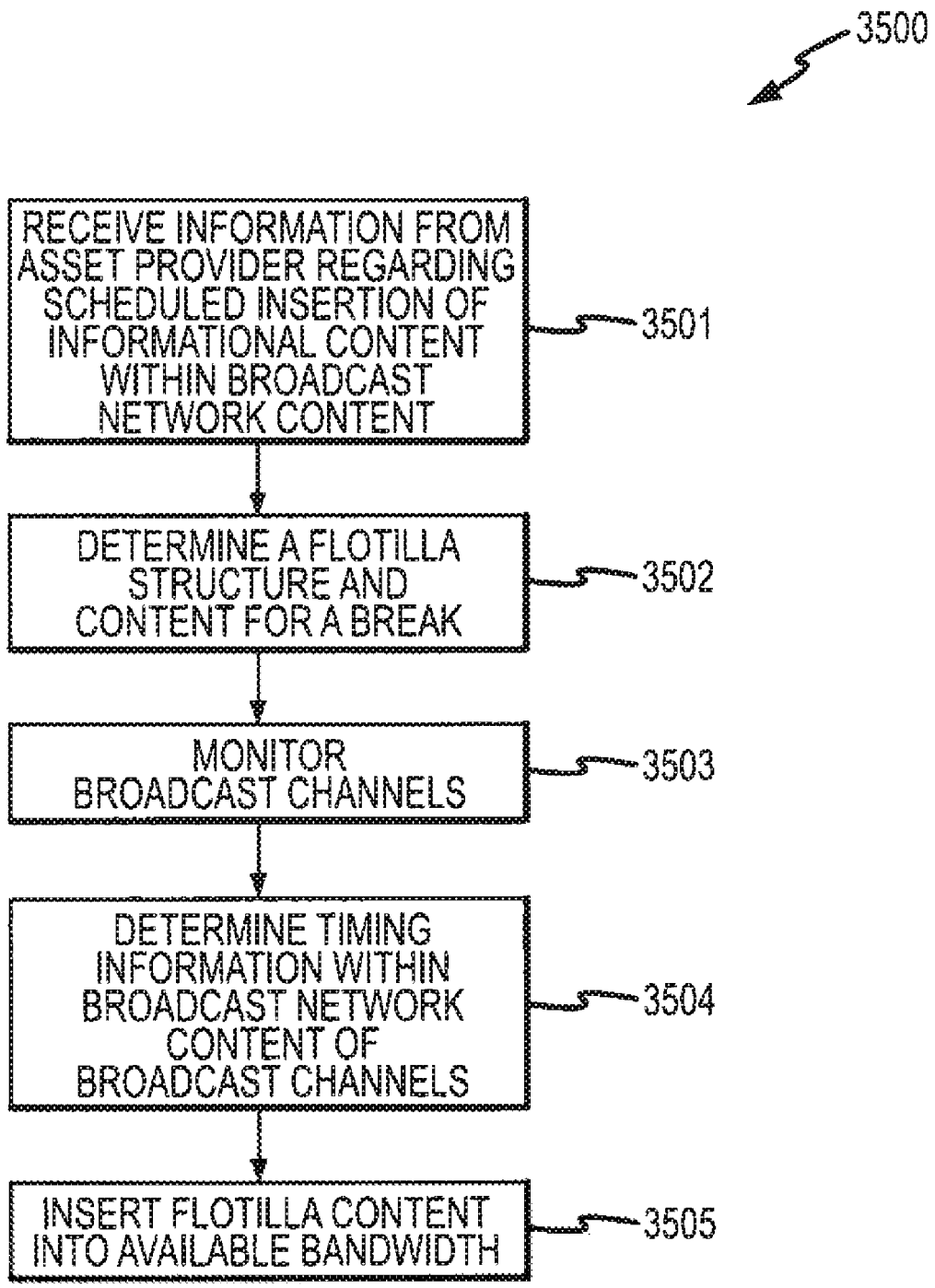
FIG. 35 is a flowchart of an exemplary spot optimization process in accordance with the present invention in the context of flotilla mode operation.

FIG. 35 is a flowchart of an exemplary spot optimization process 3500 in the context of flotilla mode operation. In this implementation, selected ads may be scheduled for synchronized delivery to network users that optimizes the advertisers ability to place ads. For example, spot optimization may include a single advertiser providing a number of ads for a single time slot. Alternatively, spot optimization may involve a number of advertisers each having one or more ads vying for shares of a single time slot based on various audience classifications.

The illustrated process 3500 begins with an advertiser providing information (3501) regarding desired delivery of ads within broadcast network content. For example, a provider of ads may desire insertion of that content into broadcast network content (e.g., regularly scheduled television programs). As such, the advertiser may provide ads, as well as information pertaining to a monetary budget, desired number of audience members and/or a target audience profile. The advertiser may use the traditional time-slot paradigm in relation to the placement of its advertising and as such may specify particular programs, dates, times of day and/or networks.

Once this flotilla structure (3502) is developed, broadcast network channels may be monitored (3503). For example, once an advertising campaign begins, a platform such as headend 2803 of FIG. 28 may begin monitoring channels of broadcast content providers. From these monitored broadcast contents, a determination may be made (3504) regarding timing for transmission of the ads. For example, broadcast content may have predetermined intervals (e.g., commercial breaks) with respect to which ads may be transmitted. These time intervals may be defined by avail windows and cue tones within those windows. Monitoring the channels of broadcast content may provide information regarding such intervals. Thus, in response to a cue tone or signal, the flotilla ad content may be inserted (3505) into the available ad channels and, perhaps, the programming channel. CPEs then select appropriate ads from the flotilla for delivery, which may involve selecting a single ad channel for a break or channel hopping during a break. In this manner, CPEs select among available options for a single spot so as to implement spot optimization.

Figure 36A:
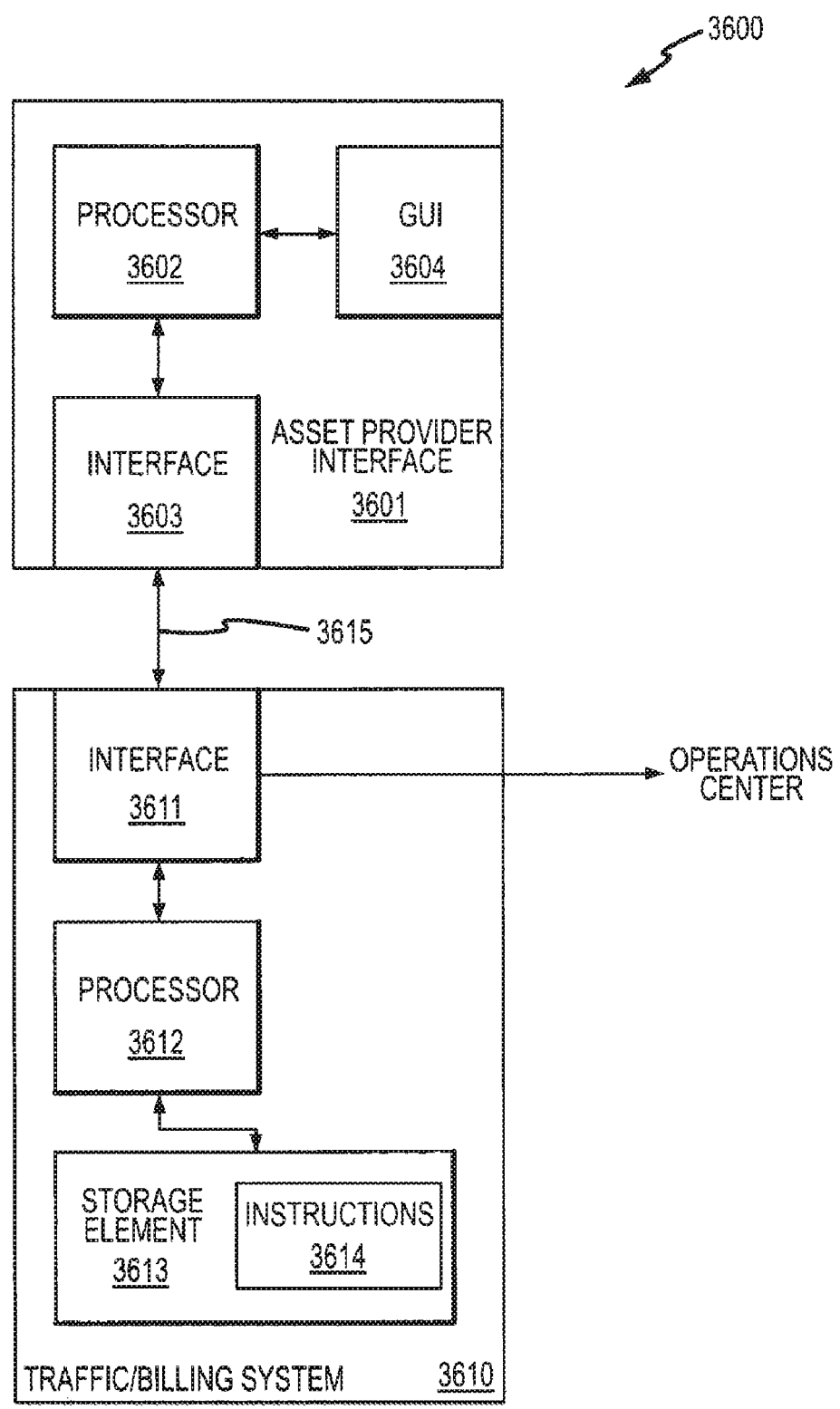
FIG. 36A is a block diagram of an exemplary targeted content interface system.

FIG. 36A is a block diagram of an exemplary targeted content interface configuration 3600. Targeted content interface configuration 3600 may be used to interface with an advertiser, such as advertiser 2801 of FIG. 28. Targeted content interface configuration 3600 may provide the advertiser with an interface to a system that targets content for broadcast networks, such as system 2800 of FIG. 28. In this regard, advertiser interface 3601 may include processor 3602 that provides graphical user interface ("GUI") 3604 to an advertiser. For example, processor 3602 may be a general-purpose computer configured with a monitor to display GUI 3604. GUI 3604 may provide information to the advertiser with respect to generating an ad campaign (e.g., a television commercial campaign). Examples of such information may include demographics, monetary budget, desired time, and/or broadcast network program.

Additionally, GUI 3604 may receive information from the advertiser pertaining to desired/selected ad campaigns. For example, an information content provider may choose to display certain ads to a particular viewing audience at a given time of day. The advertiser may also wish to enter a maximum budget and/or a cost per ad impression (i.e., delivered ad, although typically measured in cost per thousand, or "CPM"). Generally, the cost associated with the ad may be set by the network operator after negotiation or based on historical data. The advertiser may enter this information into GUI 3604 such that processor 3602 may, among other things, transfer the information to traffic/billing system 3610 via interface 3603. Interface 3603 may be configured for providing communications between advertiser interface 3601 and traffic/billing system 3610. For example, interface 3603 may communicatively couple to interface 3611 of traffic/billing system 3610 via communication link 3615. Communication link 3615 may be an Internet link as is used to transport communications via Internet protocol (e.g., TCP/IP). As such, GUI 3604 may be configured as an applet that operates within a Web browser, such as Microsoft's Internet Explorer. In such an embodiment, GUI 3604 may download information from traffic/billing system 3610 that enables an advertiser to manage an ad campaign.

The invention, however, is not intended to be limited to a particular type of communications between the advertiser and traffic/billing system 3610. For example, communication link 3615 may be a server connection and/or a virtual private network connection. In such an embodiment, GUI 3604 may be a customized software application that allows communications between the advertiser and traffic/billing system 3610. The software application may be controlled by instructions 3614 stored with storage element 3613 of traffic/billing system 3610. For example, instructions 3614 may direct processor 3612 to deliver an application to advertiser interface 3601 such that GUI 3604 is displayed therewith. Ad campaign information may also be entered manually, as by staff of a network operator or agent thereof. That is, for example, an advertiser may simply talk to a salesman (e.g., over the telephone) and the salesman may use the system as described herein to enter the information.

Processor 3612 may also be configured for providing ad contract information to the targeted advertising system, estimating a target universe in connection with ad campaign development and controlling billing operations for a network operator. For example, processor 3612 may communicate with an operations center, such as operations center 2914 of FIG. 29A to provide ad content information and obtain report information for audience estimation and billing. The operations center may convey information pertaining to delivered ads of a particular campaign that the advertiser has entered with traffic/billing system 3610 (i.e., via GUI 3604). Such information may be based on delivery reports from CPEs. Based on this information, processor 3612 may generate billing values associated with delivered ads (e.g., targeted impressions). As such, a bill may be generated for the advertiser and delivered to the advertiser via communication link 3615 or other means, such as traditional mailing, email and/or withdrawal from a deposit account. However, the network operator may prefer to handle bills directly. In that regard, processor 3612 may present the information to the network operator such that a bill may be generated for the advertiser.

FIG. 36B is exemplary GUI 3604 of targeted content interface configuration 3600 of FIG. 36A. In this embodiment, GUI 3604 provides a resource that enables the advertiser to initiate an advertising campaign. For example, an advertiser may wish to generate an ad campaign for commercial breaks within broadcast network content (e.g., television commercial breaks). GUI 3604 allows the advertiser to generate the ad campaign for ads by entering certain campaign parameters (e.g., cost per impression 3636, billing information 3637, maximum cost per impression 3639, campaign dates 3642, and/or various demographic information 3631). Costs associated with each ad may be negotiated with the MSO prior to the ad campaign.

An advertiser may provide ads to a system that targets the ads to certain CPEs, such as CPEs 2810 described hereinabove. For example, an advertiser may provide ads to an ad server, such as ad server 2901 of FIG. 29A. The advertiser may then establish desired delivery attributes (e.g., demographic information 3631, such as age, gender, income, and/or time of day) for delivery for the ads via GUI 3604. That is, the advertiser may associate various attributes of CPE users to ads such that the ads are delivered accordingly (e.g., based on votes cast by the CPEs as described hereinabove). Additionally, the advertiser may include information regarding the maximum cost per impression (e.g., maximum cost per delivered ad) and/or duration of the ad campaigns. GUI 3604 may be implemented as an interfacing application delivered, for example, to the advertiser by a server based system (e.g., traffic/billing system 3610). Alternatively, GUI 3604 may be implemented as a web site in which an advertiser interfaces through, for example, a Web browser, such as Microsoft Internet Explorer. In either case, GUI 3604 may provide information to traffic/billing system 3610 regarding certain campaign information (e.g., demographics, billing information, etc.). Similarly, GUI 3604 may provide information to advertiser regarding costs associated with the ad campaigns. For example, GUI 3604 may receive information from traffic/billing system 3610 regarding the number of impressions (e.g., deliveries of ads to individual CPEs) and the costs associated with those impressions.

Figure 36C:
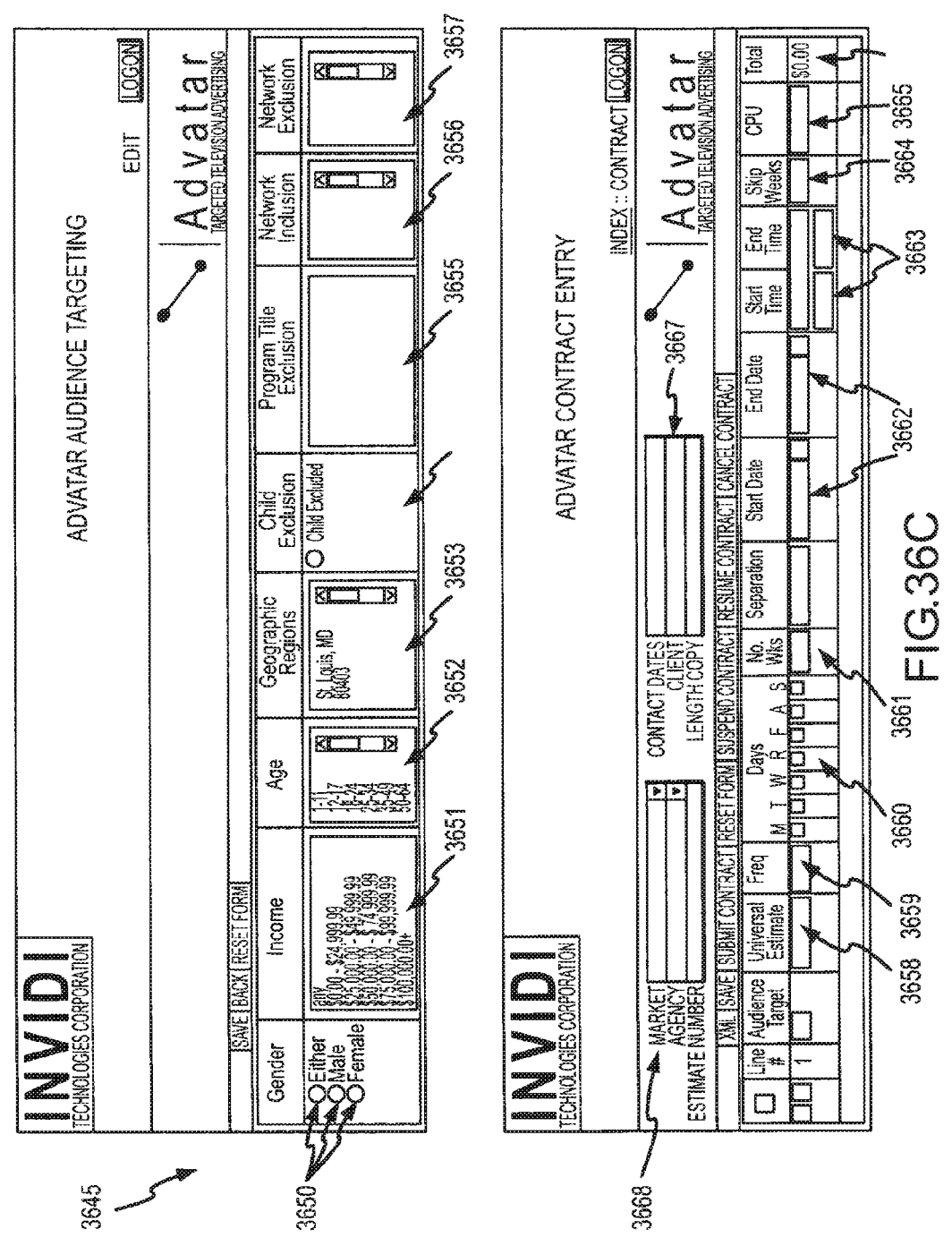

While one embodiment has been shown and described herein, those skilled in the art should readily recognize that the invention is not intended to be limited to the illustrated embodiment. For example, GUI 3604 may be implemented in other ways that fall within the scope and spirit of the invention. Those skilled in the art are familiar with implementing such interfaces in a variety of ways. For example, ad delivery may be auctioned to advertisers. Thus, a spot, an audience segment within a spot or a level of advertising independent of any spot (e.g., 500,000 impressions targeted to males 18-34) may be sold to the highest bidder. Moreover, ads may be targeted based on a search directed to textual matter associated with a program (e.g., in the title, program description or closed captioning). In this regard, for example, an advertiser may elect to place ads on programs including the word NASCAR. FIG. 36C illustrates GUI 3645 in an alternative embodiment to GUI 3604. In this embodiment, GUI 3645 incorporates audience estimation information. For example, a system used for targeting ads to CPEs, such as system 2800 of FIG. 28, may provide report information regarding delivery of ads having specific delivery constraints. Based on an analysis of this historical information and/or other information such as census data, an estimated audience size may be projected for an ad under consideration based on associated targeting constraints. This audience estimation may be incorporated into GUI 3645 such that an advertiser may designate where ads should be delivered as well as budget for delivered ads.

GUI 3645 may enable the advertiser to select various features that correspond to audience members. For example, the advertiser may input a certain audience profile based on gender 3650, income level 3651, age 3652, geographic region 3653 (e.g., zip code, city, suburb, neighborhood, individual dwelling, state, etc.), as well as other parameters (e.g., channel inclusion 3656, channel exclusion 3657, program exclusion 3655, etc.) to designate delivery of a particular ad. Based on these parameters, the system may estimate an "audience universe" (e.g., a number of audience members fitting that profile) and allocate a cost for the ad. Audience estimation is shown and described below in FIGS. 38A through 38C.

Intuitively, the advertiser may enter a certain audience profile according to various audience parameters age 3652, income level 3651, gender 3650, etc. The parameters of program exclusion 3655 may enable the advertiser to exclude various programs, or broadcast network content. For example, by entering a certain broadcast network content program title, the advertiser may deselect insertion of an ad from that broadcast network content program.

Similarly, individual network channels may be included (i.e., channel inclusion 3656) or excluded (i.e., channel exclusion 3657) by the entry of certain channel information within designated fields. This may enable the advertiser to designate which channels receive ads. For example, an advertiser wishing to deliver ads relating to lingerie would likely not wish to deliver such ads to viewers of a children's programming channel. As such, the advertiser may use GUI 3645 to exclude lingerie ads from viewers of that channel. In a similar fashion, an advertiser may wish to include certain other channels that would be preferential for a particular ad campaign. For example, the ad provider may wish to deliver ads relating to men's shaving products (e.g., shaving cream, razors, etc.) to viewers of a sports network.

In addition to the audience selection parameters mentioned, GUI 3645 may include other parameters that an advertiser may use to generate a campaign of ads. For example, the advertiser may select days of the week 3660 and the number of weeks 3661 in which the ads are to be delivered to the designated audience profile. In this regard, advertiser may also select the start and end dates 3662 and the start and end times 3663 of the selected days. As well, the advertiser may select the frequency 3659 during this campaign in which the ads are to be delivered to the designated audience profile. As noted above, the system provides substantial flexibility in this regard. For example, an advertiser may indicate a desire to reach 100,000 males age 24-34 with a certain income level during a certain time window, but exclude individuals who have already received the ad 10 or more times, all such constraints may have appropriate GUI elements associated therewith.

Optional features may include "skipping" certain times in which the ads are to be delivered. For example, an advertiser may desire delivery of an ad during a certain week while skipping other weeks within a campaign start date and end date. The advertiser may therefore enter the weeks to be skipped in the skip weeks field 3664.

The system may also use these selected campaign parameters to estimate the audience universe. For example, the system may retrieve historical information corresponding to entered campaign parameters. That is, the system may retrieve the number of audience members using CPEs at times that correspond to the campaign parameters. This may be based on report information from similar campaigns, census data and/or other information. This information may be displayed in audience universe estimate 3658. Additionally, GUI 3645 may include cost allocation parameters for which the system may generate bills for the advertiser. For example, each ad within a given campaign may have a "cost per impression" 3665. As such, the system may use an audience universe estimate 3658 and multiply the cost per impression for an individual ad and may further multiply by the frequency for the individual ad to estimate a total cost for a given ad campaign. Billing may be based on price estimates or actual delivery as determined from reports.

Other information for GUI 3645 may include items such as client identification 3667 and the particular market 3668 for the client. For example, a company such as Intel Corp. may be identified as a high technology company desiring to display ads to a certain group of consumers, such as college-educated users between the ages of 28 and 42. An Intel representative may use GUI 3645 to tailor an ad campaign that delivers ads relating to Intel processors that enhances delivery of such ads to the desired audience. The system may therefore use the market information as a "filter" for certain broadcast network channels having viewership that resembles a desired audience. In this regard, aggregation of CPE users may be achieved. Marketing labels may also be used in this regard as discussed above.

Figure 37:
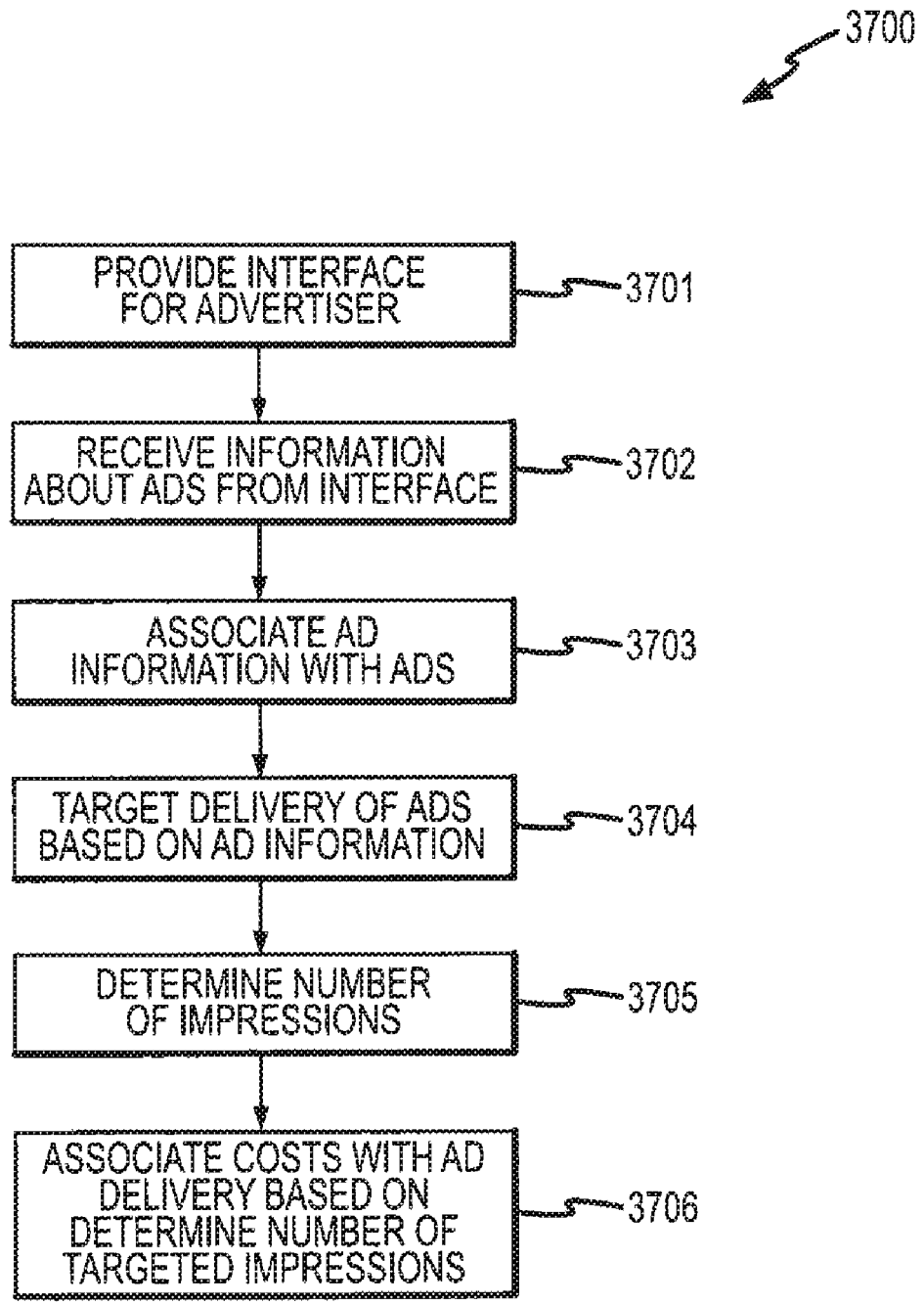
FIG. 37 is a flowchart of an exemplary targeted content interface process.

FIG. 37 is a flowchart of exemplary targeted content interface process 3700. In this embodiment, an interface is provided (3701) for use by advertisers. For example, a system used for targeting ads to CPEs, such as system 2800 of FIG. 28, may provide a user interface, such as GUI 3604 of FIG. 36B to an advertiser. With the user interface, the advertiser may communicate information pertaining to campaigns for selected ads. That is, advertiser may provide targeting constraints to be associated with ads. The provider may also provide account/billing information such that costs associated with campaigns may be provided thereto.

The system may receive (3702) the information about the ads from the interface. The system may then associate (3703) the ad information with the ads of the advertiser. For example, the ad information may include demographic attributes (e.g., age, gender, income level, etc.) of desired targets as well as delivery timing, frequency, etc. As such, the system may target (3704) delivery of the ads based on the information and demographic information. That is, the system may provide ads in combination with broadcast network content as described hereinabove (e.g., flotilla mode, headend interleaving, CPE insertion, etc.).

The system may deliver the ads to CPEs. In this regard, certain CPE users may receive broadcast content combined with a first ad while other CPE users receive broadcast content combined with a second ad (e.g., that differs from the first ad). Regardless, each ad that is delivered to a CPE user is deemed a targeted impression. The CPEs, upon receiving the ad, may report back to the system that the segment was delivered. As such, the system may determine (3705) the number of impressions delivered at CPEs. Based on the number of impressions, the system may associate (3706) billing values with ad delivery. For example, each ad may have a predetermined cost per impression associated with the segment. The total cost for the ad delivery is therefore the number of impressions times the associated cost per impression. This information may then be communicated to the advertiser such that payment can be made.

Figure 38A:
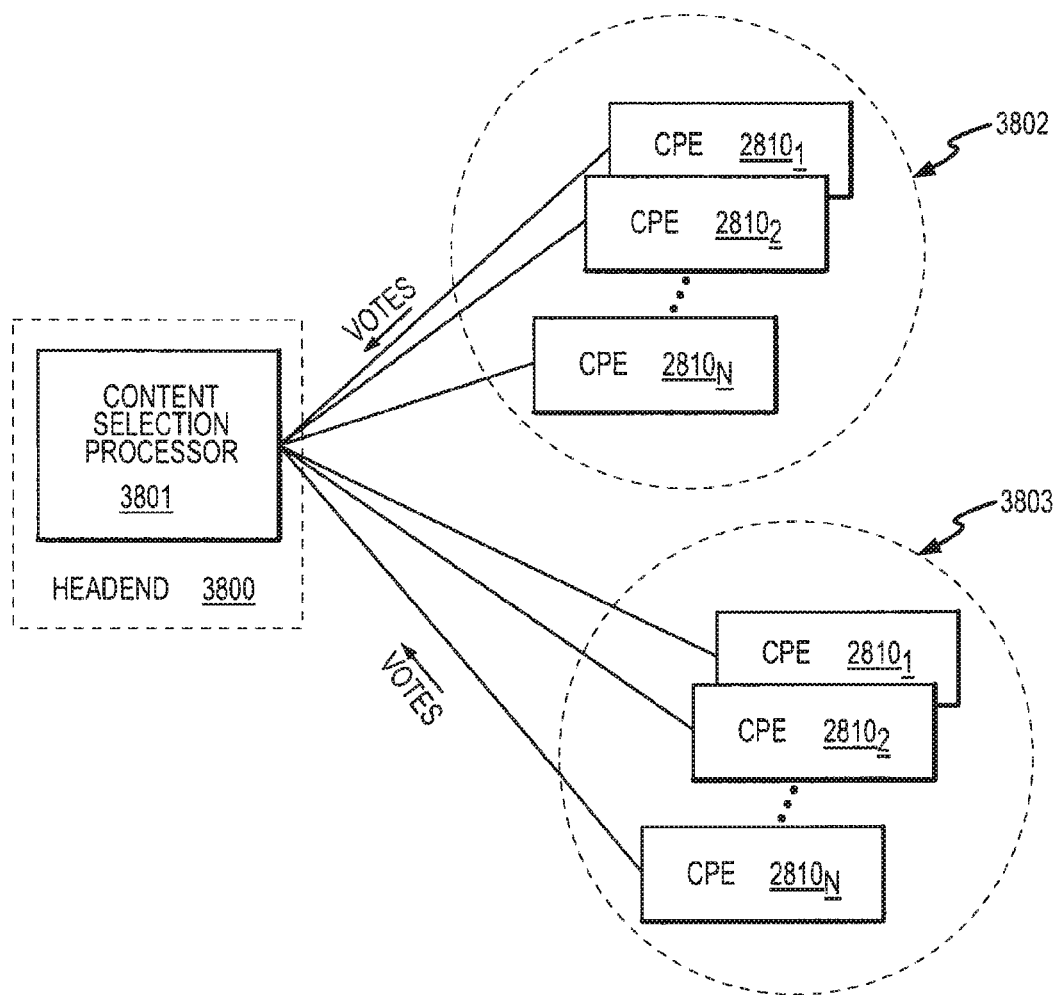
FIG. 38A is a block diagram illustrating an exemplary audience estimation.

Although audience estimation or measurement has been described above in relation to delivery reports on census data, the audience can also be estimated based on voting. FIG. 38A is a block diagram illustrating an exemplary voting-based audience estimation system. The illustrated headend 3800 is configured with content selection processor 3801 to receive votes from a plurality of CPEs 2810. Based on those votes, content selection processor 3801 may inferentially aggregate CPE users into demographic groups and thus estimate cross-sections of an audience. That is, the votes may include information pertaining to suitable advertisements for CPE users. It may therefore be inferred that votes having a high fit score for an ad are associated with users who match the target audience. Headend 3800 may represent a simplified version of system 2800 shown and described in FIG. 29A. Content selection processor 3801 may receive the votes from CPEs 2810. For example, CPEs 2810 may be configured to monitor channel selections and other click stream inputs of respective CPE users, as described hereinabove. Based on these inputs, CPEs 2810 may infer audience classification parameters of their respective users, such as age, gender, income level, etc. The CPEs 2810 may further be configured to transfer votes to content selection processor 3801 as long as CPEs 2810 remain operational. For example, as long as a user is operating a CPE 2810 to observe broadcast network content (e.g., television programs), the CPE may monitor the user's channel selections to determine audience classification parameters. CPE 2810 may then generate votes that are generally reflective of the classification parameters and transfer those votes to headend 3800. Headend 3800 may, in turn, process the votes and determine the above-mentioned classification parameters of the CPE users.

Since each participating CPE 2810, or at least a sampling thereof, transfers votes to headend 3800, headend 3800 may estimate a size of the audience using the network, as well as cross-sections of that audience. That is, as each CPE 2810 transfers votes to headend 3800, the votes from each CPE may be processed to determine the number of audience members using network 3800 and the composition of the audience. For example, CPEs 2810 of group 3802 may monitor channel selections to determine that group 3802 includes users whose CPEs voted for ads targeted to males between the ages of 22 and 32. As such, headend 3800 may determine that the audience of group 3802 has a size as indicated by votes matching the relevant audience classification. Group 3803, however, may include users whose CPEs voted for ads matching a family of four. Accordingly, headend 3800 may determine the audience size of group 3803 based on the number of CPEs 2810 within group 3803 and the estimated number of family members watching those CPEs. Determining the entire audience size, therefore, may simply be a matter of adding the numbers of CPE users for the various groups (e.g., group 3802 and group 3803) and accounting for any sampling factor as well as the ratio of participating users to the universe of users.

The invention, however, is not intended to be limited to the illustrated audience estimation calculation. For example, audience estimation may be more explicit if audience members were to intentionally "expose" personal information to network 3800. One other example of such audience estimation is shown and described below in FIG. 38B. Accordingly, other forms of audience estimation may fall within the scope the spirit of this invention.

Figure 38B:
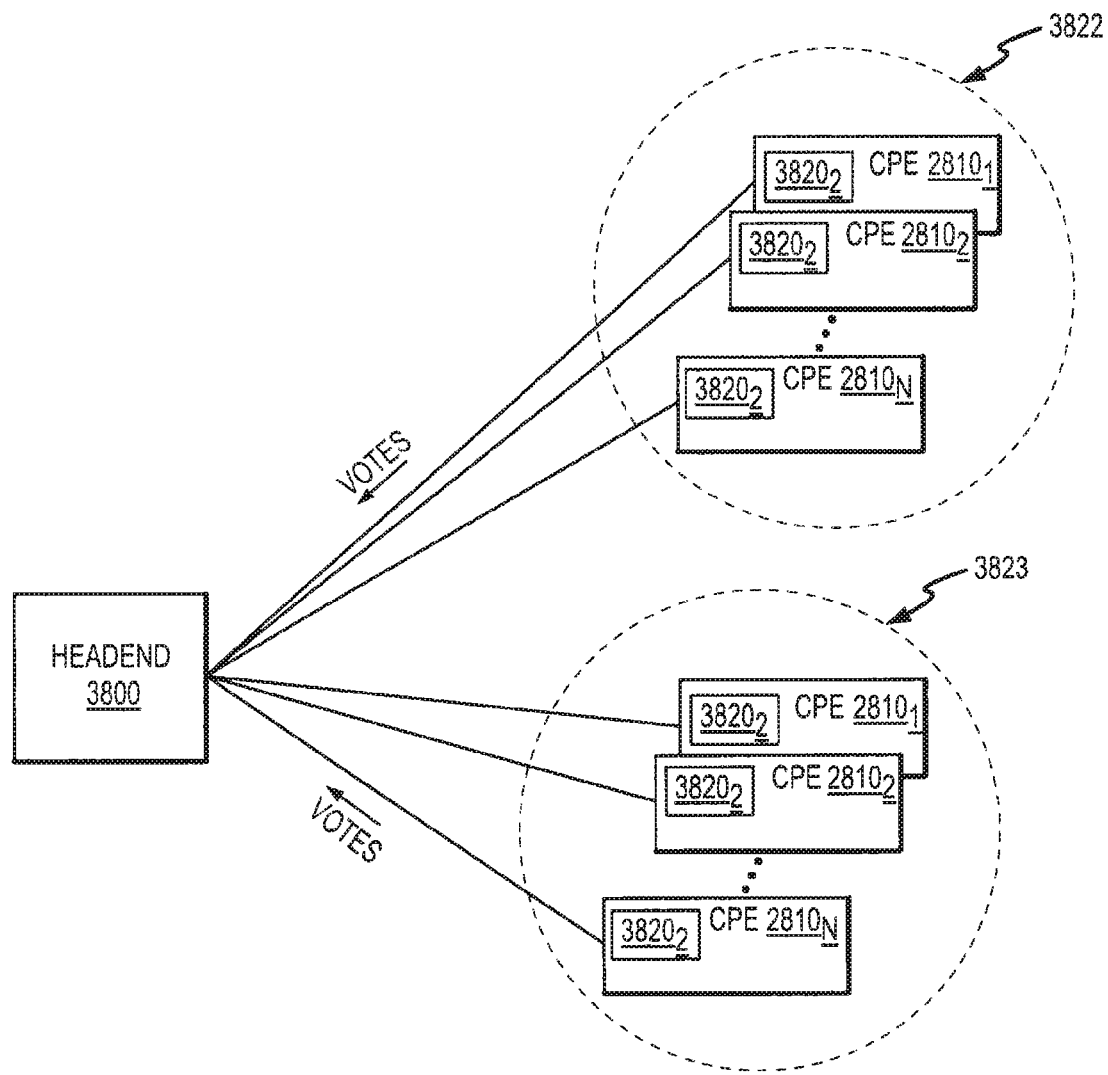
FIG. 38B is a block diagram illustrating another exemplary audience estimation.

FIG. 38B is a block diagram illustrating another exemplary voting-based audience estimation system, in this case, in the context of CPE insertion. As noted above, CPE insertion may optionally be implemented with voting for ad transmission. In this embodiment, content selection processors 3820 are configured with individual CPEs 2810 to transfer votes to headend 3800 such that the network may categorize CPEs 2810 into groups according to audience classification parameters (e.g., demographics). For example, content selection processors 3820 of CPEs 2810 may monitor channel selections of CPE users. Based on these monitored channel selections, content selection processors 3820 may cast votes that are used by headend 3800 and/or CPE 2810 to select desired ads for transmission of broadcast network content with insertion then being executed at the CPE.

Headend 3800 may categorize CPE users based on the votes. For example, CPE users of group 3822 may have channel selection habits or other click stream inputs that indicate membership in group 3823. Content selection processors 3820 may process these inputs and cast votes that indicate a certain suitability for delivery of certain ads associated with a corresponding target audience. Headend 3800 may determine the size of the audience segments based on the target audience and on the votes. Subsequently, headend 3800 may deliver ads to CPEs 2810 via interleaving of the ads into broadcast network content at the network or by separate transmission of the ads to the CPEs together with insertion information. Alternatively or additionally, headend 3800 may deliver the ads by requesting that CPEs 2810 retrieve the ad segments from storage configured therewith. Examples of these CPE operations are shown and described above in connection with FIGS. 29 and 30. Headend 3800 may also process the votes to determine a size of the audience in a manner similar to the audience estimation illustrated in FIG. 38A.

Figure 38C:
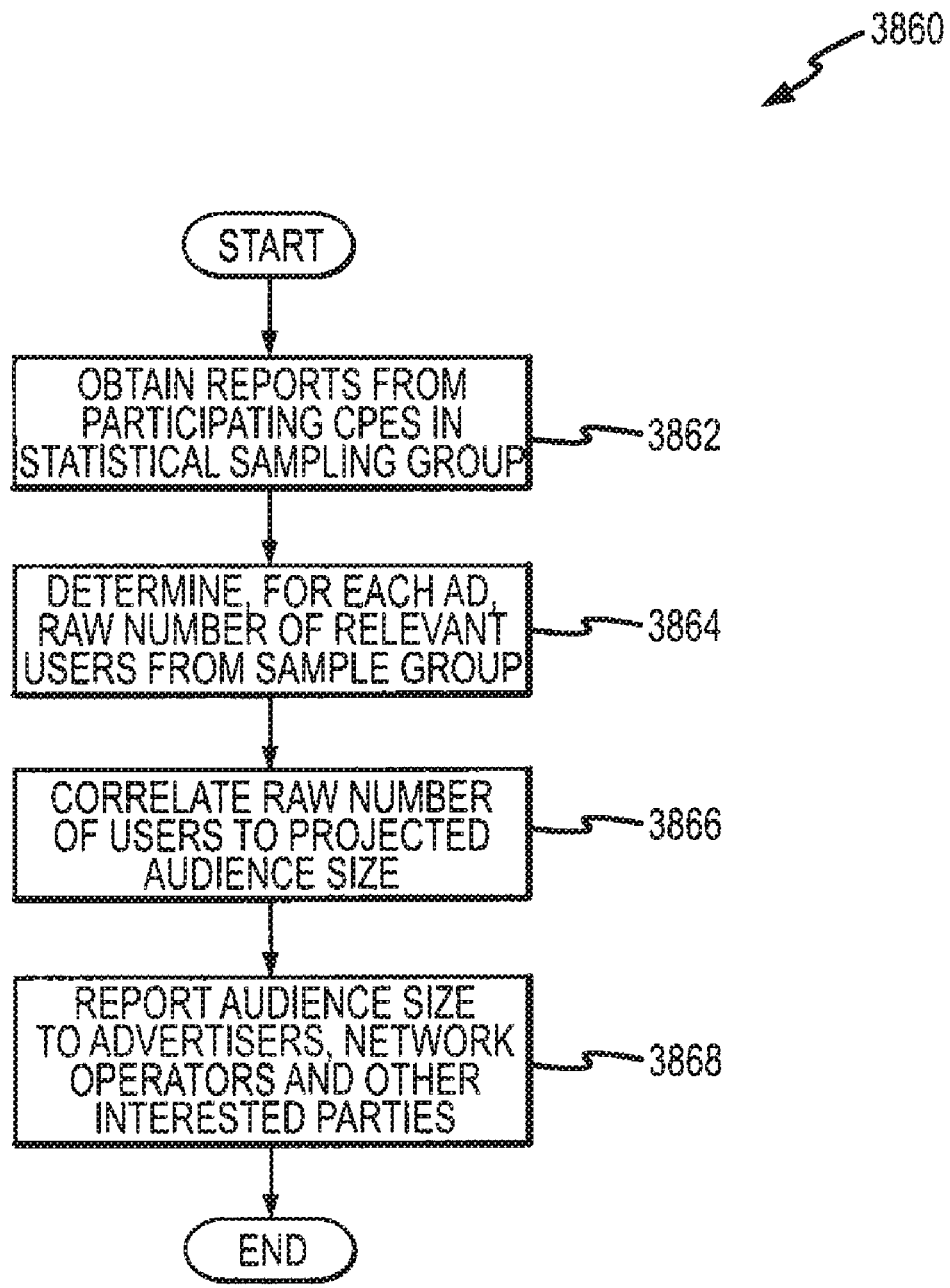
FIG. 38C is a flowchart of an exemplary audience estimation process.

The immediately preceding sections addressed audience estimation based on voting. As noted earlier, it may be preferable to implement audience estimation based on reports as report information positively indicates delivery of ads. FIG. 38C illustrates an exemplary process 3860 in this regard. The process 3860 begins by obtaining (3862) reports from participating and reporting CPEs. As noted above, some CPEs may not include set top boxes or may otherwise choose not to participate in the targeted advertising system or the reporting process thereof. Accordingly, the reports obtained from the CPEs will generally represent only a portion of the full audience to whom the ad was delivered. The estimation process 3860 further involves determining (3864), for each ad, the raw number of relevant users from the sample group. In this regard, it may be desired to measure the size of the overall audience and/or the size of the audience segment matching the target audience classification for the ad (or some other segment). In the targeted advertising system of the present invention, in many cases, these may be assumed to be the same with respect to reporting users. That is, it is expected that ads will only be delivered to users having audience classification parameters that match the target audience for the ad. However, due to limited bandwidth for providing ad option, a variety of considerations relating to flotilla construction and other factors, ads may sometimes be delivered to users who do not perfectly match the target audience. This may be reflected in a goodness of fit score that can optionally be provided in connection with reports. Also, precise audience classification information may be available for exposed mode users. Thus, the reports may be processed to identify a number of potentially matching users or users from other audience classification segments.

In any event, the raw number of users can be correlated (3866) to a projected audience size (overall audience size and/or audience size segmented by audience classification groups). This may involve, among other things: 1) extrapolating the statistical sample group of reporting CPEs to the full number of estimated participating CPEs in the audience, 2) extrapolating the full number of participating users in the audience to the overall number of CPEs eligible to participate in the audience, and 3) extrapolating the overall number of CPEs eligible to participate in the audience to the absolute audience size. E.g., including CPEs without set top boxes such as analog users in the case where the ad is interleaved into the programming channel content stream for delivery to analog users. Extrapolating from the sample group size to the size of the participating group is a function of the algorithm for selecting the sample group for reporting. The relative numbers of participating and nonparticipating users will generally be known based on the opt-in/opt-out process. The participating users may or may not be representative of the group of all users eligible to participate. Consequently, this extrapolation may involve a correction to reflect any known or assumed statistical difference between the participating and nonparticipating users which may be useful for predictive purposes. Moreover, the full number of users eligible to participate can be extrapolated to the absolute relevant audience size, for example, based on the relative size of the audience for the ad at issue in relation to other ad options, any relevant census or demographic data and other statistically relevant information. Again, it will be appreciated that the group of users eligible to participate may or may not be representative of the overall universe of viewers and statistically based corrections may be required. In any case, some or all of this audience estimation information can be reported (3868) to advertisers, network operators and other interested parties.

Figure 39A:
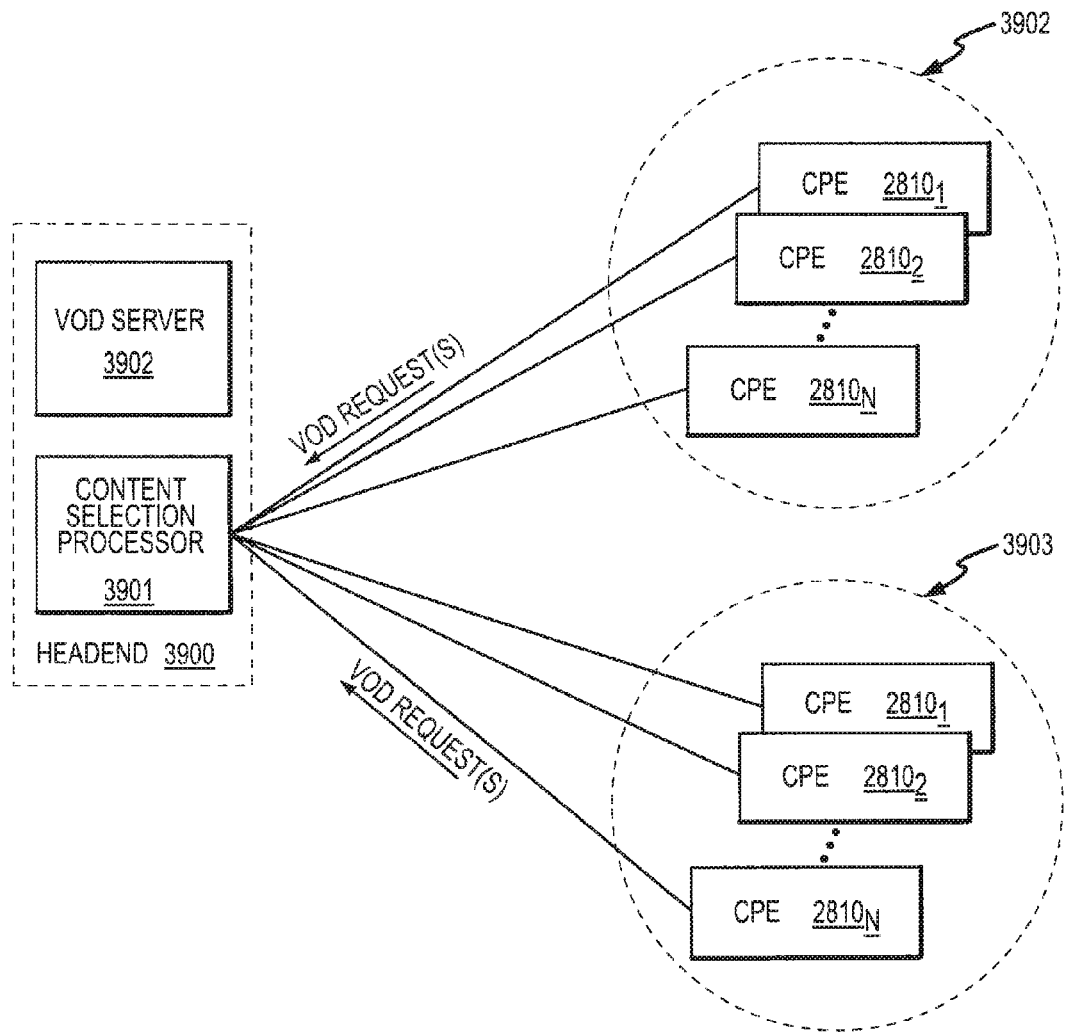
FIG. 39 is a block diagram illustrating targeted content in Video on Demand ("VOD") networks.
Figure 39B:
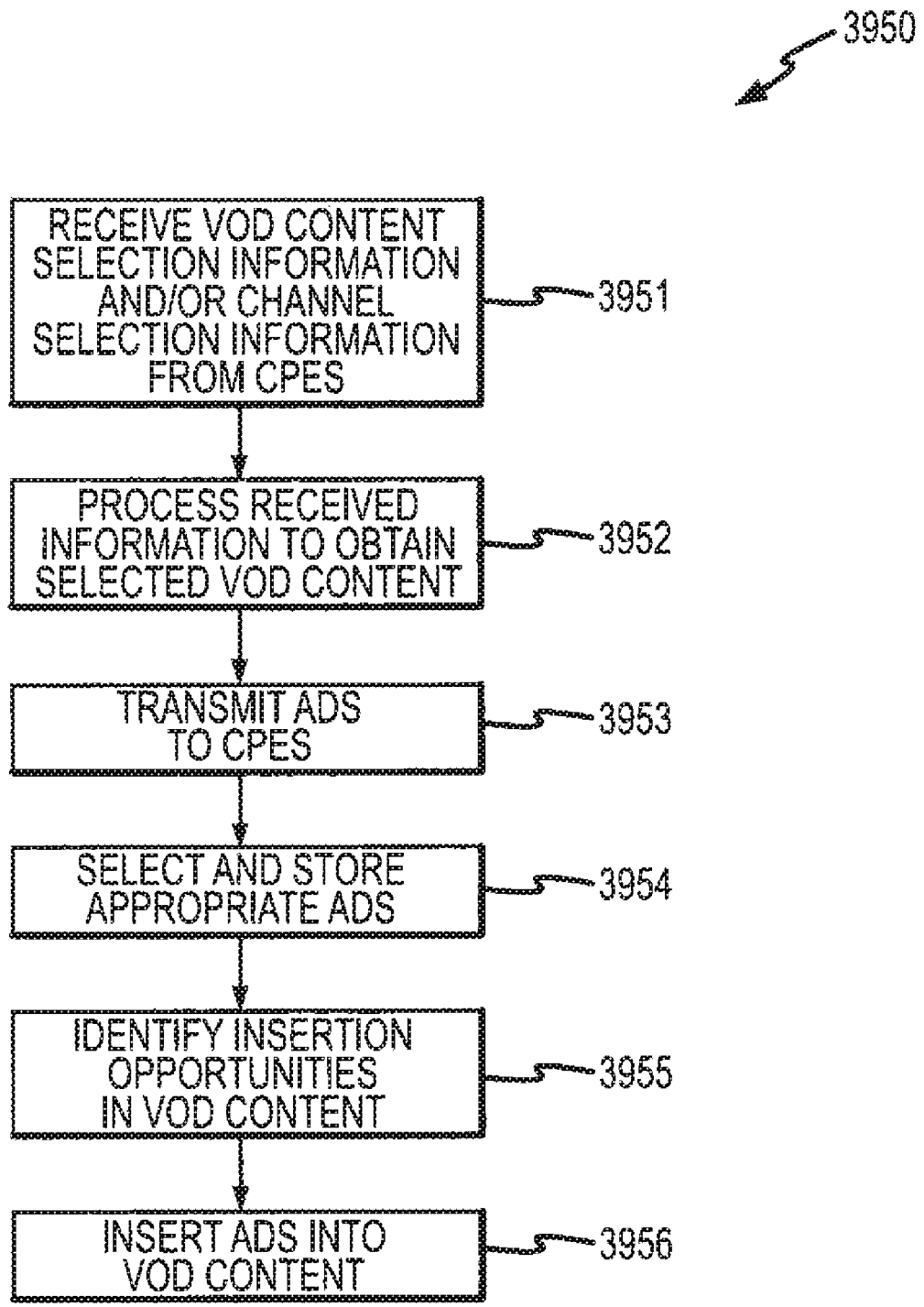

FIG. 39 is a block diagram of a system that targets content in connection with VOD content. For example, headend 3900 is configured with content selection processor 3901 that selects ads perhaps though not necessarily, based on votes with respect to ordinary programming ads described above and VOD server 3903 to receive VOD requests and/or actual channel selections from CPEs 2810. As described above, content selection processor 3801 may select ads for delivery to CPEs 2810. These ads may be forwarded to CPEs and CPEs may store ads that match an audience classification of a current user. Separately, a CPE user may request VOD content and transfer a VOD request to VOD server 3903. Server 3903 may process the request and forward the VOD content, which may include tones or messages to trigger ad insertion (and, optionally, delivery constraints such as ad exclusions). Typically, CPEs 2810 receive VOD content in one or more of a plurality of channels that the CPEs independently select. For example, network 3900 may simultaneously convey a plurality of contents across a respective plurality of RF television channels (e.g., via cable). An individual CPE 2810 may select content from a channel via tuning (e.g., either digital tuning or analog tuning). A user of CPE 2810 thus acquires the VOD content by directing the CPE 2810 to a particular VOD channel. From there, the user may select the VOD content by actively choosing from a menu of options presented to the user (e.g., desired VOD content, payment options, etc.). As such, the VOD selection may be similar to ordering a pay-per-view event, with the possible exception of a VOD selection being substantially instantaneous (i.e., "on-demand").

Targeted ads may also be provided in connection with VOD content by employing headend interleaving. For example, in certain implementations ads may be selected on a per user basis as determined from a user profile developed from votes (with respect to regular programming breaks) or other information. That user profile may be used to interleave ads in the VOD content delivered to the user. Alternatively, such information may be aggregated for multiple users who have ordered the VOD contract, and best fit ads may be interleaved in the VOD content. Users may be provide an option of VOD content with or without ads, with appropriate pricing based on the option selected.

In the case of headend interleaving, content selection processor 3901 may retrieve ads from an ad server, such as ad server 2901 of FIG. 29A, based on audience classification parameters. Content selection processor 3901 may further be in communication with a content synchronizer, such as content synchronizer 2804 of FIG. 29A. That is, content selection processor 3901 may transfer retrieved ads to the content synchronizer for synchronization of the ads into the VOD content.

Although shown and described with respect to certain CPE insertion and headend interleaving implementations, those skilled in the art should readily recognize that the invention is not intended to be limited to these implementations. For example, content selection processor 3901 may also be configured to select ads based on user input information. That is, CPEs 2810 may transfer actual user input information to content selection processor 3901 such that the content selection processor may determine audience classifications and appropriate ad delivery.

Although shown and described with respect to VOD selections being used to determine delivery of advertisements, the present invention is not intended to be limited to such ad deliveries. For example, demographic information of an individual VOD customer may be available in the form of financial or other information obtained from external sources. In this regard, an advertisement may be selected for headend insertion based on demographic information stored with a database, such as demographic database 2921 of FIG. 29A. Other forms of ad delivery within VOD content may also fall within a scope and spirit of the invention. Also, this functionality may be applied in other contexts such as podcasts.

Figure 40A:
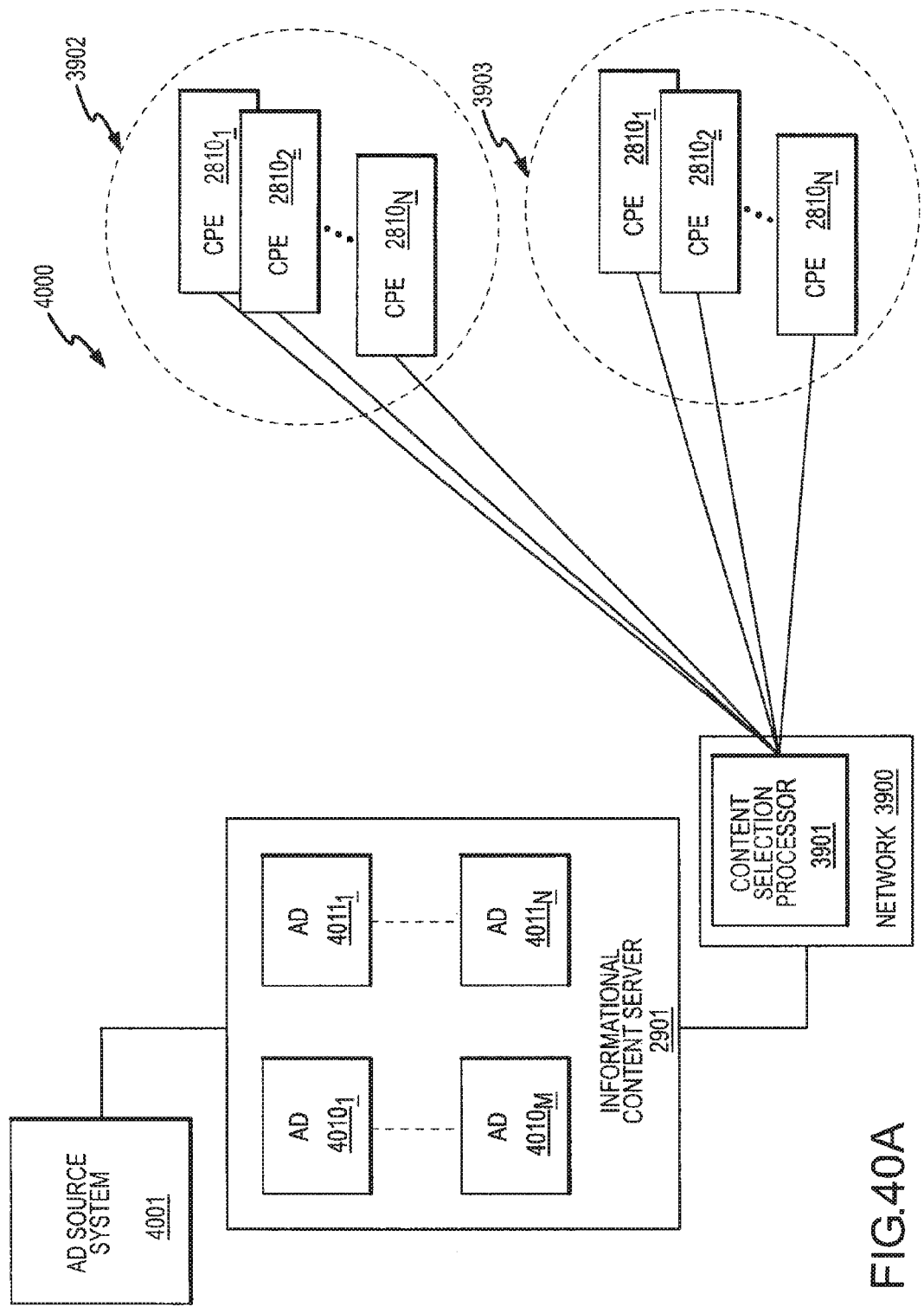
FIG. 40A is a block diagram of a system that implements targeted content with multiple content segments.

FIG. 40A is a block diagram of system 4000 configured to implement targeted content using multiple ads (e.g., ads 4010$_{1 \ldots M}$ and 4011$_{1 \ldots N}$; again, where M and N are both integers greater than one). For example, advertiser 4001 may wish to provide a plurality of related ads to broadcast network content users (e.g., via headend 3900). The related ads may be provided during predetermined intervals (e.g., commercial breaks) within the broadcast network content so that an overall ad message is delivered to the broadcast network content users.

Examples of ads 4010$_{1 \ldots M}$ and 4011$_{1 \ldots N}$ may include a series of ads including a "teaser" ad, a main ad and a summation ad, where the advertiser desires to have each ad in the sequence delivered to a targeted audience member a selected number of time (one or more) before the next ad is delivered. For example, advertiser 4001 may wish to provide ad 4010$_1$ to group 3902 of CPE 2810 users to convey information regarding a product that may be suitable for the users. Ad 4010$_1$ may be used to entice CPE 2810 users into observing another ad (e.g., ad 4010$_2$) from family 4010 of ads.

In regard to targeting content using multiple ads 4010$_{1 \ldots M}$ and 4011$_{1 \ldots N}$, system 4000 may also be configured to provide the ads based on votes. For example, content selection processor 3901 may receive votes from CPEs 2810 and indicate a certain level of suitability for various ads. CPEs may determine to vote or note vote for an ad and select or not select the ad for delivery, depending on the CPEs progress with respect to the defined ad sequence. Content selection processor 3901 may process the votes and determine whether or not to include a particular ad in the sequence in a flotilla.

Figure 40B:
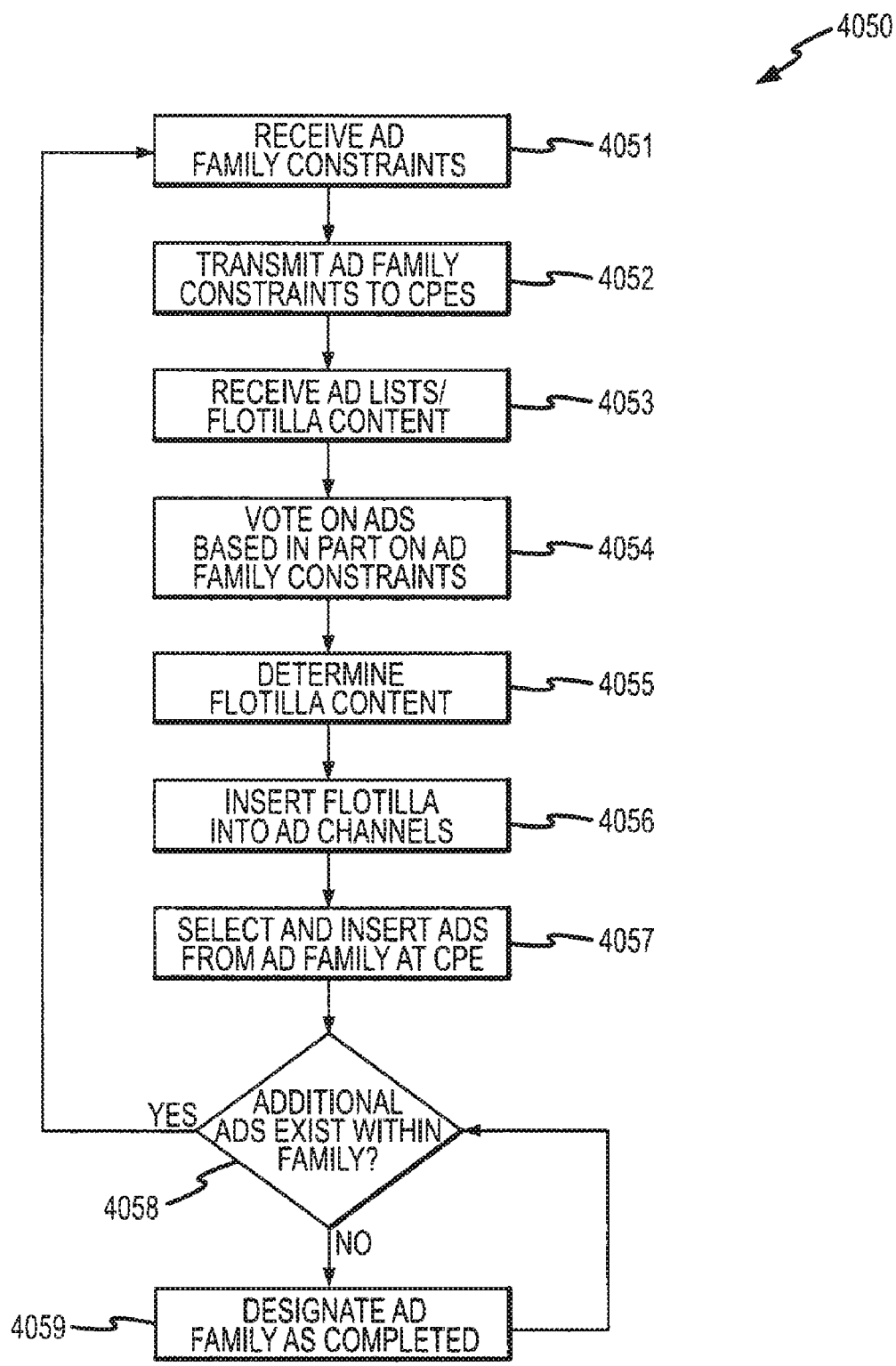
FIG. 40B is a flowchart of a packaged content targeting process.

FIG. 40B is a flowchart of a packaged content targeting process of 4050. The illustrated process 4050 begins with receiving (4051) ad family constraints. As noted above, an advertiser may designate that each ad in a series of ads is to be delivered to a targeted user a certain number of times before the next ad in the sequence is shown. These ad family constraints may be transmitted (4052) to individual CPEs. The CPEs then receive (4053) ad lists including ads available for a subsequent commercial break. The CPE may then vote (4054) on ads based in part on ad family constraints. That is, a CPE generally will not vote for an ad unless the audience classification of the current user matches the target audience and the ad family constraints are met, e.g., the user has not already received that ad the number of times designated by the advertiser, and has received any prerequisite ads the designated number of times.

The headend receives the votes and determines (4055) a flotilla content as described above. Thus, an ad from the family of ads will not be inserted into the flotilla unless there are a sufficient number of users that have voted for that ad. The flotilla is then inserted (4056) into the available ad channels and, perhaps, into the programming channel. Upon receiving the flotilla, individual CPEs will select (4057) and insert any appropriate ads from the ad family. The CPE can then determine (4058) whether additional ads from the ad family remain to be received. If so, the process is repeated upon receipt of an additional ad list. If not, the ad family may be designated (4059) as completed such that the CPE will not vote for ads in that family when included on future ad lists.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A method for use in delivering assets to users of a broadcast network, said broadcast network primarily involving synchronized distribution of broadcast content to multiple users, said method comprising:

receiving, at a network platform, a plurality of inputs from a plurality of user equipment devices of a plurality of broadcast network users, said inputs being free from any contemporaneous acts by said users to trigger said inputs, wherein said inputs define a collection of assets that are suitable for delivery to the plurality of user equipment devices as targeted assets to be displayed at an asset delivery opportunity associated with real time broadcast programming, said collection of assets being potentially larger than practical for transmission to said plurality of user equipment devices;

aggregating the plurality of inputs from the plurality of user equipment devices to form an aggregate of the inputs;

selecting a subset of assets from the collection of assets for transmission to all plurality of user equipment devices, wherein the subset of assets is smaller than the collection of assets, and wherein the subset of assets is selected based on the aggregate of the inputs from the plurality of user equipment devices and targeting criteria specified by one or more asset providers; and transmitting the subset of assets to all of the plurality of user equipment devices.

2. The method of claim 1, further comprising the step of transmitting a set of asset options, and the targeting criteria to said user equipment devices of said plurality of broadcast network users and receiving said plurality of inputs in response thereto, wherein said plurality of inputs are associated with ones of the set of asset options.

3. The method of claim 1, wherein said step of selecting comprises identifying assets selected by user equipment devices of a large number of users.

4. The method of claim 1, wherein said step of selecting comprises selecting said subset of assets based at least in part on revenues associated with dissemination thereof.

5. The method of claim 1, wherein said step of selecting comprises taking into account the identity of said asset providers in identifying the subset of assets.

6. The method of claim 1, wherein said step of transmitting the subset of assets comprises providing the subset of assets correspondent to a single time-slot.

7. The method of claim 6, wherein said subset of assets is transmitted in synchronization with said time-slot.

8. The method of claim 1, further comprising receiving reports from said user equipment devices of said plurality of users regarding delivery of said subset of assets.

9. The method of claim 8, further comprising determining a revenue value associated with delivery of said subset of assets based on said reports.

10. A system that delivers content to users of a broadcast network, said broadcast network primarily involving synchronized distribution of the content to multiple users, said system comprising:

an operations center that transmits content to user equipment devices of said users; and a content selection processor, associated with said operations center, that:

receives a plurality of processor originated inputs from said user equipment devices, said inputs being free from any contemporaneous acts by said users to trigger said inputs, wherein said inputs define a collection of assets that are suitable for delivery to said user equipment devices as targeted assets to be displayed at an asset delivery opportunity associated with programming, said collection of assets being potentially larger than practical for transmission to said user equipment devices;

aggregates the plurality of inputs to form an aggregate of the inputs;

selects a subset of assets from said collection of assets, wherein said subset of assets is smaller than said collection of assets, and wherein said subset of assets is selected based on said aggregate of the inputs and targeting criteria specified by one or more asset providers; and identifies said subset of assets for transmission to all of said user equipment devices.

11. The system of claim 10, further comprising:
a content synchronizer that, when directed by the content selection processor, transmits the subset of assets over said broadcast network.

12. The system of claim 11, wherein said content synchronizer is operative to insert the subset of assets into a stream of programming, a transmission band switching to an asset transmission band, or a combination thereof.

13. The system of claim 10, wherein the user equipment devices of said users includes customer premises equipment.

14. The system of claim 13, wherein said customer premise equipment generates said inputs and provides said inputs to the content selection processor.

15. The system of claim 13, wherein the content selection processor and the content synchronizer are resident on each said customer premise equipment and wherein each said customer premise equipment includes a storage element that stores the subset of assets for retrieval by the content selection processor.

16. The system of claim 13, wherein said customer premises equipment is operative to distinguish between different users of the customer premises equipment in connection with generating said inputs.

17. The system of claim 13, wherein said customer premises equipment is operative to detect a presence or lack thereof of a user and selectively generate an input based thereon.

18. The system of claim 13, wherein said customer premises equipment is operative for associating said customer premises equipment with multiple users in connection with generating an input.

19. The system of claim 10, wherein the user equipment devices of said users generate reports that indicate delivery of assets within the subset of assets.

20. The system of claim 10, further comprising:
a traffic and billing module that calculates a value for the delivery of each asset based on the reports.

21. The system of claim 10, wherein said subset of assets is targeted to said users based on an audience classification involving age, gender, income, level, locale, a personal interest or a combination thereof.

22. A method for use in connection with delivering selected content to users of a broadcast network, the broadcast network primarily involving synchronized distribution of broadcast content to multiple users, the method comprising the steps of:

generating information corresponding to a collection of available assets and targeting criteria associated with said available assets;

identifying the information for broadcasting over a broadcast network, wherein the information is receivable by a plurality of user equipment devices (UEDs) via the broadcast network;

receiving response signals transmitted via the broadcast network, the response signals originating from the plurality of UEDs, said response signals being free from any contemporaneous acts by said users to trigger said response signals, each of the response signals indicating suitability of one or more of the available assets for delivery at a corresponding UED based on the targeting criteria associated with said available assets;

aggregating the response signals from the plurality of UEDs to from an aggregate of the response signals; and selecting a subset of the collection of assets based on the aggregate of the response signals and targeting criteria of one or more asset providers for transmission to all of said plurality of UEDs in connection with a given asset delivery opportunity.

23. The method of claim 22, further comprising:
inserting at least a portion of the subset of the collection of assets into a content stream of the broadcast network.

24. The method of claim 23, further comprising:
broadcasting the content stream over the broadcast network.

* * * * *

UNITED STATES PATENT AND TRADEMARK OFFICE
CERTIFICATE OF CORRECTION

PATENT NO.         : 8,108,895 B2
APPLICATION NO.    : 11/331835
DATED              : January 31, 2012
INVENTOR(S)        : Anderson et al.

Page 1 of 1

It is certified that error appears in the above-identified patent and that said Letters Patent is hereby corrected as shown below:

Column 76, line 27, after "all", insert --of the--.
Column 78, line 35, delete "from" and insert therefor --form--.

Signed and Sealed this
Third Day of April, 2012

David J. Kappos
*Director of the United States Patent and Trademark Office*